United States Patent
Wang et al.

(10) Patent No.: US 12,089,046 B2
(45) Date of Patent: Sep. 10, 2024

(54) METHOD FOR EARLY TRANSMISSION OF DOWNLINK DATA AND APPARATUS

(71) Applicant: HUAWEI TECHNOLOGIES CO., LTD., Shenzhen (CN)

(72) Inventors: Hong Wang, Beijing (CN); Xun Tang, Beijing (CN); Yinghui Yu, Beijing (CN); Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 620 days.

(21) Appl. No.: 17/186,026

(22) Filed: Feb. 26, 2021

(65) Prior Publication Data

US 2021/0195424 A1 Jun. 24, 2021

Related U.S. Application Data

(63) Continuation of application No. PCT/CN2018/103092, filed on Aug. 29, 2018.

(51) Int. Cl.
*H04W 12/10* (2021.01)
*H04W 12/03* (2021.01)
(Continued)

(52) U.S. Cl.
CPC ......... *H04W 12/106* (2021.01); *H04W 12/03* (2021.01); *H04W 12/041* (2021.01);
(Continued)

(58) Field of Classification Search
CPC . H04W 12/106; H04W 12/03; H04W 12/041; H04W 52/0212; H04W 74/0833;
(Continued)

(56) References Cited

U.S. PATENT DOCUMENTS

2018/0270894 A1* 9/2018 Park .................. H04W 76/14
2019/0342800 A1* 11/2019 Sirotkin ............. H04B 17/318
(Continued)

FOREIGN PATENT DOCUMENTS

CN 105636207 A 6/2016
CN 108432334 A 8/2018
(Continued)

OTHER PUBLICATIONS

Huawei, HiSilicon, Early DL data transmission. 3GPP TSG-RAN WG2 Meeting #102, Busan, Korea, 21st May 25, 2018, R2-1807849, 5 pages.
(Continued)

*Primary Examiner* — Harunur Rashid
(74) *Attorney, Agent, or Firm* — Rimon PC

(57) ABSTRACT

A method for early transmission of downlink data and an apparatus are disclosed, to implement early transmission of downlink data, improve utilization of resources, and reduce power consumption of a terminal. The method includes: sending a random access preamble to a network device; receiving a random access response from the network device; sending a message 3 to the network device in response to the random access response, wherein the message 3 carries a first indication, and the first indication is used to indicate a single downlink data packet; and receiving a message 4 from the network device, wherein the message 4 carries downlink data.

8 Claims, 31 Drawing Sheets

(51) Int. Cl.
  *H04W 12/041* (2021.01)
  *H04W 12/106* (2021.01)
  *H04W 52/02* (2009.01)
  *H04W 74/0833* (2024.01)
  *H04W 76/20* (2018.01)
  *H04W 76/30* (2018.01)

(52) U.S. Cl.
  CPC ... *H04W 52/0212* (2013.01); *H04W 74/0833* (2013.01); *H04W 76/20* (2018.02); *H04W 76/30* (2018.02)

(58) Field of Classification Search
  CPC . H04W 76/20; H04W 76/30; H04W 52/0216; H04W 74/002; H04W 68/00; H04W 88/02; H04W 76/27; H04L 63/00; Y02D 30/70
  See application file for complete search history.

(56) References Cited

U.S. PATENT DOCUMENTS

2020/0053791 A1\* 2/2020 Ozturk ................. H04W 68/00
2020/0214070 A1\* 7/2020 Ingale ............... H04W 74/0833

FOREIGN PATENT DOCUMENTS

| KR | 10-2018-0054419 | \* | 5/2018 |
| WO | 2017048170 A1 | | 3/2017 |
| WO | 2017129288 A1 | | 8/2017 |
| WO | 2020036753 A1 | | 2/2020 |

OTHER PUBLICATIONS

Huawei, HiSilicon, Security issues for EDT in the UP solution for eMTC and NB-IoT. 3GPP TSG-RAN WG2 Meeting #101, Athens, Greece, Feb. 26 Mar. 2, 2018, R2-1802218, 5 pages.
3GPP TS 36.300 V15.2.0 (Jun. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), 357 pages.
Institute for Information Industry (III), Mobile terminated early data transmission. 3GPP TSG-RAN WG2 Meeting#103, Gothenburg, Sweden, Aug. 20, 2018, R2-1811885, 3 pages.
3GPP TS 36.331 V15.3 (Jul. 1, 2018), 3rd Generation Partnership Project; Technical Specification Group Radio Access Network; Evolved Universal Terrestrial Radio Access (E-UTRA); Radio Resource Control (RRC); Protocol specification(Release 15), 791 pages.
Huawei, HiSilicon, Corrections for RIL H621 NPRACH Resource Default configuration for EDT . 3GPP TSG-WG2 Meeting #103, Gothenburg, Sweden, Aug. 20, 2018, R2-1811548, 7 pages.
3GPP TS 36.321 V15.2.0 (Jul. 1, 2018), 3rd Generation Partnership Project; Technical Specification Group Radio Access Network; Evolved Universal Terrestrial Radio Access (E-UTRA); Medium Access Control (MAC) protocol specification (Release 15), 126 pages.
R3 (Huawei), Introduction of EDT for eMTC and NB-IoT enhancements in TS 36.300. 3GPP TSG-RAN2 Meeting #102, Busan, Korea, May 21-25, 2018, R2-1809197, 4 pages.
Ericsson, KI3 HLCOM Solution 24 update and evaluation. SA WG2 Meeting #12881S, Aug. 20-24, 2018, Sophia Antipolis, France,S2-187783, 14 pages.

\* cited by examiner

METHOD FOR EARLY TRANSMISSION OF DOWNLINK DATA AND APPARATUS

CROSS-REFERENCE TO RELATED APPLICATIONS

This application is a continuation of International Application No. PCT/CN2018/103092, filed on Aug. 29, 2018, the disclosure of which is hereby incorporated by reference in its entirety.

TECHNICAL FIELD

This application relates to the field of communications technologies, and in particular, to a method for early transmission of downlink data and an apparatus.

BACKGROUND

In some communications technologies, when no downlink data of a terminal needs to be transmitted on a network side, a radio resource control (RRC) connection is not established between the base station and the terminal. In this case, the terminal is in an idle state, that is, an IDLE state. When downlink data of the terminal needs to be transmitted on the network side, the network side pages the terminal and establishes an RRC connection to the terminal, and the terminal enters a connected state from the idle state. The process in which the network side pages the terminal and establishes the RRC connection needs to be completed by using a plurality of pieces of signaling. When the terminal listens and obtains a paging message and determines that the paging message carries an identifier of the terminal, an RRC connection establishment procedure is triggered. In this way, a random access process of the terminal is completed. After the random access process is completed, the network side further needs to set a context of the terminal and configure a bearer of the terminal, so as to send downlink data. It can be learned that when there is downlink data of the terminal on the network side, a very complex process needs to be performed, and some signaling overheads are required.

For some communication scenarios such as machine type communication (MTC) and narrowband internet of things (NB-IOT), data transmission is characterized by a relatively small amount of data and an uncertain data arrival time. If a small data packet with a small amount of data is transmitted according to the foregoing data transmission method, utilization of radio resources is reduced. A large quantity of resources are used for the RRC connection establishment procedure, and a small quantity of resources are used for data transmission. In addition, for an application scenario of an MTC terminal, for example, a water meter or an electricity meter, signal coverage strength of the terminal cannot meet a signal receiving requirement. Therefore, MTC is enhanced, so that the base station and the terminal can support coverage enhancement. Currently, a main method for implementing coverage enhancement is to repeatedly send an uplink signal or a downlink signal for a plurality of times, to improve a data receiving success rate through a plurality of times of reception and combination. If a small data packet has a relatively high latency requirement, the foregoing data transmission method and repeated sending method cannot meet the latency requirement of the small data packet.

In conclusion, if a complex RRC connection establishment procedure is used to transmit a downlink data packet with a small amount of data, system overheads are excessively high, resource utilization is low, power consumption of the terminal is excessively high, and a downlink data latency requirement cannot be met.

SUMMARY

This application provides a method for early transmission of downlink data and an apparatus, to resolve a problem that resource utilization is low when a downlink data packet with a small amount of data is transmitted.

According to a first aspect, a method for early transmission of downlink data is provided. The method may be performed by a terminal. The method is implemented through the following steps: sending a random access preamble to a network device; receiving a random access response from the network device; sending a message 3 to the network device in response to the random access response, where the message 3 carries a first indication, and the first indication is used to indicate a single downlink data packet; and receiving a message 4 from the network device, where the message 4 carries downlink data. In this way, the terminal sends the indication to the network device, so that the network device can send single downlink data to the terminal in a random access process based on the indication sent by the terminal, and does not establish an RRC connection to the terminal. Therefore, the terminal can finish receiving downlink data in an idle state. This helps reduce resource consumption, signaling overheads, and power consumption of the terminal.

In a possible design, the first indication may further be used to indicate early transmission of downlink data, may further be used to indicate that transmission of downlink data of the terminal can be completed at one time, may further be used to indicate the terminal not to send an uplink response message or uplink data after the terminal finishes receiving the downlink data, or may further be used to indicate the terminal to release a connection after the terminal finishes receiving the downlink data. The indication enables the network device to perform early transmission on downlink data, thereby reducing power consumption and saving communication resources.

In a possible design, the message 3 is a first RRC message used to request to resume the RRC connection.

In a possible design, the message 4 is a second RRC message used to indicate to release the RRC connection.

In a possible design, the method may further include implementations of integrity protection and encryption/decryption. Specifically, context information is resumed. The context information includes a first next-hop chaining count (NCC), and the first NCC is used to derive a first key. The downlink data is decrypted by using the first key.

In a possible design, a second key is further derived by using the first NCC, and integrity protection verification is performed on the message 4 by using the second key. The method for performing integrity protection on the message 4 in this design may be an independent design in this application, or may be combined with the solution of encrypting the downlink data in the previous possible design to form a solution.

In a possible design, a second key and a fourth key may further be derived by using the first NCC, integrity protection verification is performed on the message 4 by using the second key, and the message 4 is decrypted by using the fourth key. The method for performing integrity protection on the message 4 in this design may be an independent design in this application, or may be combined with the solution of encrypting the downlink data in the previous possible design to form a solution.

In a possible design, the context information further includes a third key, and integrity protection verification is performed on the message 4 by using the third key. The method for performing integrity protection on the message 4 in this design may be an independent design in this application, or may be combined with the solution of decrypting the downlink data by using the first key in the previous possible design to form a solution.

In a possible design, the context information further includes bearer configuration information and security configuration information.

In a possible design, the message 4 includes a second NCC, and an encryption/decryption and integrity protection solution may further be implemented by using the following method: deriving a fifth key by using the second NCC, and decrypting the downlink data by using the fifth key.

In a possible design, a sixth key may further be derived by using the second NCC, and integrity protection verification may be performed on the message 4 by using the sixth key or by using the third key included in the context information. The two methods for performing integrity protection on the message 4 in this design may be independent designs in this application, or may be combined with the solution of decrypting the downlink data by using the fifth key in the previous possible design to form a solution.

By using the foregoing several integrity protection and encryption/decryption methods, the message 4 can be prevented from being tampered with, and security of downlink data can be ensured.

In a possible design, a second indication may further be received from the network device, wherein the second indication is used to indicate a single downlink data packet. Specifically, a paging message may be received from the network device, where the paging message carries the second indication, and the paging message is used to page the terminal.

In a possible design, an approval indication may further be received from the network device, wherein the approval indication is used to indicate that the network device approves of early transmission of downlink data.

According to a second aspect, a method for early transmission of downlink data is provided. The method may be performed by a terminal. The method is implemented through the following steps: sending a random access preamble to a network device; receiving a random access response from the network device; sending a message 3 to the network device in response to the random access response, where the message 3 carries a first indication, and the first indication is used to indicate a single downlink data packet; and receiving a message 4 from the network device, where the message 4 is an RRC message, and the RRC message includes downlink data of the terminal. In this way, the terminal sends the indication to the network device, so that the network device can send single downlink data to the terminal in a random access process based on the indication sent by the terminal, and does not establish an RRC connection to the terminal. Therefore, the terminal can finish receiving downlink data in an idle state. This helps reduce resource consumption, signaling overheads, and power consumption of the terminal.

In a possible design, the message 3 is an RRC early data request message, and the message 4 is an RRC early data complete message; the message 3 is an RRC connection request message, and the message 4 is an RRC early data complete message; or the message 3 is an RRC connection request message, and the message 4 is an RRC connection release message.

According to a third aspect, a method for early transmission of downlink data is provided. The method may be performed by a network device, which is denoted as a first network device herein. The method is implemented through the following steps: receiving, by the first network device, a random access preamble from a terminal; sending, by the first network device, a random access response to the terminal; receiving, by the first network device, a message 3 from the terminal, where the message 3 carries a first indication, and the first indication is used to indicate the single downlink data packet; and sending, by the first network device, a message 4 to the terminal, where the message 4 carries downlink data. In this way, the network device can send single downlink data to the terminal in a random access process based on the indication sent by the terminal, and does not establish an RRC connection to the terminal. Therefore, the terminal can finish receiving downlink data in an idle state. This helps reduce resource consumption, signaling overheads, and power consumption of the terminal.

In a possible design, the first indication may further be used to indicate early transmission of downlink data, may further be used to indicate that transmission of downlink data of the terminal can be completed at one time, may further be used to indicate the terminal not to send an uplink response message or uplink data after the terminal finishes receiving the downlink data, or may further be used to indicate the terminal to release a connection after the terminal finishes receiving the downlink data. The indication enables the network device to perform early transmission on downlink data, thereby reducing power consumption and saving communication resources.

In a possible design, the message 3 is a first RRC message used to request to resume the RRC connection.

In a possible design, the message 4 is a second RRC message used to indicate to release the RRC connection.

In a possible design, the method may further include implementations of integrity protection and encryption/decryption. Specifically, the first network device resumes context information of the terminal. The context information includes a first NCC, and the first NCC is used to derive a first key. The first network device encrypts the downlink data by using the first key.

In a possible design, the context information further includes a third key, and the first network device performs integrity protection on the message 4 by using the third key; the first network device derives a second key by using the first NCC, and performs integrity protection on the message 4 by using the second key; or the first network device derives a second key and a fourth key by using the first NCC, performs integrity protection on the message 4 by using the second key, and encrypts the message 4 by using the fourth key. There are three methods for performing integrity protection on the message 4 in this design. The three methods may be independent designs in this application, or may be combined with the solution of encrypting the downlink data by using the first key in the previous possible design to form a solution.

In a possible design, the message 4 carries a second NCC, and an encryption/decryption and integrity protection solution may further be implemented by using the following method: deriving, by the first network device, a fifth key by using the second NCC, and encrypting the downlink data by using the fifth key.

In a possible design, the first network device derives a sixth key by using the second NCC, and performs integrity protection on the message 4 by using the sixth key; or the first network device resumes context information of the terminal, where the context information includes a third key, and the first network device performs integrity protection on the message 4 by using the third key. The two methods for performing integrity protection on the message 4 in this design may be independent designs in this application, or may be combined with the solution of encrypting the downlink data by using the fifth key in the previous possible design to form a solution.

By using the foregoing several integrity protection and encryption/decryption methods, the message 4 can be prevented from being tampered with, and security of downlink data can be ensured.

In a possible design, the first network device may further send a second indication to the terminal, wherein the second indication is used to indicate a single downlink data packet. Specifically, the first network device may send a paging message to the terminal, where the paging message carries the second indication.

In a possible design, the first network device receives a third indication from a second network device, wherein the third indication is used to indicate a single downlink data packet. Specifically, the first network device receives a paging message from the second network device, where the paging message carries the third indication.

In a possible design, the first network device receives a fourth indication from a third network device, wherein the fourth indication is used to indicate a single downlink data packet.

In a possible design, the first network device receives downlink data from a third network device, wherein the downlink data carries a fourth indication, and the fourth indication is used to indicate a single downlink data packet.

According to a fourth aspect, a method for early transmission of downlink data is provided. The method may be performed by a network device, which is denoted as a first network device herein. The method is implemented through the following steps: receiving, by the first network device, a paging message from a second network device, where the paging message carries a first indication, and the first indication is used to indicate a single downlink data packet; receiving, by the first network device, a random access preamble from a terminal; sending, by the first network device, a random access response to the terminal; receiving, by the first network device, a message 3 from the terminal; and sending, by the first network device, a message 4 to the terminal, where the message 4 is an RRC message, and the RRC message includes downlink data of the terminal. The first network device can send single downlink data to the terminal in a random access process based on indications sent by the terminal and a core network device, and does not establish an RRC connection to the terminal. Therefore, the terminal can finish receiving downlink data in an idle state. This helps reduce resource consumption, signaling overheads, and power consumption of the terminal.

In a possible design, the first indication may further be used to indicate early transmission of downlink data, may further be used to indicate that transmission of downlink data of the terminal can be completed at one time, may further be used to indicate the terminal not to send an uplink response message or uplink data after the terminal finishes receiving the downlink data, or may further be used to indicate the terminal to release a connection after the terminal finishes receiving the downlink data. The indication enables the network device to perform early transmission on downlink data, thereby reducing power consumption and saving communication resources.

In a possible design, the message 3 is used to request to resume the RRC connection, and the message 4 is used to indicate the terminal to release the RRC connection.

In a possible design, the method may further include implementations of integrity protection and encryption/decryption. Specifically, the first network device resumes context information of the terminal. The context information includes a first NCC, and the first NCC is used to derive a first key. The first network device encrypts the downlink data by using the first key.

In a possible design, the context information further includes a third key, and the first network device performs integrity protection on the message 4 by using the third key; the first network device derives a second key by using the first NCC, and performs integrity protection on the message 4 by using the second key; or the first network device derives a second key and a fourth key by using the first NCC, performs integrity protection on the message 4 by using the second key, and encrypts the message 4 by using the fourth key. There are three methods for performing integrity protection on the message 4 in this design. The three methods may be independent designs in this application, or may be combined with the solution of encrypting the downlink data by using the first key in the previous possible design to form a solution.

In a possible design, the message 4 carries a second NCC, and an encryption/decryption and integrity protection solution may further be implemented by using the following method: deriving, by the first network device, a fifth key by using the second NCC, and encrypting the downlink data by using the fifth key.

In a possible design, the first network device derives a sixth key by using the second NCC, and performs integrity protection on the message 4 by using the sixth key; or the first network device resumes context information of the terminal, where the context information includes a third key, and the first network device performs integrity protection on the message 4 by using the third key. The two methods for performing integrity protection on the message 4 in this design may be independent designs in this application, or may be combined with the solution of encrypting the downlink data by using the fifth key in the previous possible design to form a solution.

By using the foregoing several integrity protection and encryption/decryption methods, the message 4 can be prevented from being tampered with, and security of downlink data can be ensured.

In a possible design, the first network device sends a second indication to the terminal, wherein the second indication is used to indicate a single downlink data packet. Specifically, the first network device may send a paging message to the terminal, where the paging message carries the second indication.

In a possible design, the first network device receives a third indication from the terminal, wherein the third indication is used to indicate a single downlink data packet.

In a possible design, the first network device receives a fourth indication from a third network device, wherein the fourth indication is used to indicate a single downlink data packet.

In a possible design, the first network device receives downlink data from a third network device, wherein the downlink data carries a fourth indication, and the fourth indication is used to indicate a single downlink data packet.

According to a fifth aspect, a method for early transmission of downlink data is provided. The method may be performed by a network device, which is denoted as a first network device herein. The method is implemented through the following steps: receiving, by the first network device, a random access preamble from a terminal; sending, by the first network device, a random access response to the terminal; receiving, by the first network device, a first indication from the terminal, where the first indication is used to indicate a single downlink data packet; and sending, by the first network device, a message 4 to the terminal, where the message 4 is an RRC message, and the RRC message includes downlink data of the terminal. In this way, the network device can send single downlink data to the terminal in a random access process based on the indication sent by the terminal, and does not establish an RRC connection to the terminal. Therefore, the terminal can finish receiving downlink data in an idle state. This helps reduce resource consumption, signaling overheads, and power consumption of the terminal.

In a possible design, the first indication may further be used to indicate early transmission of downlink data, may further be used to indicate that transmission of downlink data of the terminal can be completed at one time, may further be used to indicate the terminal not to send an uplink response message or uplink data after the terminal finishes receiving the downlink data, or may further be used to indicate the terminal to release a connection after the terminal finishes receiving the downlink data. The indication enables the network device to perform early transmission on downlink data, thereby reducing power consumption and saving communication resources.

In a possible design, the message 3 is an RRC early data request message, and the message 4 is an RRC early data complete message; the message 3 is an RRC connection request message, and the message 4 is an RRC early data complete message; or the message 3 is an RRC connection request message, and the message 4 is an RRC connection release message.

In a possible design, the first network device sends a second indication to the terminal, wherein the second indication is used to indicate a single downlink data packet.

In a possible design, the first network device receives a third indication from a second network device, wherein the third indication is used to indicate a single downlink data packet.

In a possible design, the third indication is carried in a paging message or a non-access stratum (NAS) message.

In a possible design, the first network device receives the downlink data from a second network device. Optionally, the downlink data is carried in a NAS message.

According to a sixth aspect, a method for early transmission of downlink data is provided. The method may be performed by a core network device, which is denoted as a first core network device herein. The method is implemented through the following steps: receiving, by the first core network device, a terminal initiation message from an access network device, where the terminal initiation message carries a first indication, and the first indication is used to indicate a single downlink data packet; receiving, by the first core network device, downlink data of the terminal from a second core network device; and sending, by the first core network device, a NAS message to the access network device, where the NAS message carries the downlink data of the terminal. In this way, the first core network device can encapsulate the downlink data of the terminal into the NAS message based on the indication sent by the terminal, and send the NAS message to the terminal via the access network device, and does not need to establish an RRC connection to the terminal. Therefore, the terminal can finish receiving downlink data in an idle state. This helps reduce resource consumption, signaling overheads, and power consumption of the terminal.

In a possible design, the first core network device receives a second indication from the second core network device, where the second indication is used to indicate a single downlink data packet. Optionally, the first core network device receives a downlink data notification message from the second core network device, where the downlink data notification message carries the first indication.

In a possible design, the downlink data of the terminal carries a second indication, and the second indication is used to indicate a single downlink data packet.

According to a seventh aspect, a method for early transmission of downlink data is provided. The method may be performed by a core network device, which is denoted as a first core network device herein. The method is implemented through the following steps: receiving, by the first core network device, a first indication from a second core network device, where the first indication is used to indicate a single downlink data packet; receiving, by the first core network device, downlink data of the terminal from the second core network device; and sending, by the first core network device, a NAS message to an access network device, where the NAS message carries the downlink data of the terminal. The first core network device can further receive an indication from another core network device, encapsulate the downlink data of the terminal into the NAS message based on the indication, and send the NAS message to the terminal via the access network device, and does not need to establish an RRC connection to the terminal. Therefore, the terminal can finish receiving downlink data in an idle state. This helps reduce resource consumption, signaling overheads, and power consumption of the terminal.

In a possible design, the first core network device receives a downlink data notification message from the second core network device, where the downlink data notification message carries the first indication.

In a possible design, the first core network device sends a second indication to the access network device, where the second indication is used to indicate a single downlink data packet. Optionally, the first core network device sends a paging message to the access network device, where the paging message carries the second indication.

In a possible design, the first core network device receives the downlink data of the terminal from the second core network device, where the downlink data of the terminal carries the first indication.

In a possible design, the NAS message further carries a second indication, and the second indication is used to indicate a single downlink data packet.

According to an eighth aspect, an apparatus for early transmission of downlink data is provided. The apparatus has a function of implementing an action of the terminal device in any one of the first aspect, the second aspect, the possible designs of the first aspect, or the possible designs of the second aspect. The apparatus includes corresponding means for performing the steps or functions described in the foregoing method aspects. The steps or functions may be implemented by using software, hardware (for example, a circuit), or a combination of hardware and software.

In a possible design, the apparatus includes one or more processors and a communications unit. The one or more processors are configured to support the apparatus for early transmission of downlink data in performing the corresponding functions of the terminal in the foregoing methods, for example, sending a random access preamble to a network device; receiving a random access response from the network device; sending a message 3 to the network device, where the message 3 carries a first indication; and receiving a message 4 from the network device. The communications unit is configured to support the apparatus for early transmission of downlink data in communicating with another device, to implement a receiving function and/or a sending function, for example, sending each message, and receiving each message.

Optionally, the apparatus may further include one or more memories. The memory is configured to couple to the processor, and the memory stores a program instruction and/or data that are/is necessary for the apparatus. The one or more memories may be integrated with the processor, or may be disposed independent of the processor. This is not limited in this application.

The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus for early transmission of downlink data includes a transceiver, a processor, and a memory. The processor is configured to control the transceiver or the input/output circuit to receive and send a signal. The memory is configured to store a computer program. The processor is configured to run the computer program in the memory, so that the apparatus performs the method completed by the terminal in any one of the first aspect, the second aspect, the possible designs of the first aspect, or the possible designs of the second aspect.

According to a ninth aspect, an apparatus for early transmission of downlink data is provided. The apparatus has a function of implementing an action of the network device in any one of the third aspect, the fourth aspect, the fifth aspect, the possible designs of the third aspect, the possible designs of the fourth aspect, or the possible designs of the fifth aspect. The apparatus includes corresponding means (means) for performing the steps or functions described in the foregoing method aspects. The steps or functions may be implemented by using software, hardware (for example, a circuit), or a combination of hardware and software.

In a possible design, the apparatus for early transmission of downlink data includes one or more processors and a communications unit. The one or more processors are configured to support the apparatus for early transmission of downlink data in performing a corresponding function of the network device in any one of the third aspect, the fourth aspect, the fifth aspect, the possible designs of the third aspect, the possible designs of the fourth aspect, or the possible designs of the fifth aspect, for example, receiving an indication from a terminal or another network device, and sending downlink data to the terminal based on the indication. The communications unit is configured to support the apparatus for early transmission of downlink data in communicating with another device, to implement a receiving function and/or a sending function, for example, receiving an indication, and sending downlink data.

Optionally, the apparatus may further include one or more memories. The memory is configured to couple to the processor, and the memory stores a program instruction and/or data that are/is necessary for the network device. The one or more memories may be integrated with the processor, or may be disposed independent of the processor. This is not limited in this application.

The apparatus for early transmission of downlink data may be a base station, a gNodeB (gNB), a transmission reception point (TRP), or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus for early transmission of downlink data includes a transceiver, a processor, and a memory. The processor is configured to control the transceiver or the input/output circuit to send and receive a signal. The memory is configured to store a computer program. The processor is configured to run the computer program in the memory, so that the apparatus performs the method completed by the network device in any one of the third aspect, the fourth aspect, the fifth aspect, the possible designs of the third aspect, the possible designs of the fourth aspect, or the possible designs of the fifth aspect.

According to a tenth aspect, an apparatus for early transmission of downlink data is provided. The apparatus has a function of implementing an action of the core network device in any one of the sixth aspect, the seventh aspect, the possible designs of the sixth aspect, or the possible designs of the seventh aspect. The apparatus includes corresponding means for performing the steps or functions described in the foregoing method aspects. The steps or functions may be implemented by using software, hardware (for example, a circuit), or a combination of hardware and software.

In a possible design, the apparatus for early transmission of downlink data includes one or more processors and a communications unit. The one or more processors are configured to support the apparatus for early transmission of downlink data in performing a corresponding function of the network device in any one of the sixth aspect, the seventh aspect, the possible designs of the sixth aspect, or the possible designs of the seventh aspect, for example, receiving an indication from an access network device, receiving downlink data from another core network device, and delivering a NAS message carrying the downlink data to the access network device. The communications unit is configured to support the apparatus for early transmission of downlink data in communicating with another device, to implement a receiving function and/or a sending function, for example, receiving an indication, and sending downlink data.

Optionally, the apparatus for early transmission of downlink data may further include one or more memories. The memory is configured to couple to the processor, and the memory stores a program instruction and/or data that are/is necessary for the network device. The one or more memories may be integrated with the processor, or may be disposed independent of the processor. This is not limited in this application.

The apparatus for early transmission of downlink data may be a mobile management entity (MME) or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus for early transmission of downlink data includes a transceiver, a processor, and a memory. The processor is configured to control the transceiver or the input/output circuit to receive and send a signal. The memory is configured to store a computer program. The processor is configured to run the computer program in the memory, so that the apparatus performs the method completed by the core network device in any one of the sixth aspect, the seventh aspect, the possible designs of the sixth aspect, or the possible designs of the seventh aspect.

According to an eleventh aspect, a system is provided. The system includes the apparatuses for early transmission of downlink data provided in at least two of the eighth aspect, the ninth aspect, or the tenth aspect.

According to a twelfth aspect, a computer-readable storage medium is provided and is configured to store a computer program. The computer program includes an instruction used to perform the method in any one of the first aspect, the second aspect, the possible designs of the first aspect, or the possible designs of the second aspect.

According to a thirteenth aspect, a computer-readable storage medium is provided and is configured to store a computer program. The computer program includes an instruction used to perform the method in any one of the third aspect, the fourth aspect, the fifth aspect, the possible designs of the third aspect, the possible designs of the fourth aspect, or the possible designs of the fifth aspect.

According to a fourteenth aspect, a computer-readable storage medium is provided and is configured to store a computer program. The computer program includes an instruction used to perform the method in any one of the sixth aspect, the seventh aspect, the possible designs of the sixth aspect, or the possible designs of the seventh aspect.

According to a fifteenth aspect, a computer program product is provided. The computer program product includes computer program code. When the computer program code is run on a computer, the computer is enabled to perform the method in any one of the first aspect, the second aspect, the possible designs of the first aspect, or the possible designs of the second aspect.

According to a sixteenth aspect, a computer program product is provided. The computer program product includes computer program code. When the computer program code is run on a computer, the computer is enabled to perform the method in any one of the third aspect, the fourth aspect, the fifth aspect, the possible designs of the third aspect, the possible designs of the fourth aspect, or the possible designs of the fifth aspect.

According to a seventeenth aspect, a computer program product is provided. The computer program product includes computer program code. When the computer program code is run on a computer, the computer is enabled to perform the method in any one of the sixth aspect, the seventh aspect, the possible designs of the sixth aspect, or the possible designs of the seventh aspect.

DESCRIPTION OF EMBODIMENTS

The following describes in detail the embodiments of this application with reference to the accompanying drawings.

The embodiments of this application provide a method for early transmission of downlink data and an apparatus, to transmit downlink data in advance by using a simple connection establishment process, so as to improve resource utilization and reduce power consumption of a terminal. The method and apparatus are based on a same inventive concept. Because a problem-resolving principle of the method is similar to a problem-resolving principle of the apparatus, implementations of both the apparatus and the method may mutually refer to each other. No repeated description is provided. In descriptions of the embodiments of this application, the term "and/or" describes an association relationship for associated objects and represents that three relationships may exist. For example, A and/or B may represent the following three cases: Only A exists, both A and B exist, and only B exists. The character "/" generally represents an "or" relationship between the associated objects. In this application, "at least one" means one or more, and "a plurality of" means two or more. In addition, it should be understood that in the descriptions of this application, terms such as "first" and "second" are merely used for differentiation and description, but should not be understood as indicating or implying relative importance, or should not be understood as indicating or implying a sequence.

The communication method provided in the embodiments of this application may be applied to a $4^{th}$ generation (4G) communications system, a $5^{th}$ generation (5G) communications system, or various future communications systems. Specifically, the method may be applied to an MTC communication scenario, an NB-IOT communication scenario, or any transmission scenario of a small downlink data packet.

The following describes in detail the embodiments of this application with reference to the accompanying drawings.

Figure 1:
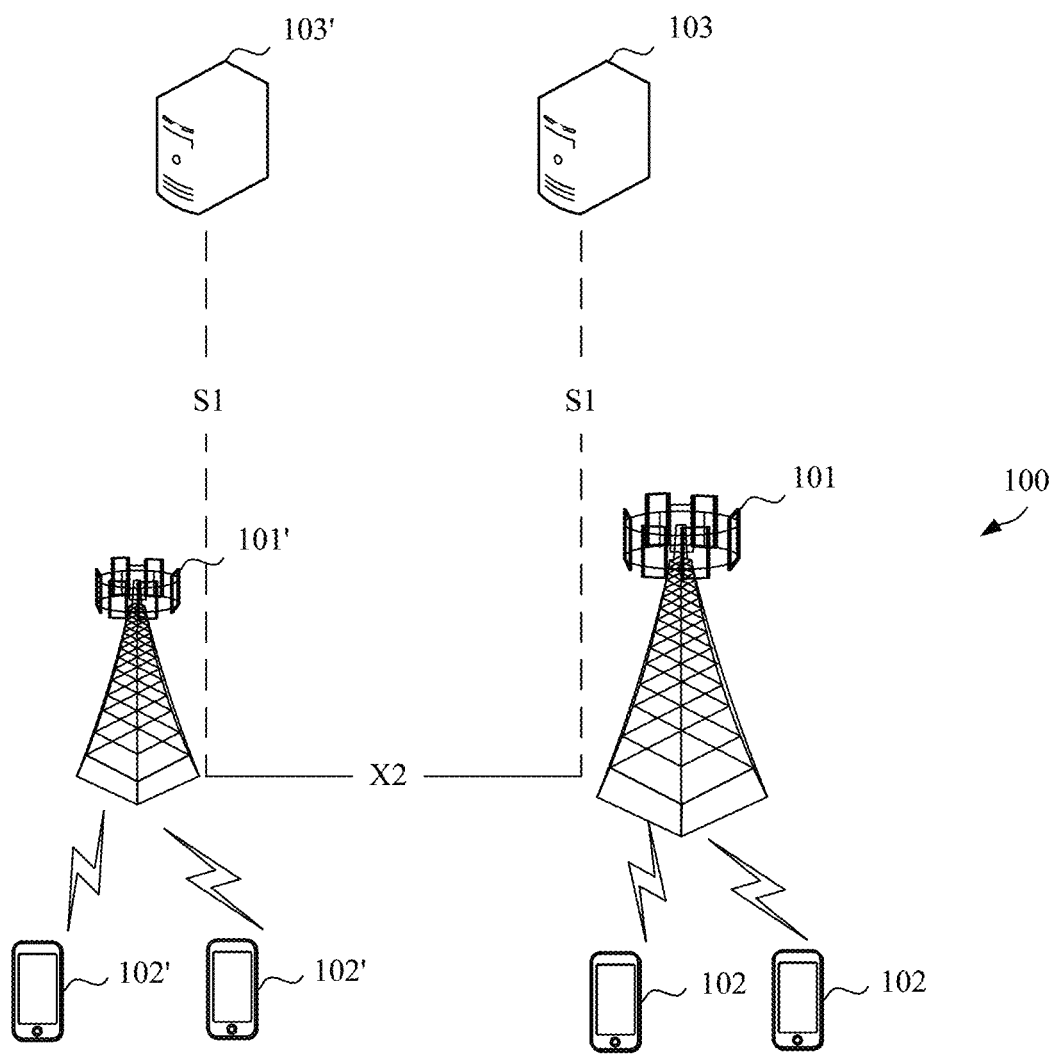
FIG. 1 is a schematic architectural diagram of a communications system according to an embodiment of this application.

FIG. 1 shows a possible architecture of a communications system to which a method for early transmission of downlink data provided in an embodiment of this application is applicable. Referring to FIG. 1, the communications system 100 includes one or more access network devices, one or more terminals, and one or more core network devices. Each access network device may serve one or more terminals within its coverage. The access network devices communicate with each other through an X2 interface, and the access network device is connected to the core network device through an SI interface. For example, as shown in FIG. 1, the communications system 100 includes an access network device 101 and an access network device 101'. A terminal within coverage of the access network device 101 is represented by a terminal 102, and a terminal within coverage of the access network device 101' is represented by a terminal 102'. The communications system 100 further includes a core network device 103 and a core network device 103'. Forms of the access network devices, the terminals, and the core network devices that are included in the communications system are described below by using examples. The access network device 101, the terminal 102, and the core network device 103 are used for description.

The access network device 101 is a node in a radio access network (RAN), and may also be referred to as a base station, or may also be referred to as a RAN node (or device). Currently, for example, the access network device 101 is a gNB/NR-NB, a TRP, an evolved NodeB (eNB), a radio network controller (RNC), a NodeB (NB), a base station controller (BSC), a base transceiver station (base transceiver station, BTS), a home base station (for example, a home evolved NodeB, a home Node B, HNB), a baseband unit (BBU), a wireless fidelity (Wi-Fi) access point (AP), a network side device in a 5G communications system, or a possible future communications system.

The terminal 102 is also referred to as user equipment (UE), a mobile station (MS), a mobile terminal (MT), or the like, and is a device that provides voice or data connectivity for a user, or may be an internet of things device. For example, the terminal 102 includes a handheld device or a vehicle-mounted device that has a wireless connection function. Currently, the terminal 102 may be a mobile phone, a tablet computer, a notebook computer, a palmtop computer, a mobile internet device MID), a wearable device (such as a smartwatch, a smart band, or a pedometer), a vehicle-mounted device (such as an automobile, a bicycle, an electric vehicle, an aircraft, a ship, a train, or a high-speed train), a virtual reality (VR) device, an augmented reality (AR) device, a wireless terminal in industrial control, a smart home device (such as a refrigerator, a television, an air conditioner, or an electricity meter), an intelligent robot, a workshop device, a wireless terminal in self-driving, a wireless terminal in remote surgery (remote medical surgery), a wireless terminal in a smart grid (smart grid), a wireless terminal in transportation safety, a wireless terminal in a smart city, a wireless terminal in a smart home, a flight device (such as an intelligent robot, a hot balloon, an unmanned aerial vehicle, or an aircraft), or the like.

The core network device 103 is used for communication between the network device 101 and an IP network. The IP network may be the internet, a private IP network, another data network, or the like. For example, in a long term evolution (LTE) communications system, the core network device 103 includes a MME/a serving gateway (S-GW).

The terminal in the embodiments of this application may feature in a single service. For example, there is only one downlink data packet in each time of downlink data transmission of the terminal. For a scenario of one downlink data packet, this embodiment of this application may include but is not limited to the following application scenarios:

Scenario 1: An amount of downlink data of the terminal is less than a specified threshold.

Scenario 2: The core network device may send downlink data of the terminal to the access network device by using an internet protocol IP packet.

Scenario 3: The access network device may send downlink data of the terminal to the terminal by using a transport block (transmission block, TB).

Scenario 4: The core network device sends the downlink data of the terminal to the access network device for a plurality of times, but the access network device may send, to the terminal by using one TB, the downlink data received for a plurality of times.

In the embodiments of this application, both the core network device and the access network device may be referred to as network devices. In descriptions of this application, for ease of description, terms such as "first" and "second" may be used for identification and description in the embodiments of this application. It may be understood that such a term cannot be understood as an indication or implication of relative importance, and cannot be understood as an indication or implication of a sequence.

The core idea of the embodiments of this application is as follows: The network device receives an indication, determines, based on the indication, that the downlink data of the terminal has only one downlink data packet, and delivers the downlink data of the terminal to the terminal by using one message, so that signaling consumption can be reduced, and a waste of resources can be avoided.

The following is an explanation of an indication in this specification.

In the embodiments of this application, based on different indication sending devices and different indication receiving devices, "first indication", "second indication", "third indication", and the like are used for representation and distinguishing descriptions. It may be understood that indications related to different naming manners indicate same or similar meanings. The following describes, by using an example, a meaning indicated by an "indication (indication)" in the embodiments of this application. The meaning of the indication may be any one or more of the following examples:

Example 1: The indication indicates early transmission of downlink data.

Example 2: The indication indicates that transmission of downlink data of the terminal can be completed at one time, that is, transmission of the downlink data of the terminal can be completed by using one message. For example, the downlink data of the terminal is transmitted by using a message 4. The downlink data and an RRC message in the message 4 may be sent in one TB, or the downlink data and the message 4 may be sent in one TB.

In this embodiment of this application, the message 4 is the fourth message exchanged between the terminal and the network device in a random access process.

Example 3: The indication indicates that the terminal does not send an uplink response message or uplink data after finishing receiving downlink data.

Example 4: The indication indicates that the terminal releases a connection after finishing receiving downlink data.

Example 5: The indication indicates a single downlink data packet, that is, indicates that the core network device may send downlink data of the terminal by using one IP packet, where the IP packet is indicated as a single downlink data packet (single packet) or single downlink data (single DL data).

Example 6: The indication indicates a single downlink data packet, that is, indicates that the access network device may send downlink data of the terminal by using one TB, where the TB is indicated as a single downlink data packet (single packet) or single downlink data (single DL data).

Example 7: The indication indicates transmission of a small packet, which may be understood as that an amount of downlink data of the terminal is less than a threshold.

In the following description, interaction devices may be represented by a terminal, a first network device, a second network device, and a third network device. The first network device is an access network device. For example, the access network device may be an eNB. The second network device and the third network device are core network devices. For example, the second network device is denoted as a first core network device, and the third network device is denoted as a second core network device. The second network device may be an MME, and the third network device may be an S-GW.

Figure 2A:
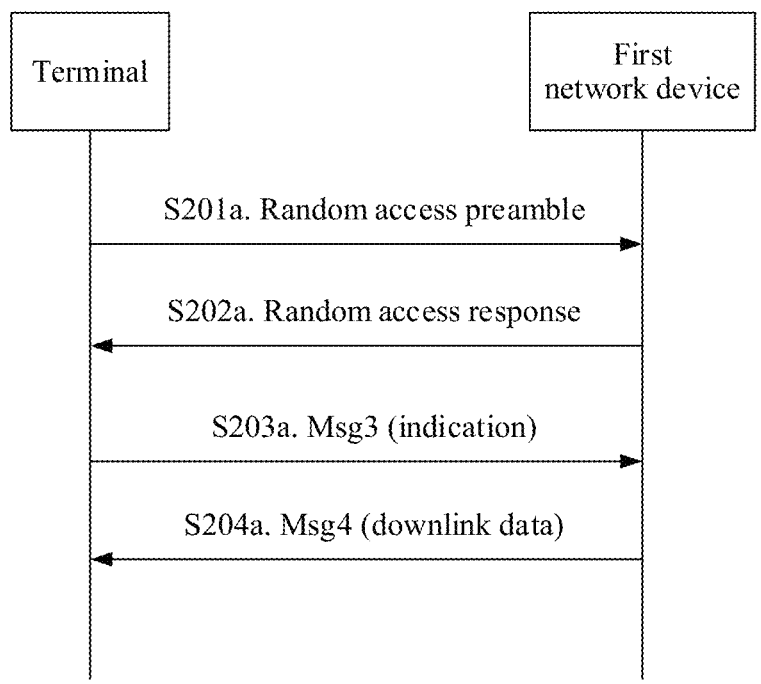
FIG. 2a is a schematic flowchart of a first method for early transmission of downlink data according to an embodiment of this application.

Based on the foregoing description, in a possible implementation, as shown in FIG. 2a, a specific process of a first method for early transmission of downlink data provided in an embodiment of this application is described as follows.

S201a. A terminal sends a message 1 (Msg1) to a first network device, and the first network device receives the Msg1 from the terminal. The message 1 is a random access preamble.

Specifically, the first network device broadcasts several random access preambles by using a broadcast message. When the terminal needs to initiate a random access process, the terminal randomly selects one random access preamble from the received several random access preambles, and sends the selected random access preamble to the first network device.

Before S201a, the terminal receives a paging message sent by the first network device.

S202a. The first network device sends a message 2 (Msg2) to the terminal, and the terminal receives the Msg2 from the first network device.

The Msg2 is a random access response.

S203a. The terminal sends a message 3 (Msg3) to the first network device, and the first network device receives the Msg3 from the terminal.

The Msg3 carries an indication. For a meaning indicated by the indication, refer to the foregoing description.

The Msg3 may be an RRC message, which is denoted as a first RRC message herein. For example, the first RRC message is an RRC connection resume request message, and is used to request to resume an RRC connection.

Optionally, the first RRC message may further carry a resume identifier (resume ID), a resume cause, and a short resume MAC-I, where MAC-I represents message authentication code for integrity. The resume ID is used to identify the suspended terminal. The resume cause is used to indicate a reason why the terminal resumes a connection. For example, a value of the resume cause is mobile terminating-access (mt-Access) or a newly added value. The newly added value is used to indicate that the reason for resuming the connection is transmitting single downlink data. The short resume MAC-I is used to perform integrity protection on the Msg3 to prevent the Msg3 from being tampered with.

In this application, a message A may carry B by using a plurality of methods. In an optional method, B may be carried by using an information element or a field included in the message A, that is, it may be understood as that the message A includes B. In another optional method, B and the message A may be encapsulated together, so that the message A carries B. For example, B and the message A are encapsulated into one medium access control packet data unit (MAC PDU). For another example, B and the message A are encapsulated into one transport block. For example, in this application, that the message A carries B may be that the message 3 carries an indication (that is, the first indication in this specification), may be that the message 4 carries downlink data, or so on.

Optionally, a third network device sends downlink data to the terminal, and the terminal receives the downlink data from the third network device. An indication is carried in the downlink data, and a meaning of the indication is described above. For example, the indication may be carried in a header of a GPRS tunneling protocol-user plane (GTP-U) packet of a downlink data packet, where GPRS represents general packet radio service.

S204a. The first network device sends a message 4 (Msg4) to the terminal, and the terminal receives the message 4 from the first network device.

The Msg4 carries downlink data, and the downlink data is downlink data delivered by the third network device to the first network device. After receiving the indication in S203a, the first network device may send, by using the Msg4, the downlink data to the terminal based on the indication. The Msg4 may be an RRC message, which is denoted as a second RRC message. For example, the second RRC message is an RRC connection release message. That the Msg4 carries the downlink data may be understood as that the Msg4 and the downlink data are encapsulated into one message. Alternatively, the Msg4 includes the second RRC message and the downlink data. For example, the Msg4 is carried on a logical channel of a common control channel (CCCH) (that is, carried on an SRB 0), and the downlink data is carried on a dedicated traffic channel (DTCH) (that is, carried on a DRB). Data on the two channels, that is, MAC service data units (MAC SDU), is multiplexed at a medium access control (MAC) layer to form a MAC PDU. The first network device sends the MAC PDU to the terminal, and the terminal receives the MAC PDU sent by the first network device.

Optionally, the message 4 may carry a resume ID, a release cause, and a NCC.

The resume ID is used to identify a suspended terminal. The release cause is used to indicate a reason for releasing a context of the terminal by the first network device. For example, a value of the release cause may be RRC suspend (or rrc-suspend).

According to the first method for early transmission of downlink data, the first network device can send single downlink data to the terminal in a random access process based on the indication sent by the terminal, and does not establish an RRC connection to the terminal. Therefore, the terminal can finish receiving downlink data in an idle state. This helps reduce resource consumption, signaling overheads, and power consumption of the terminal.

Figure 2B:
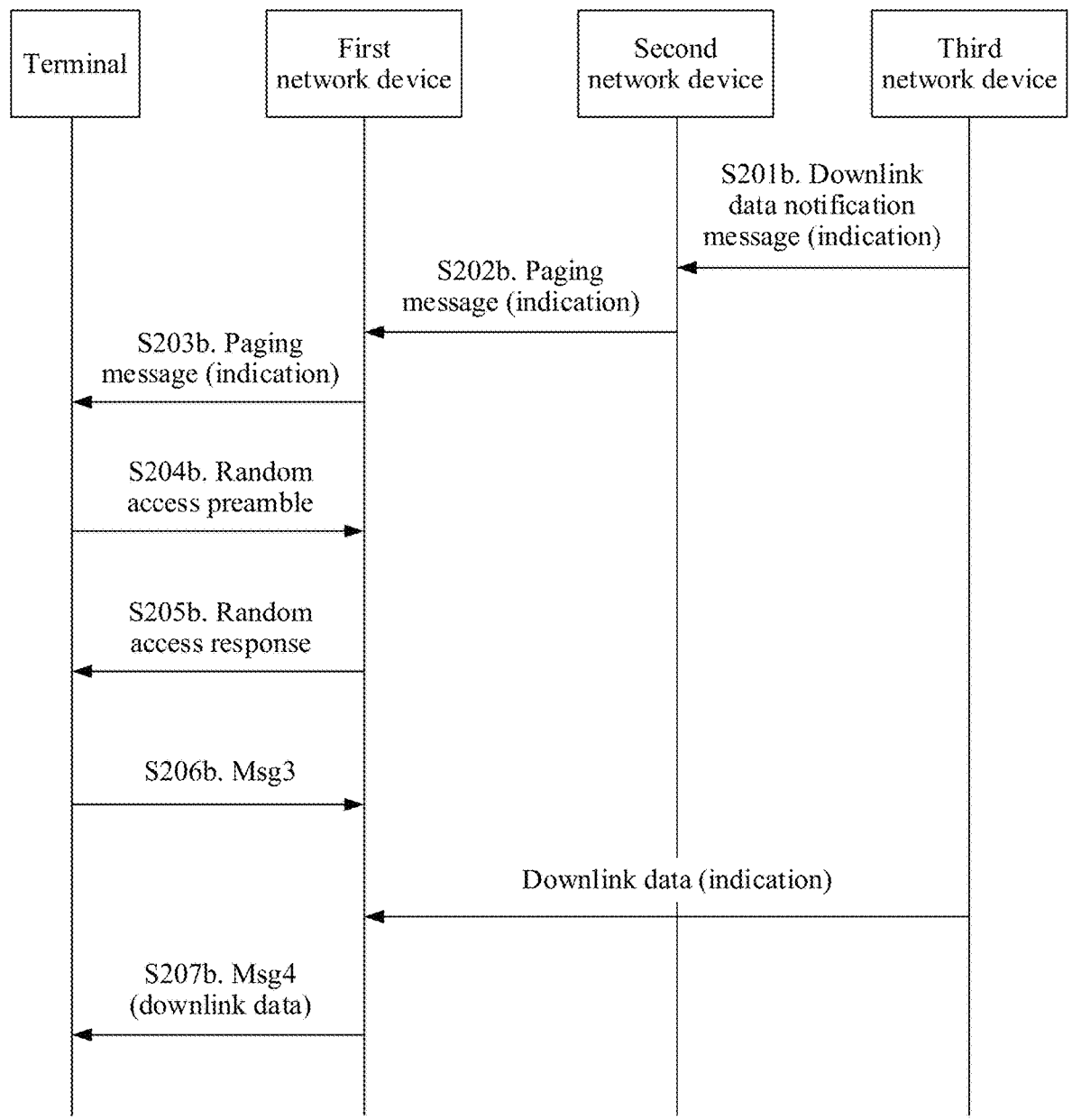
FIG. 2b is a schematic flowchart of a second method for early transmission of downlink data according to an embodiment of this application.

In a possible implementation, an indication may be further sent to an access network device via a core network device. Specifically, as shown in FIG. 2b, a specific process of a second method for early transmission of downlink data provided in an embodiment of this application is described as follows.

S201b. A third network device sends a downlink data notification message to a second network device, and the second network device receives the downlink data notification message from the third network device.

The downlink data notification message carries an indication. For a meaning of the indication, refer to the foregoing description. The downlink data notification message may further carry an identifier of the terminal, for example, an SAE-Temporary Mobile Subscriber Identity (S-TMSI) and/or a resume ID.

S202b. The second network device sends a paging message to a first network device, and the first network device receives the paging message from the second network device.

The paging message carries an indication. Similarly, for a meaning of the indication, refer to the foregoing description. The paging message may further carry an identifier of the terminal, for example, an S-TMSI and/or a resume ID.

Optionally, before S202b, the first network device sends the resume ID of the terminal to the second network device.

S203b. The first network device sends a paging message to the terminal, and the terminal receives the paging message sent by the first network device.

Optionally, the paging message sent in this step may also carry an indication. For a meaning of the indication, refer to the foregoing description.

S204b is the same as S201a.
S205b is the same as S202a.
S206b. The terminal sends a Msg3 to the first network device, and the first network device receives the Msg3 from the terminal.

The Msg3 is a first RRC message, and the first RRC message may be used to request to resume an RRC connection. For example, the first RRC message is an RRC connection resume request message.

Optionally, the first RRC message may further carry a resume ID, a resume cause, and a short resume MAC-I.

The first network device receives the first RRC message, determines, based on the resume ID or a mapping relationship between the resume ID and the S-TMSI, that the suspended terminal is the terminal indicated by an indication sent by a core network, and further determines that transmission of downlink data of the terminal can be completed at one time. Therefore, in the subsequent S207b, the message 4 carries the downlink data of the terminal.

The third network device sends the downlink data to the first network device, and the first network device receives the downlink data from the third network device. An indication is carried in the downlink data, and a meaning of the indication is described above. For example, the indication may be carried in a header of a GTP-U protocol packet of a downlink data packet.

S207b is the same as S204a.

According to the second method for early transmission of downlink data, the first network device can send single downlink data to the terminal in a random access process based on the indication sent by the core network device, and does not establish an RRC connection to the terminal. Therefore, the terminal can finish receiving downlink data in an idle state. This helps reduce resource consumption, signaling overheads, and power consumption of the terminal.

Figure 2C:
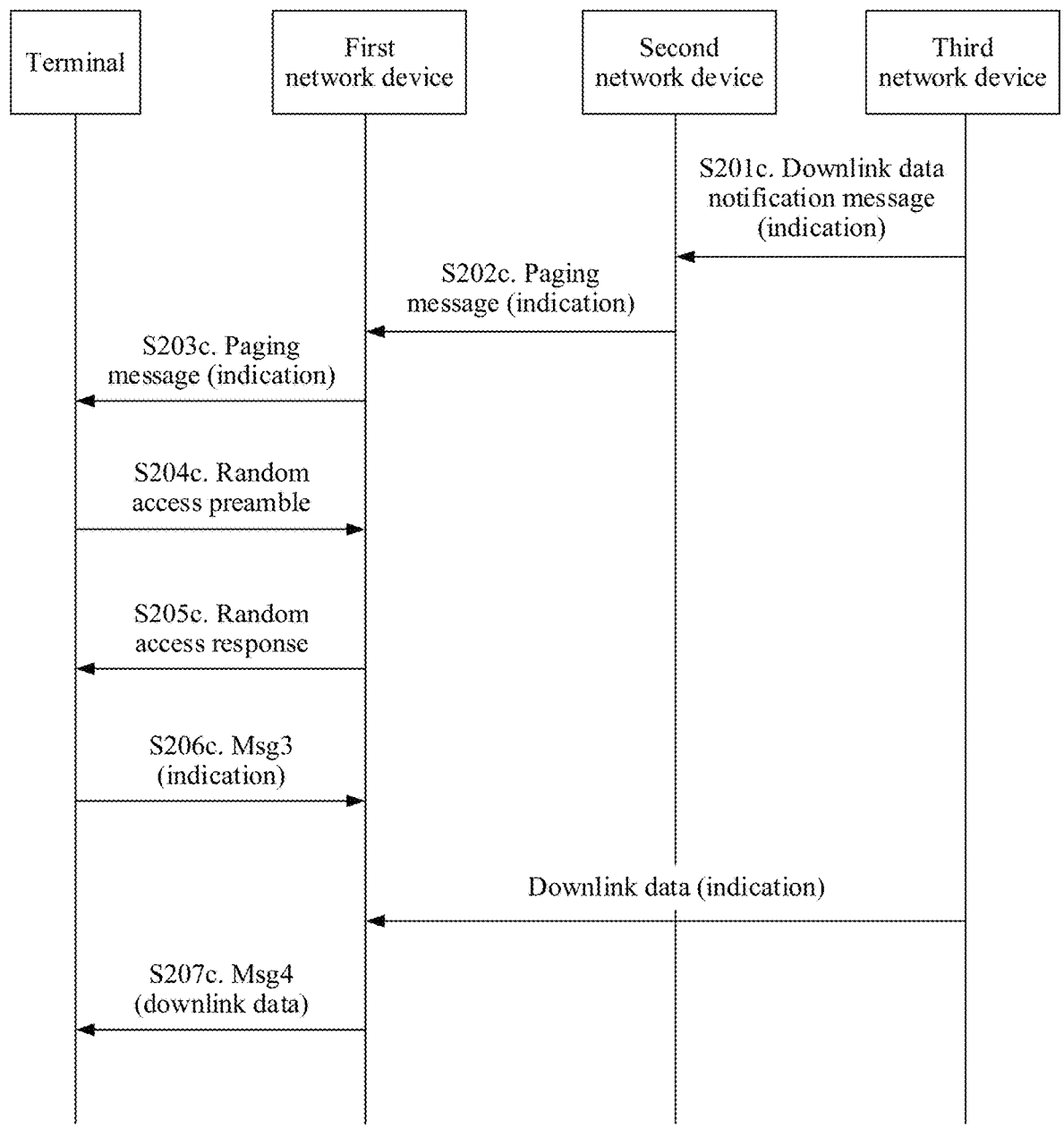
FIG. 2c is a schematic flowchart of a third method for early transmission of downlink data according to an embodiment of this application.

In another possible implementation, an indication may be sent to an access network device via both a core network device and a terminal. Specifically, as shown in FIG. 2c, a specific process of a third method for early transmission of downlink data provided in an embodiment of this application is described as follows.

S201c. A third network device sends a downlink data notification message to a second network device, and the second network device receives the downlink data notification message from the third network device.

The downlink data notification message carries an indication. For a meaning of the indication, refer to the foregoing description. The downlink data notification message may further carry an identifier of the terminal, for example, an S-TMSI.

S202c. The second network device sends a paging message to a first network device, and the first network device receives the paging message from the second network device.

The paging message carries an indication. Similarly, for a meaning of the indication, refer to the foregoing description. The paging message may further carry an identifier of the terminal, for example, an S-TMSI.

S203c. The first network device sends a paging message to the terminal, and the terminal receives the paging message sent by the first network device.

Optionally, the paging message sent in this step may also carry an indication. For a meaning of the indication, refer to the foregoing description.

S204c. The terminal sends a Msg1 to the first network device, and the first network device receives the Msg1 from the terminal. The Msg1 is a random access preamble.

S205c. The first network device sends a Msg2 to the terminal, and the terminal receives the Msg2 from the first network device.

The Msg2 is a random access response.

S206c. The terminal sends a Msg3 to the first network device, and the first network device receives the Msg3 from the terminal.

The Msg3 carries an indication. For a meaning indicated by the indication, refer to the foregoing description.

For example, the Msg3 may be an RRC connection resume request message, and is used to request to resume an RRC connection.

Optionally, a first RRC message may further carry a resume ID, a resume cause, and a short resume MAC-I.

The first network device receives the first RRC message, and determines, based on an indication, that transmission of downlink data of the terminal can be completed at one time. Therefore, in the subsequent S207c, a message 4 carries the downlink data of the terminal.

Optionally, a third network device sends downlink data to the terminal, and the terminal receives the downlink data from the third network device. An indication is carried in the downlink data, and a meaning of the indication is described above. For example, the indication may be carried in a header of a GTP-U protocol packet of a downlink data packet.

S207c. The first network device sends the Msg4 to the terminal, and the terminal receives the Msg4 from the first network device.

The Msg4 carries downlink data, and the downlink data is downlink data delivered by the third network device to the first network device. The message 4 may be an RRC message, for example, an RRC connection release message.

Other descriptions of this step are the same as those in S204a.

According to the third method for early transmission of downlink data, the first network device can send single downlink data to the terminal in a random access process based on the indications sent by the terminal and the core network device, and does not establish an RRC connection to the terminal. Therefore, the terminal can finish receiving downlink data in an idle state. This helps reduce resource consumption, signaling overheads, and power consumption of the terminal.

With reference to the first method for early transmission of downlink data, the second method for early transmission of downlink data, and the third method for early transmission of downlink data, the following describes several integrity protection and encryption/decryption methods in an early transmission process of downlink data by using examples. A method 1 to a method 5 that are illustrated are applicable to the foregoing three methods for early transmission of downlink data.

Method 1: Before sending a Msg4 to a terminal, a first network device resumes context information of the terminal. The context information of the terminal includes an NCC, which is denoted as a first NCC herein. The first network device derives a new key by using the first NCC, which is denoted as a first key and is represented by $K^1_{RRCenc}$. The context information of the terminal further includes an old key, which is denoted as a third key and is represented by $K^3_{RRCint}$. The first network device performs integrity protection on a second RRC message by using the third key, and encrypts downlink data by using the first key. The first network device adds the second RRC message that is integrity protected and the encrypted downlink data to the message 4, and sends the message 4 to the terminal.

On a terminal side, after receiving the Msg4 sent by the first network device, the terminal resumes the context information of the terminal. Similarly, the context information of the terminal includes the first NCC and the third key. The terminal derives the first key by using the first NCC, performs integrity protection verification on the received second RRC message by using the third key, and decrypts the received downlink data by using the first key.

Method 2: Before sending a Msg4 to a terminal, a first network device resumes context information of the terminal. The context information of the terminal includes a first NCC. The first network device derives a first key and a second key by using the first NCC, where the first key is represented by $K^1_{RRCenc}$, and the second key is represented by $K^2_{RRCint}$. The first network device performs integrity protection on a second RRC message by using the second key, and encrypts downlink data by using the first key. The first network device adds the second RRC message that is integrity protected and the encrypted downlink data to the Msg4, and sends the Msg4 to the terminal.

On a terminal side, after receiving the Msg4 sent by the first network device, the terminal resumes the context information of the terminal. Similarly, the context information of the terminal includes the first NCC. The terminal derives the first key and the second key by using the first NCC, performs integrity protection verification on the received second RRC message by using the second key, and decrypts the received downlink data by using the first key.

Method 3: Before sending a Msg4 to a terminal, a first network device resumes context information of the terminal. The context information of the terminal includes a first NCC. The first network device derives a first key, a second key, and a fourth key by using the first NCC. The second key is represented by $K^2_{RRCint}$, and the fourth key is represented by $K^4_{RRCenc}$. The first network device performs integrity protection on a second RRC message by using the second key, encrypts the second RRC message by using the fourth key, and encrypts downlink data by using the first key. The first network device adds the encrypted second RRC message that is integrity protected and the encrypted downlink data to the message 4, and sends the message 4 to the terminal.

On a terminal side, before sending a Msg3 to the first network device, the terminal resumes the context information of the terminal. The context information of the terminal includes the first NCC. The terminal derives the first key, the second key, and the fourth key by using the first NCC. The terminal receives the message 4, performs integrity protection verification and decryption on the second RRC message by using the second key and the fourth key, and decrypts the received downlink data by using the first key.

Method 4: Before sending a Msg4 to a terminal, a first network device resumes context information of the terminal. The context information of the terminal includes an old key, which is denoted as a third key. The first network device adds a second NCC to the Msg4 sent to the terminal, and derives a fifth key by using the second NCC. The fifth key is represented by KERRCenc. The first network device performs integrity protection on a second RRC message by using the third key, and encrypts downlink data by using the derived fifth key. The first network device adds the second RRC message that is integrity protected and the encrypted downlink data to the message 4, and sends the message 4 to the terminal.

On a terminal side, before sending a Msg3 to the first network device, the terminal resumes the context information of the terminal. The context information of the terminal includes an old key, which is denoted as the third key. The terminal receives the message 4, and performs integrity protection verification on the second RRC message by using the third key. The message 4 carries the second NCC. The terminal derives the fifth key by using the second NCC, and decrypts the downlink data by using the fifth key.

Method 5: Before sending a Msg4) to a terminal, a first network device resumes context information of the terminal. The first network device adds a second NCC to the Msg4 sent to the terminal. The first network device derives a fifth key and a sixth key by using the second NCC. The sixth key is represented by $K^6_{RRCint}$. The first network device performs integrity protection on a second RRC message by using the derived sixth key, and encrypts downlink data by using the derived fifth key. The first network device adds the second RRC message that is integrity protected and the encrypted downlink data to the Msg4, and sends the Msg4 to the terminal.

On a terminal side, before sending a Msg3 to the first network device, the terminal resumes the context information of the terminal. The terminal receives the Msg4, and the Msg4 carries the second NCC. The terminal derives the fifth key and the sixth key by using the second NCC, performs integrity protection verification on the second RRC message by using the sixth key, and decrypts the downlink data by using the fifth key.

Figure 3A:
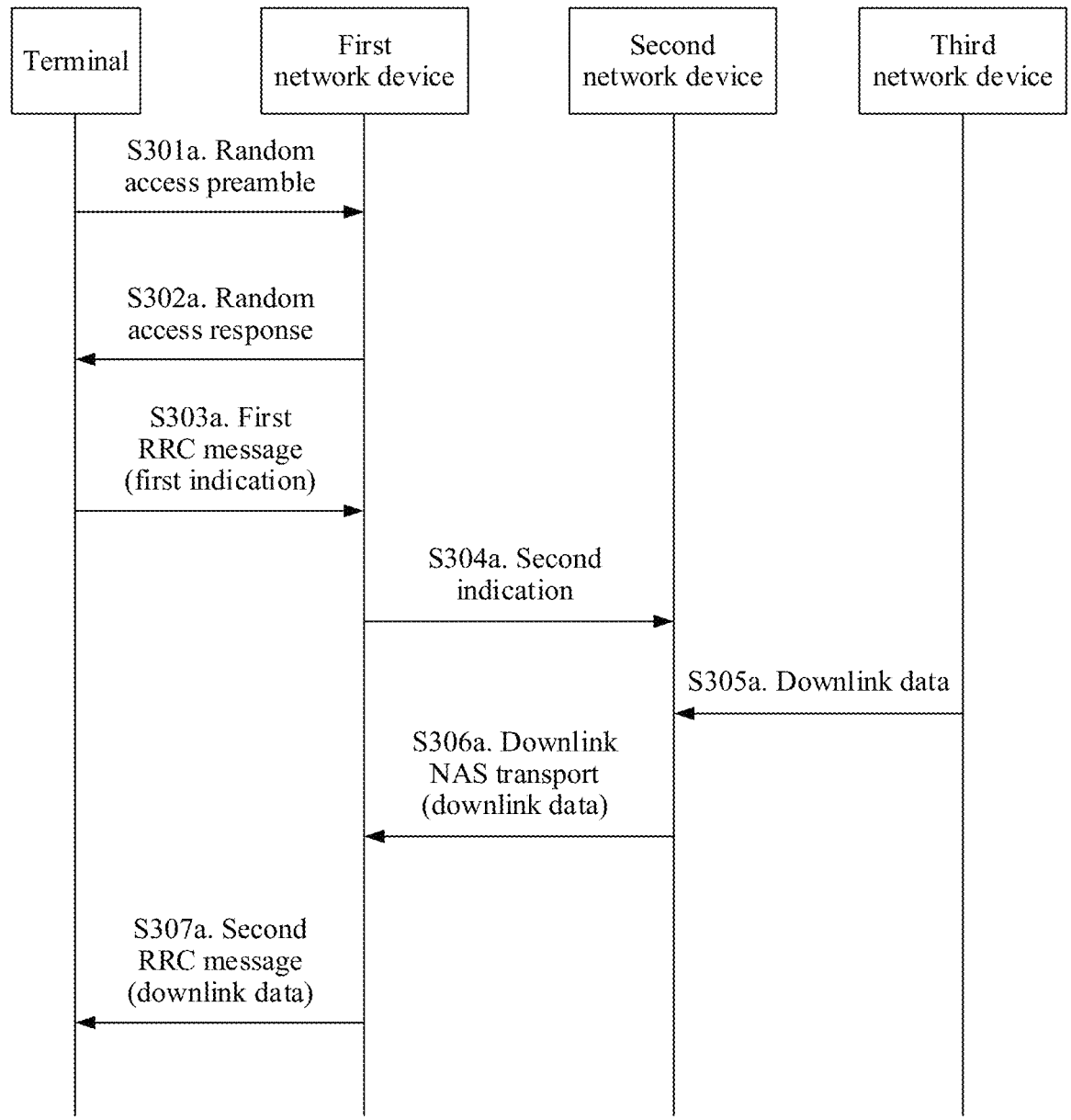
FIG. 3a is a schematic flowchart of a fourth method for early transmission of downlink data according to an embodiment of this application.

As shown in FIG. 3a, a specific process of a fourth method for early transmission of downlink data provided in an embodiment of this application is described as follows.

S301a. A terminal sends a Msg1 to a first network device, and the first network device receives the Msg1 from the terminal. The Msg1 is a random access preamble.

Before S301a, the terminal receives a paging message sent by the first network device.

S302a. The first network device sends a Msg2 to the terminal, and the terminal receives the Msg2 from the first network device.

The Msg2 is a random access response.

S303a. The terminal sends a first RRC message to the first network device, and the first network device receives the first RRC message from the terminal.

The first RRC message carries an indication, which is denoted as a first indication. For a meaning indicated by the first indication, refer to the foregoing description.

S304a. The first network device sends a second indication to a second network device, and the second network device receives the second indication from the first network device.

For a meaning indicated by the second indication, refer to the foregoing description.

For example, the second indication may be carried in a terminal initialization message (Initial UE Message). In this step, the first network device sends the terminal initialization message to the second network device, and the second network device receives the terminal initialization message from the first network device, where the terminal initialization message carries the second indication.

S305a. A third network device sends downlink data to the second network device, and the second network device receives the downlink data sent by the third network device.

S306a. The second network device encapsulates the downlink data into a NAS message, the second network device sends the downlink data to the first network device through downlink NAS transport, and the first network device receives the downlink NAS message sent by the second network device.

S307a. The first network device sends a second RRC message to the terminal, and the terminal receives the second RRC message from the first network device.

The second RRC message carries the downlink data.

Specifically, if the first network device determines, based on the indication in S303a, that transmission of the downlink data of the terminal can be completed at one time, the first network device encapsulates, into the second RRC message, the received downlink NAS message including the downlink data of the terminal, and sends the second RRC message to the terminal.

For example, the following describes possible functions or meanings of the first RRC message and the second RRC message that are described above in the fourth method for early transmission of downlink data.

The first RRC message is an RRC early data request message, and is used to request early transmission of uplink data. The RRC early data request message carries a first indication. A meaning of the first indication may be a single packet or single DL data, or may be indicated by using a dedicated Info NAS. The dedicated Info NAS is originally used to carry uplink data for early transmission. In an early transmission scenario of downlink data, it is assumed that the terminal does not have uplink data. In this case, the RRC early data request message is used to notify early transmission of the downlink data. Therefore, the dedicated Info NAS may be set to null to indicate that no uplink data is carried, and further indicate early transmission of the downlink data. The second RRC message is an RRC early data complete message, and is used to carry downlink data for early transmission.

Alternatively, the first RRC message is an RRC connection request message, and is used to request to establish an RRC connection. The RRC connection request message carries a first indication. For a function of the first indication and a meaning indicated by the first indication, refer to the foregoing description. The second RRC message is an RRC early data complete message, and is used to carry downlink data for early transmission.

Alternatively, the first RRC message is an RRC connection request message, and is used to request to establish an RRC connection. The RRC connection request message carries a first indication. For a function of the first indication and a meaning indicated by the first indication, refer to the foregoing description. The second RRC message is an RRC connection release message, is used to indicate to release an RRC connection, and is used to carry downlink data for early transmission.

According to the fourth method for early transmission of downlink data, the second network device can encapsulate the downlink data of the terminal into the NAS message based on the indication sent by the terminal, and send the NAS message to the terminal via the first network device, and does not need to establish an RRC connection to the terminal. Therefore, the terminal can finish receiving downlink data in an idle state. This helps reduce resource consumption, signaling overheads, and power consumption of the terminal.

Figure 3B:
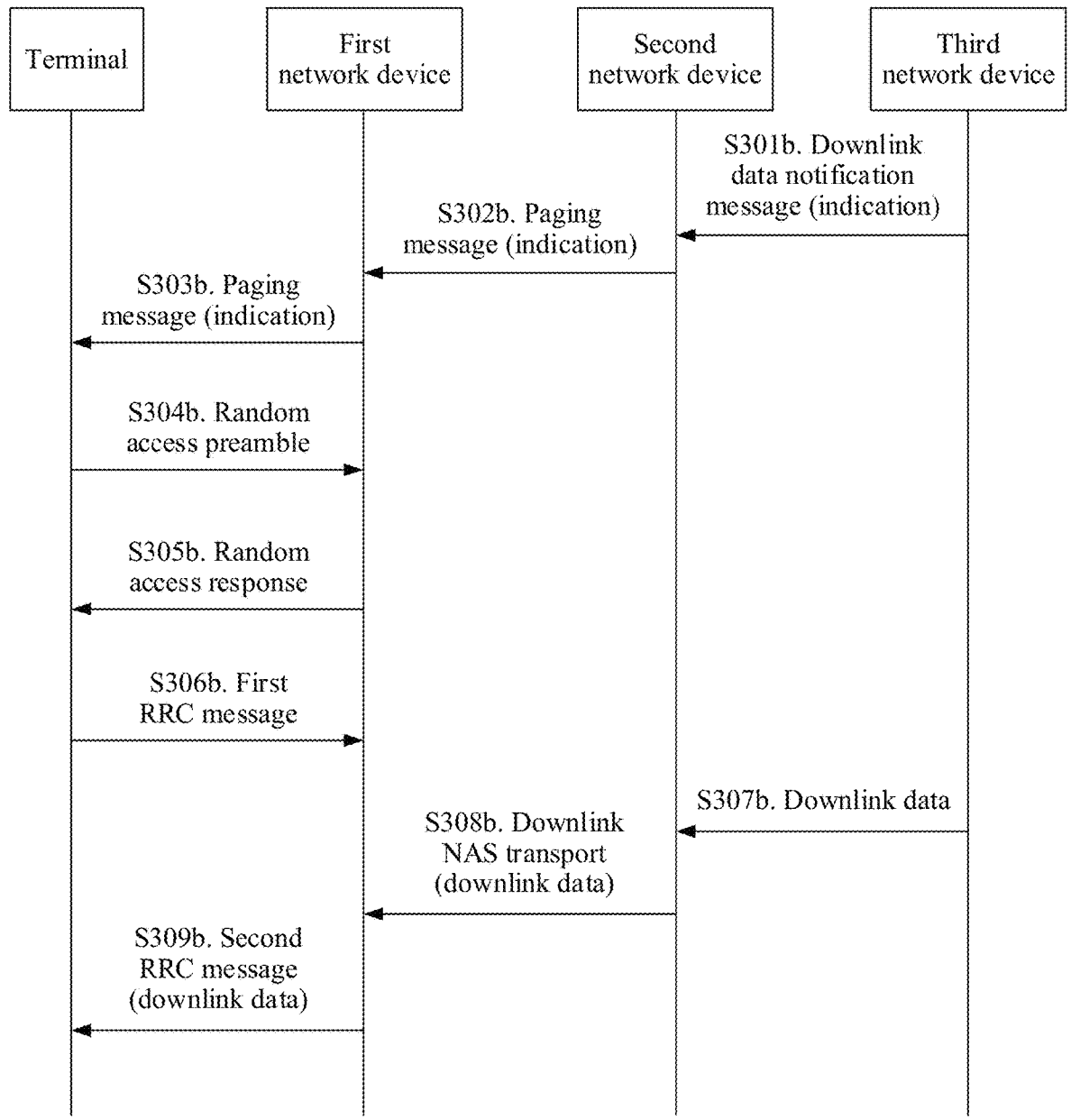
FIG. 3b is a schematic flowchart of a fifth method for early transmission of downlink data according to an embodiment of this application.

In a possible implementation, an indication may further be sent to a second network device via a third network device. Specifically, as shown in FIG. 3b, a specific process of a fifth method for early transmission of downlink data provided in an embodiment of this application is described as follows.

S301b. A third network device sends a downlink data notification message to a second network device, and the second network device receives the downlink data notification message from the third network device.

The downlink data notification message carries an indication. For a meaning of the indication, refer to the foregoing description. The downlink data notification message may further carry an identifier of a terminal, for example, an S-TMSI.

S302b. The second network device sends a paging message to a first network device, and the first network device receives the paging message from the second network device.

The paging message carries an indication. Similarly, for a meaning of the indication, refer to the foregoing description. The paging message may further carry an identifier of the terminal, for example, an S-TMSI.

S303b. The first network device sends a paging message to the terminal, and the terminal receives the paging message sent by the first network device.

Optionally, the paging message sent in this step may also carry an indication. For a meaning of the indication, refer to the foregoing description.

S304b. The terminal sends a Msg1 to the first network device, and the first network device receives the Msg1 from the terminal. The Msg1 is a random access preamble.

S305b. The first network device sends a Msg2 to the terminal, and the terminal receives the Msg2 from the first network device.

The Msg2 is a random access response.

S306b. The terminal sends a first RRC message to the first network device, and the first network device receives the first RRC message from the terminal.

S307b. The third network device sends downlink data to the second network device, and the second network device receives the downlink data sent by the third network device.

S308b. The second network device encapsulates the downlink data into a NAS message, the second network device sends the downlink data to the first network device through downlink NAS transport, and the first network device receives the downlink NAS message sent by the second network device.

Specifically, if the second network device determines, based on the indication, that transmission of the downlink data of the terminal can be completed at one time, the second network device encapsulates the downlink data into the NAS message, and sends the NAS message to the first network device.

S309b. The first network device sends a second RRC message to the terminal, and the terminal receives the second RRC message from the first network device.

The second RRC message carries the downlink data.

Specifically, if the first network device determines, based on the indication in S302b or S306b, that transmission of the downlink data of the terminal can be completed at one time, the first network device encapsulates, into the second RRC message, the received NAS message including the downlink data of the terminal, and sends the second RRC message to the terminal.

According to the fifth method for early transmission of downlink data, the second network device can encapsulate the downlink data of the terminal into the NAS message based on the indication sent by the third network device, and send the NAS message to the terminal via the first network device, and does not need to establish an RRC connection to the terminal. Therefore, the terminal can finish receiving downlink data in an idle state. This helps reduce resource consumption, signaling overheads, and power consumption of the terminal.

Figure 3C:
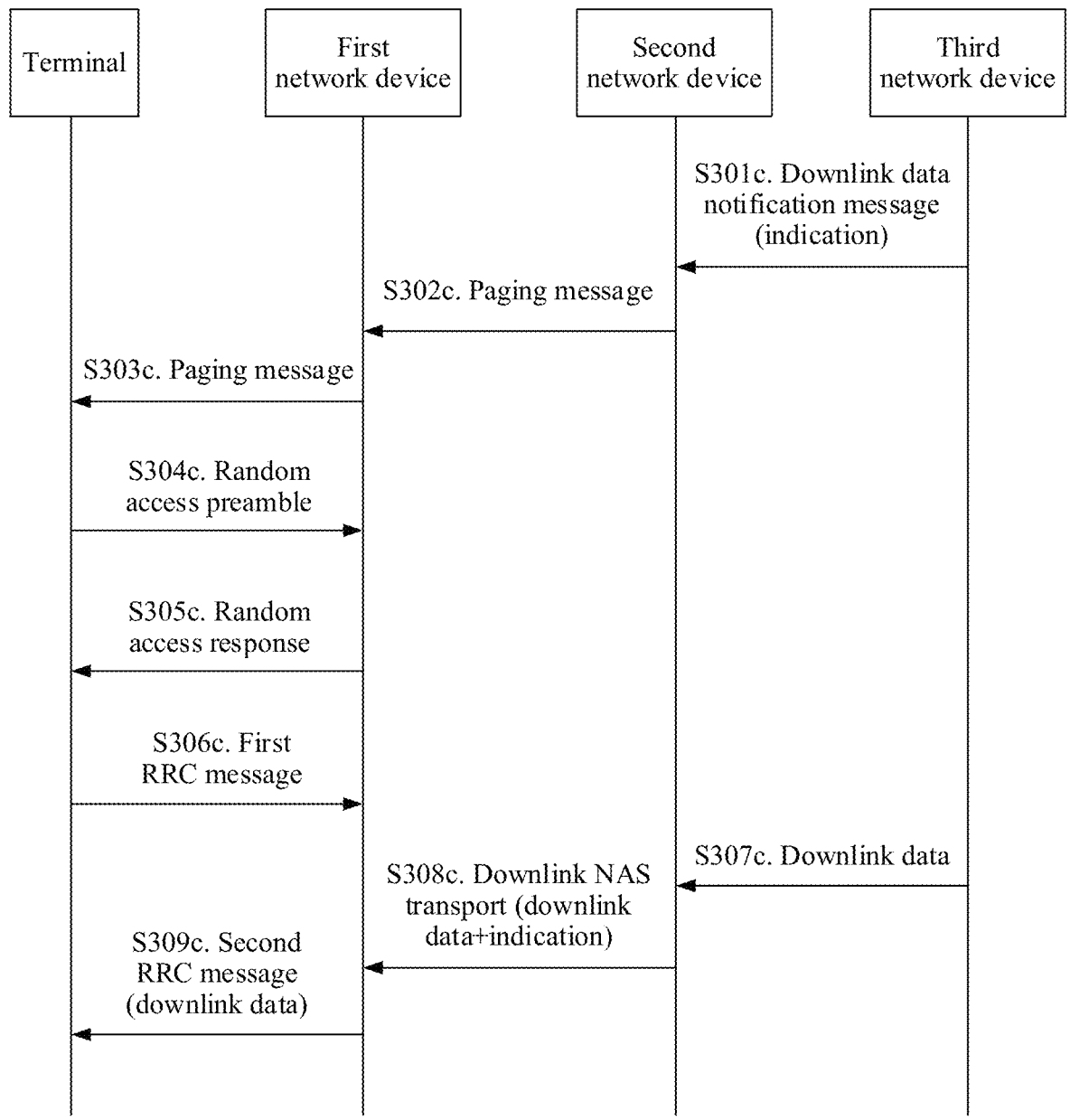
FIG. 3c is a schematic flowchart of a sixth method for early transmission of downlink data according to an embodiment of this application.

In another possible implementation, a third network device may further send an indication to a second network device in the following manner. As shown in FIG. 3c, a specific process of a sixth method for early transmission of downlink data provided in an embodiment of this application is described as follows.

S301c. A third network device sends a downlink data notification message to a second network device, and the second network device receives the downlink data notification message from the third network device.

The downlink data notification message carries an indication. For a meaning of the indication, refer to the foregoing description. The downlink data notification message may further carry an identifier of a terminal, for example, an S-TMSI.

S302c. The second network device sends a paging message to a first network device, and the first network device receives the paging message from the second network device.

The paging message may further carry an identifier of the terminal, for example, an S-TMSI.

S303c. The first network device sends a paging message to the terminal, and the terminal receives the paging message sent by the first network device.

S304c. The terminal sends a Msg1 to the first network device, and the first network device receives the Msg1 from the terminal. The message 1 is a random access preamble.

S305c. The first network device sends a Msg2 to the terminal, and the terminal receives the Msg2 from the first network device.

The Msg2 is a random access response.

S306c. The terminal sends a first RRC message to the first network device, and the first network device receives the first RRC message from the terminal.

S307c. The third network device sends downlink data to the second network device, and the second network device receives the downlink data sent by the third network device.

S308c. The second network device encapsulates the downlink data into a NAS message, the second network device sends the downlink data to the first network device through downlink NAS transport, and the first network device receives the downlink NAS message sent by the second network device. The NAS message further carries an indication. For a meaning of the indication, refer to the foregoing description.

S309c. The first network device sends a second RRC message to the terminal, and the terminal receives the second RRC message from the first network device.

The second RRC message carries the downlink data.

Specifically, the first network device encapsulates the received NAS message into the second RRC message, and sends the second RRC message to the terminal.

According to the sixth method for early transmission of downlink data, the second network device can encapsulate the downlink data of the terminal into the NAS message based on the indication sent by the third network device, and send the NAS message to the terminal via the first network device, and does not need to establish an RRC connection to the terminal. Therefore, the terminal can finish receiving downlink data in an idle state. This helps reduce resource consumption, signaling overheads, and power consumption of the terminal.

Figure 3D:
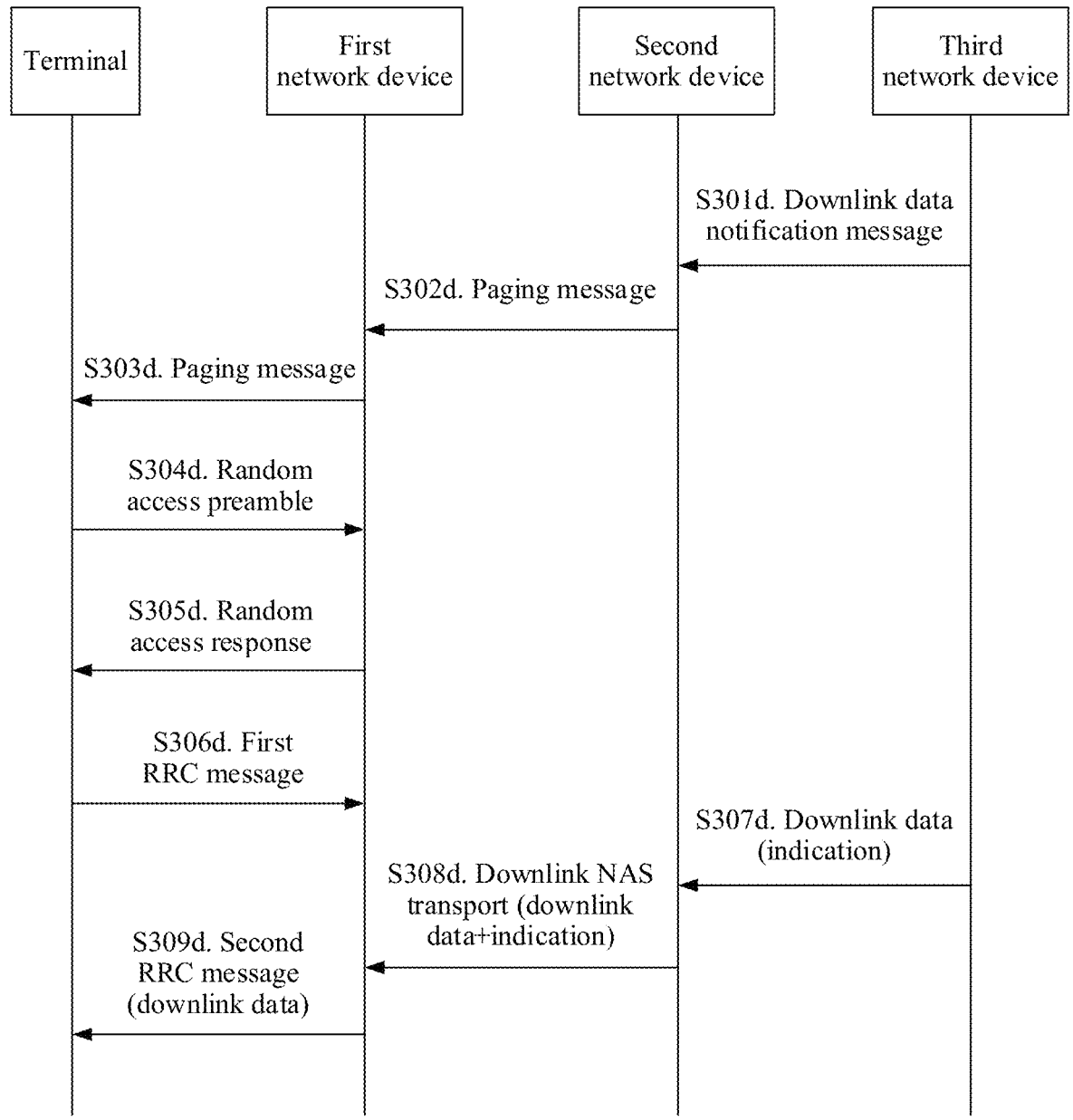
FIG. 3d is a schematic flowchart of a seventh method for early transmission of downlink data according to an embodiment of this application.

In another possible implementation, a third network device may further send an indication to a second network device in the following manner. As shown in FIG. 3d, a specific process of a seventh method for early transmission of downlink data provided in an embodiment of this application is described as follows.

S301d. A third network device sends a downlink data notification message to a second network device, and the second network device receives the downlink data notification message from the third network device.

The downlink data notification message may further carry an identifier of a terminal, for example, an S-TMSI.

S302d. The second network device sends a paging message to a first network device, and the first network device receives the paging message from the second network device.

The paging message may further carry an identifier of the terminal, for example, an S-TMSI.

S303d. The first network device sends a paging message to the terminal, and the terminal receives the paging message sent by the first network device.

S304d. The terminal sends a Msg1 to the first network device, and the first network device receives the message 1 (Msg1 from the terminal. The Msg1 is a random access preamble.

S305d. The first network device sends a Msg2 to the terminal, and the terminal receives the Msg2 from the first network device.

The Msg2 is a random access response.

S306d. The terminal sends a first RRC message to the first network device, and the first network device receives the first RRC message from the terminal.

S307d. The third network device sends downlink data to the second network device, and the second network device receives the downlink data sent by the third network device.

The downlink data carries an indication. For a meaning of the indication, refer to the foregoing description.

S308d. The second network device encapsulates the downlink data into a NAS message, the second network device sends the downlink data to the first network device through downlink NAS transport, and the first network device receives the downlink NAS message sent by the second network device. The NAS message further carries an indication. For a meaning of the indication, refer to the foregoing description.

S309d. The first network device sends a second RRC message to the terminal, and the terminal receives the second RRC message from the first network device.

The second RRC message carries the downlink data.

Specifically, the first network device encapsulates the received NAS message into the second RRC message, and sends the second RRC message to the terminal.

According to the seventh method for early transmission of downlink data, the second network device can encapsulate the downlink data of the terminal into the NAS message based on the indication sent by the third network device, and send the NAS message to the terminal via the first network device, and does not need to establish an RRC connection to the terminal. Therefore, the terminal can finish receiving downlink data in an idle state. This helps reduce resource consumption, signaling overheads, and power consumption of the terminal.

With reference to the fifth method for early transmission of downlink data, the sixth method for early transmission of downlink data, and the seventh method for early transmission of downlink data, the following describes possible functions or meanings of the first RRC message and the second RRC message by using examples. The following description is applicable to the three methods for early transmission of downlink data.

The first RRC message is an RRC early data request message, and is used to request early transmission of uplink data. The RRC early data request message may carry a dedicated Info NAS. The dedicated Info NAS is originally used to carry uplink data for early transmission. In an early transmission scenario of downlink data, it is assumed that the terminal does not have uplink data. In this case, the dedicated Info NAS may be set to null to indicate that no uplink data is carried. The second RRC message is an RRC early data complete message, and is used to carry downlink data for early transmission.

Alternatively, the first RRC message is an RRC connection request message, and is used to request to establish an RRC connection. The second RRC message is an RRC early data complete message, and is used to carry downlink data for early transmission.

Alternatively, the first RRC message is an RRC connection request message, and is used to request to establish an RRC connection. The second RRC message is an RRC connection release message, is used to indicate to release an RRC connection, and is used to carry downlink data for early transmission.

Based on the foregoing description, the following further describes, in detail with reference to several specific application scenarios, the method for early transmission of downlink data provided in the embodiments of this application. In the following examples, descriptions are provided by using an example in which the first network device (that is, the access network device) is a base station, the second network device (that is, the first core network device) is an MME, and the third core network device (that is, the second core network device) is an S-GW.

In the following several application scenarios, before the following steps are performed, a terminal is in a suspended state. Specifically, when the base station determines that the terminal does not have uplink and downlink data, the base station requests the MME to suspend the terminal, to be specific, the base station releases an RRC connection to the terminal, but does not release context information of the terminal. When the base station receives an acknowledgment response from the MME, that is, the terminal is allowed to be suspended, the base station sends an RRC connection release message to the terminal, and indicates, in the RRC connection release message, to suspend the terminal. After receiving the RRC connection release message, the terminal stores configuration information configured by the base station for the terminal. In this case, the terminal is in an idle state. When a network side has downlink data of the terminal, early transmission of downlink data is performed through the following process.

Figure 4A:
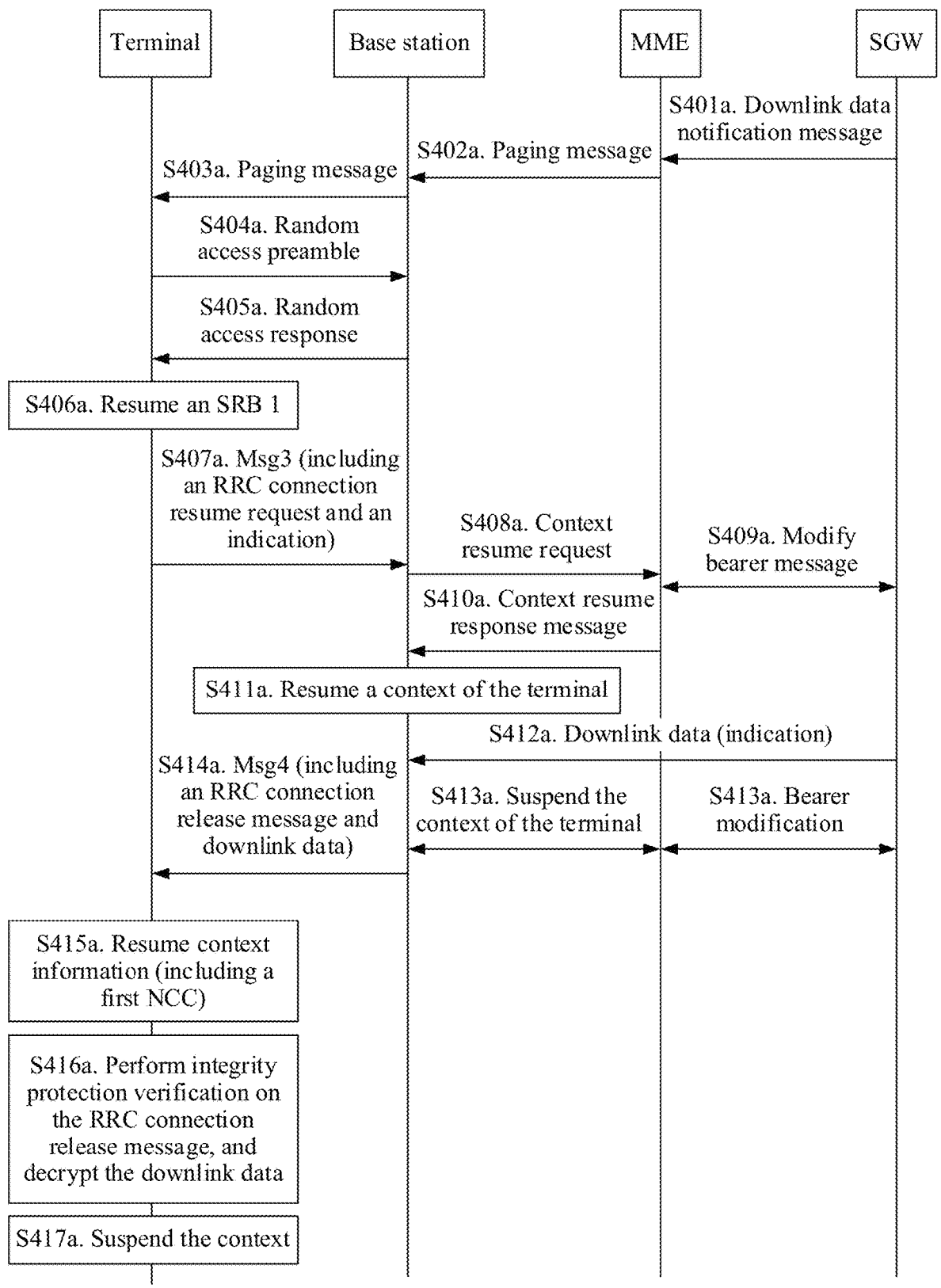
FIG. 4a is a schematic flowchart of a first implementation of a method for early transmission of downlink data according to an embodiment of this application.

FIG. 4a shows a first implementation of a method for early transmission of downlink data according to an embodiment of this application. The first implementation is based on the description of the first method for early transmission of downlink data shown in FIG. 2a. The following describes the first implementation in detail.

S401a. An S-GW sends a downlink data notification message to an MME, and the MME receives the downlink data notification message sent by the S-GW.

Specifically, when downlink data of a terminal arrives at the S-GW on a core network side, sending of the downlink data notification message is triggered. The downlink data notification message carries an identity of the terminal. For example, the identity is an EPS system temporary mobile subscriber identity (EPS TMSI, S-TMSI), where EPS represents evolved packet system.

S402a. After receiving the downlink data notification message sent by the S-GW, the MME sends a paging message to a base station, and the base station receives the paging message sent by the MME. The paging message is used to indicate the base station to page the terminal.

S403a. After receiving the paging message sent by the MME, the base station sends the paging message in a broadcast manner.

A terminal in an idle state periodically listens to a paging message. When the terminal listens and obtains the paging message sent by the base station and determines that the paging message carries the identity of the terminal, the terminal triggers the following step:

S404a. The terminal sends a random access preamble to the base station, and the base station receives the random access preamble sent by the terminal.

The base station broadcasts several random access preambles to all terminals by using a broadcast message. The terminal randomly selects one random access preamble from the several random access preambles broadcast by the base station, randomly selects one resource from resources that are broadcast by the base station and that are used to send the random access preambles, and sends the selected random access preamble on the selected resource.

S405a. The base station sends a random access response RAR) to the terminal, and the terminal receives the random access response sent by the base station.

Specifically, the base station listens, on a resource of the random access preamble, to the random access preamble sent by the terminal, and sends the RAR to the terminal when detecting a random access preamble. The RAR includes a timing advance (TA) for sending an Msg3 by the terminal and an uplink resource (UL grant) for sending the Msg3 by the terminal.

S406a. The terminal resumes a signaling radio bearer (SRB)

Specifically, the terminal resumes an SRB 1, where the SRB 1 is used to send and receive an RRC message, and is used to receive a NAS message before an SRB 2 is established.

S407a. The terminal sends the Msg3 to the base station, and the base station receives the Msg3 sent by the terminal.

The Msg3 may be an RRC connection resume request message. Optionally, the Msg3 further includes an indication. For a meaning of the indication, refer to the foregoing descriptions in Example 1 to Example 7.

Optionally, the RRC connection resume request message further carries the following information: a resume ID, a resume cause, and a short resume MAC-I. The resume ID is used to identify a suspended terminal, that is, used to identify the terminal sending the RRC connection resume request message. The resume cause is used to indicate a reason why the terminal resumes a connection. For example, a value of the resume cause is mobile terminating-access (mt-Access) or a newly added value. The newly added value is used to indicate that the reason for resuming the connection is transmitting single downlink data. The short resume MAC-I is used to perform integrity protection on the Msg3 to prevent the Msg3 from being tampered with.

S408a. The base station sends a terminal context resume request (UE context resume request) message to the MME based on the indication received in S407, and the MME receives the terminal context resume request message sent by the base station.

The terminal context resume request message is used to request to resume context information of the terminal.

S409a. The MME exchanges a modify bearer (modify bearer) message with the S-GW.

S410a. The MME sends a UE context resume response message to the base station, and the base station receives the context resume response message sent by the MME.

S411a. After receiving the context resume response message sent by the MME, the base station resumes the context information of the terminal, where the context information of the terminal includes an NCC, which is denoted as a first NCC herein, and the first NCC may be from a Msg4 received by the terminal last time. The base station derives a new key by using the first NCC. The new key is denoted as a first key and is represented by $K^1_{RRCenc}$. The first key is used to encrypt the downlink data. The context information of the terminal further includes an old key, which is denoted as a third key and is represented by $K^3_{RRCint}$. The third key is used to perform integrity protection on an RRC connection release message.

The base station may further derive a second key and a fourth key by using the first NCC. The second key is represented by $K^2_{RRCint}$, and the fourth key is represented by $K^4_{RRCenc}$. The second key is used to perform integrity protection on the RRC connection release message, and the fourth key is used to encrypt the RRC connection release message.

S412a. The S-GW sends the downlink data to the base station, and the base station receives the downlink data sent by the S-GW.

Based on the feature of a single service of a terminal, there is only one downlink data packet by default.

Optionally, in this step, the downlink data sent by the S-GW to the base station carries an indication. For a meaning indicated by the indication, refer to the foregoing description. Specifically, the indication is carried in a header of a GTP-U protocol packet of the downlink data packet.

It should be noted that there is no strict execution sequence between S410a and S412a. The S-GW may perform this step after performing S409a.

S413a. The base station exchanges a terminal context suspend message with the MME, and the MME exchanges a modify bearer message with the S-GW.

Specifically, the base station initiates, based on the indication received in S407a or S412a, the process of suspending the context of the terminal and the process of exchanging the modify bearer message.

S414a. The base station sends a Msg4 to the terminal, and the terminal receives the Msg4 sent by the base station.

The Msg4 includes the downlink data of the terminal, and further includes the RRC connection release message. The base station encapsulates the RRC connection release message and the downlink data into Msg4 and sends the message to the terminal. The terminal receives the message sent by the base station, and obtains the RRC connection release message and the downlink data.

The base station may perform integrity protection and encryption by using the method 1. Specifically, the base station performs integrity protection on the RRC connection release message by using the third key, encrypts the downlink data by using the first key, adds the RRC connection release message that is integrity protected and the encrypted downlink data to the message 4, and sends the Msg4 to the terminal.

Alternatively, the base station may perform integrity protection and encryption by using the method 2. Specifically, the base station performs integrity protection on the RRC connection release message by using the second key, encrypts the downlink data by using the first key, adds the encrypted RRC connection release message that is integrity protected and the encrypted downlink data to the Msg4, and sends the Msg4 to the terminal.

The base station determines early transmission of the downlink data based on the received indication, or determines that the downlink data to be sent to the terminal may be carried in one TB. Therefore, the terminal does not need to enter an RRC connected state. The base station adds the downlink data to the RRC connection release message sent to the terminal.

The base station may determine, by using but not limited to the following two methods, that the downlink data to be sent to the terminal may be sent to the terminal at one time (that is, the downlink data may be sent to the terminal by being carried in one TB). It should be noted that the descriptions in this part may be applicable to all the foregoing methods for early transmission of downlink data. The base station is the first network device in the foregoing embodiments. The first network device may also determine, by using the method, that the downlink data to be sent to the terminal may be sent to the terminal at one time. In this way, the downlink data is sent to the terminal by using one message.

In a first method, the base station may determine, based on the indication that is sent by the S-GW and that is received in S411 or the indication that is sent by the terminal and that is received in S407, that the downlink data may be sent to the terminal at one time, so as to send the RRC connection release message to the terminal.

In a second method, the base station starts a timer when receiving the downlink data sent by the S-GW in S412a. If the base station has not received downlink data again when the timer expires, the base station determines that the downlink data delivered by the S-GW to the terminal this time includes only one downlink data packet, and determines that downlink data may be sent to the terminal at one time. Alternatively, if the base station has received a plurality of downlink data packets before the timer expires, the base station determines that the plurality of downlink data packets may be sent to the terminal by using one TB. In addition, the downlink data received by the base station carries an indication, and the indication is used to indicate that the terminal does not have an uplink response message or uplink data after receiving the downlink data. In these cases, the terminal does not need to enter the connected mode. Therefore, the base station sends the RRC connection release message to the terminal.

In this step, the RRC connection release message carries a resume ID and a release cause. Optionally, the RRC connection release message may further carry an NCC. The terminal receives the RRC connection release message by using the SRB 1 resumed in S406a.

The resume ID is used to identify the suspended terminal, that is, the terminal that sends the RRC connection resume request message in S407. The resume ID is the same as the resume ID in the RRC connection resume request message in S407a. The release cause is used to indicate a reason for releasing a context of the terminal. For example, a value of the release cause may be RRC suspend (or rrc-suspend). The terminal stores the NCC carried in the RRC connection release message, and the NCC may be used for next early transmission of uplink data and/or downlink data.

S415a. The terminal resumes the context information.

Specifically, the context information resumed by the terminal includes an old key and the first NCC. Similarly, the old key may be denoted as a third key. In the method 1, the third key may be used to perform integrity protection verification on the RRC connection release message, the first NCC may be used to derive the first key, and the first key is used to decrypt the downlink data. The context information resumed by the terminal may further include an SRB 2 and a data radio bearer (DRB). The first NCC may be from the Msg4 received by the terminal last time.

Alternatively, the first NCC may be used to derive the first key, and the first key is used to decrypt the downlink data and may be further used to derive the second key. The second key is used to perform integrity protection verification on the RRC connection release message.

The terminal sends the RRC connection resume request message to the base station, and receives the RRC connection release message and the downlink data that are returned by the base station. In this case, the terminal determines that there is only one downlink data packet, and resumes the context information. The SRB2 is used to carry an RRC message and a NAS message.

S416a. The terminal performs integrity protection verification on the RRC connection release message, and decrypts the downlink data.

Specifically, if the method 1 is used, the terminal performs integrity protection verification on the RRC connection release message by using the third key resumed in S414a, and decrypts the downlink data by using the first key.

If the method 2 is used, the terminal performs integrity protection verification on the RRC connection release message by using the second key derived in S414a, and decrypts the downlink data by using the first key.

It should be noted that the base station and the terminal use the same encryption/decryption and integrity protection method.

S417a. The terminal suspends the context information and enters an idle state.

Specifically, the terminal suspends a bearer configuration and a security configuration. For example, the terminal suspends an SRB, a DRB, and a security context.

In the first implementation of the method for early transmission of downlink data, the terminal sends a downlink data early transmission indication to the access network device (that is, the base station), and the base station may send the downlink data together with the RRC message to the terminal. For example, the RRC message may be an RRC connection release message. A terminal that has only one downlink data packet may not need to enter the connected state, and can finish receiving the downlink data in the idle state. This helps reduce resource consumption, signaling overheads, and power consumption of the terminal.

Figure 4B:
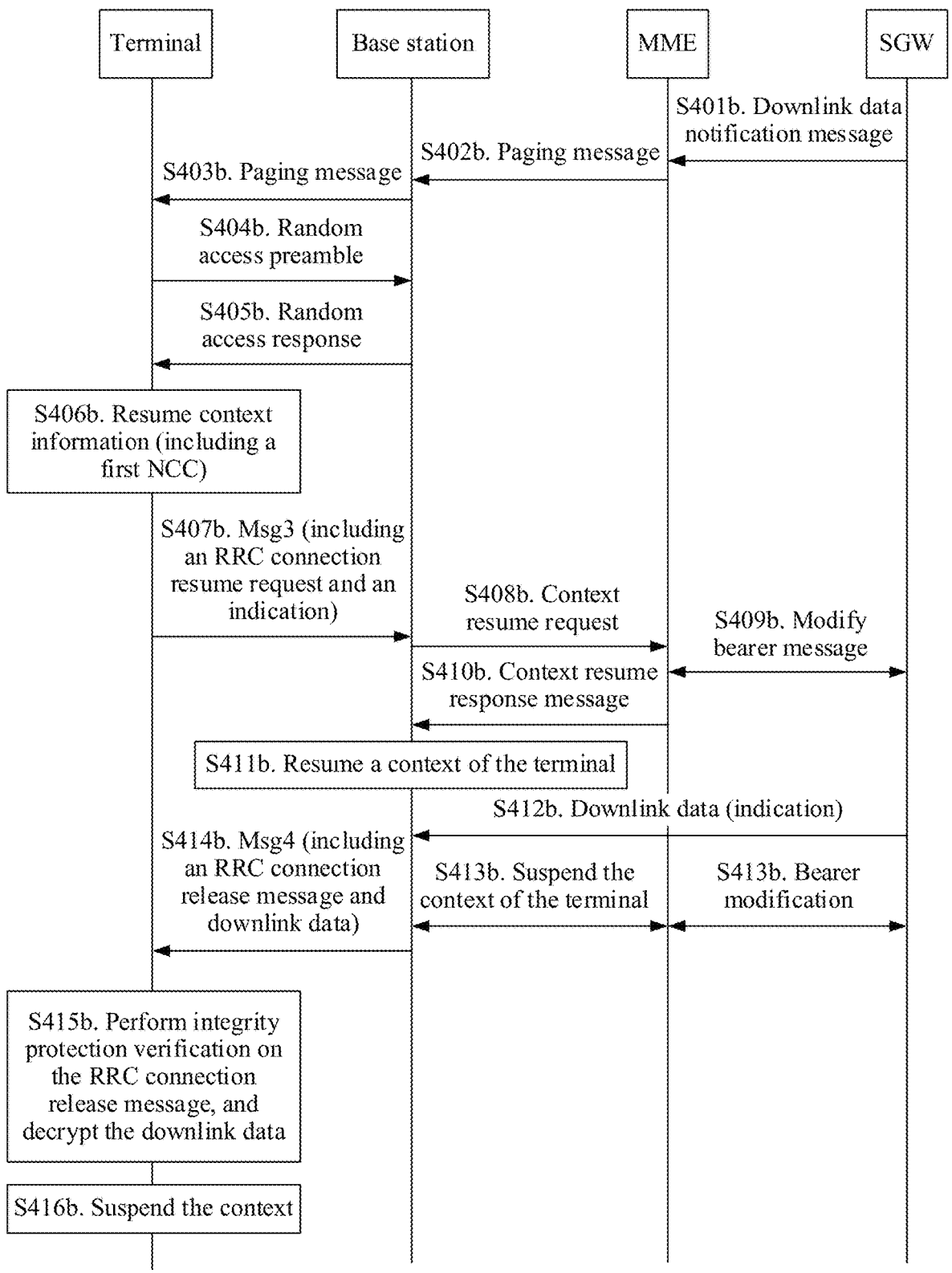
FIG. 4b is a schematic flowchart of a second implementation of a method for early transmission of downlink data according to an embodiment of this application.

FIG. 4b shows a second implementation of a method for early transmission of downlink data according to an embodiment of this application. The second implementation is based on the description of the first method for early transmission of downlink data shown in FIG. 2a. The following describes the second implementation in detail.

Steps S401b to S405b are the same as steps S401a to S405a. For details, refer to the foregoing descriptions of the steps. Details are not described herein again.

S406b. A terminal resumes context information.

Specifically, the context information resumed by the terminal includes at least a first NCC, and the first NCC is used to derive a first key, a second key, and a fourth key. The first key is used to decrypt downlink data, the second key is used to perform integrity protection verification on an RRC connection release message, and the fourth key is used to decrypt the RRC connection release message.

Optionally, the context information resumed by the terminal may further include an SRB 1, an SRB 2, and a DRB, where the SRB 1 is used to send and receive an RRC message, and is used to receive a NAS message before the SRB 2 is established.

Steps S407b to S410b are the same as steps S407b to S410b. For details, refer to the foregoing descriptions of the steps. Details are not described herein again.

S411b. After receiving a context resume response message sent by an MME, a base station resumes the context information of the terminal.

Specifically, the context information of the terminal resumed by the base station includes the first NCC. The base station derives a new first key, a new second key, and a new fourth key by using the first NCC. The second key is used to perform integrity protection on the RRC connection release message, and the fourth key is used to encrypt the RRC connection release message.

Steps S412b and S413b are the same as steps S412a and S413a. For details, refer to the foregoing descriptions of the steps. Details are not described herein again.

S414b. The base station sends a Msg4 to the terminal, and the terminal receives the Msg4 sent by the base station.

The Msg4 includes the downlink data of the terminal, and further includes the RRC connection release message.

Specifically, a difference between this step and S414a lies in that processes in which the base station performs integrity protection and encryption on the message 4 are different. The base station encrypts the downlink data by using the first key, performs integrity protection on the RRC connection release message by using the second key, encrypts the RRC connection release message by using the fourth key, adds the encrypted RRC connection release message that is integrity protected and the encrypted downlink data to the message 4, and sends the message 4 to the terminal.

Other descriptions of this step are the same as those of S414a. For details, refer to S414a.

S415b. The terminal performs integrity protection verification on the RRC connection release message, and decrypts the downlink data.

Specifically, the terminal performs integrity protection verification on the RRC connection release message by using the second key, decrypts the RRC connection release message by using the derived fourth key, and decrypts the downlink data by using the first key.

If the terminal does not resume the SRB 2 and the DRB in S406b, the terminal may resume the SRB 2 and the DRB after receiving the Msg4.

S416b is the same as S417a.

In the second implementation of the method for early transmission of downlink data, the terminal sends a downlink data early transmission indication to the access network device (that is, the base station), and the base station may send the downlink data together with the RRC message to the terminal. For example, the RRC message may be an RRC connection release message. A terminal that has only one downlink data packet may not need to enter a connected state, and can finish receiving the downlink data in an idle state. This helps reduce resource consumption, signaling overheads, and power consumption of the terminal.

Figure 4C:
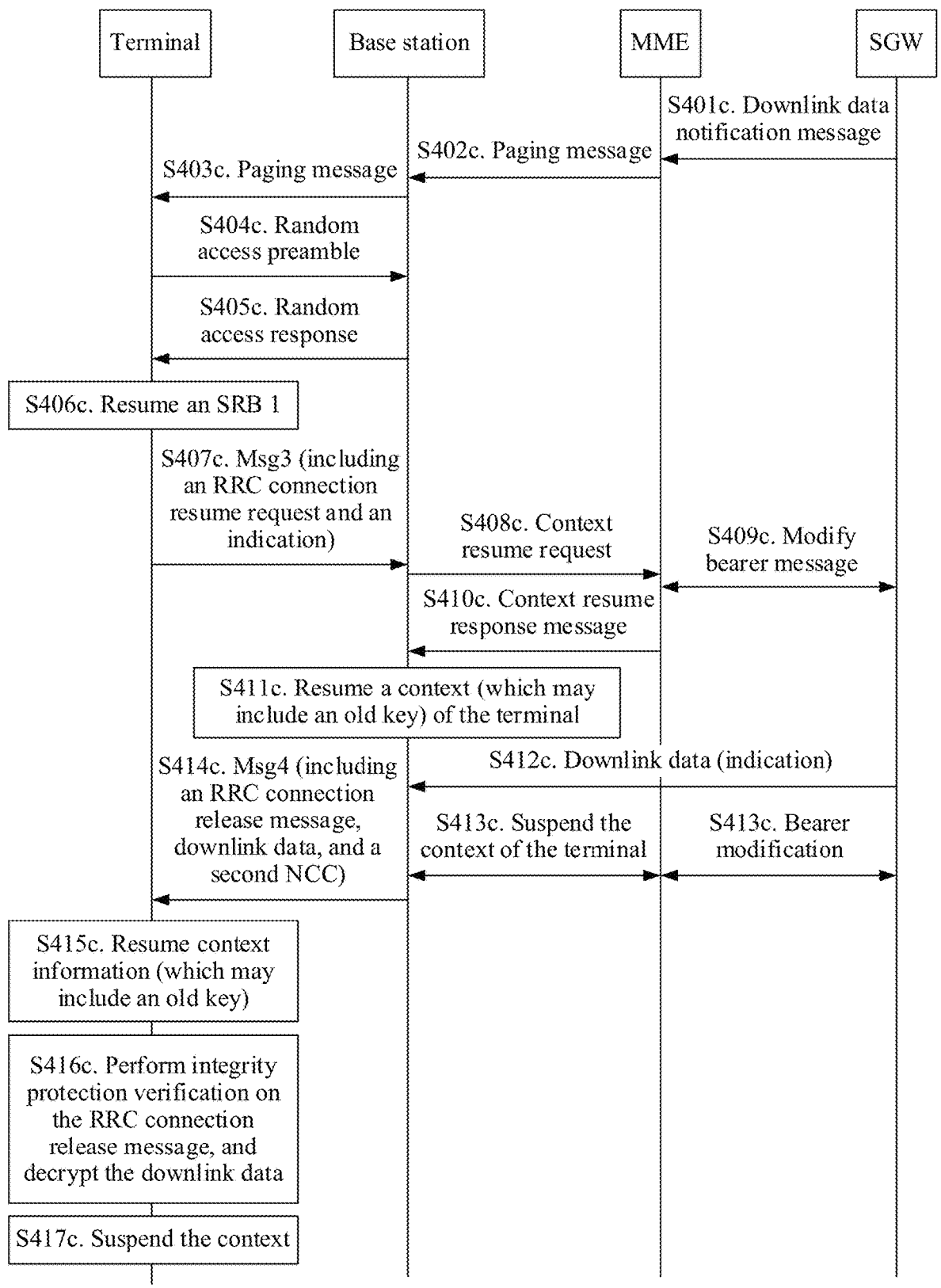
FIG. 4c is a schematic flowchart of a third implementation of a method for early transmission of downlink data according to an embodiment of this application.

FIG. 4c shows a third implementation of a method for early transmission of downlink data according to an embodiment of this application. The third implementation is based on the description of the first method for early transmission of downlink data shown in FIG. 2a. The following describes the third implementation in detail.

Steps S401c to S410c are the same as steps S401a to S410a. For details, refer to the foregoing descriptions of the steps. Details are not described herein again.

S411c. After receiving a context resume response message sent by an MME, a base station resumes the context information of the terminal.

Specifically, the context information of the terminal resumed by the base station includes an old key (that is, a third key). In the foregoing method 4, the third key is used to perform integrity protection on an RRC connection release message.

Steps S412c and S413c are the same as steps S412a and S413a, and details are not described herein again.

S414c. The base station sends a Msg4 to the terminal, and the terminal receives the Msg4 sent by the base station.

For this step, refer to S414a. A difference between this step and S414a lies in that processes in which the base station performs integrity protection and encryption on the Msg4 are different.

Specifically, the base station may use the foregoing method 4, to be specific, the base station adds a second NCC to the Msg4, and derives a fifth key by using the second NCC. The base station performs integrity protection on the RRC connection release message by using the third key, encrypts downlink data by using the fifth key, adds the RRC connection release message that is integrity protected and the encrypted downlink data to the Msg4, and sends the message 4 to the terminal.

Alternatively, the base station uses the foregoing method 5, to be specific, the base station adds a second NCC to the Msg4, and derives a fifth key and a sixth key by using the second NCC. The base station performs integrity protection on the RRC connection release message by using the sixth key, encrypts downlink data by using the fifth key, adds the RRC connection release message that is integrity protected and the encrypted downlink data to the message 4, and sends the Msg4 to the terminal.

S415c. The terminal resumes the context information.

Specifically, the context information resumed by the terminal includes an old key, that is, the third key. In the foregoing method 4, the third key may be used to perform integrity protection verification on the RRC connection release message.

S416c. The terminal performs integrity protection verification on the RRC connection release message, and decrypts the downlink data.

Specifically, if the foregoing method 4 is used, the terminal performs integrity protection verification on the RRC connection release message by using the third key. The terminal obtains the second NCC in the received Msg4, derives the fifth key by using the second NCC, and decrypts the downlink data by using the fifth key.

If the foregoing method 5 is used, the terminal obtains the second NCC in the received Msg4, derives the fifth key and the sixth key by using the second NCC, performs integrity protection verification on the RRC connection release message by using the sixth key, and decrypts the downlink data by using the fifth key.

S417c is the same as S417a.

It should be noted that the base station and the terminal use the same encryption/decryption and integrity protection method.

In the third implementation of the method for early transmission of downlink data, the terminal sends a downlink data early transmission indication to the access network device (that is, the base station), and the base station may send the downlink data together with the RRC message to the terminal. For example, the RRC message may be an RRC connection release message. A terminal that has only one downlink data packet may not need to enter a connected state, and can finish receiving the downlink data in an idle state. This helps reduce resource consumption, signaling overheads, and power consumption of the terminal.

Figure 5A:
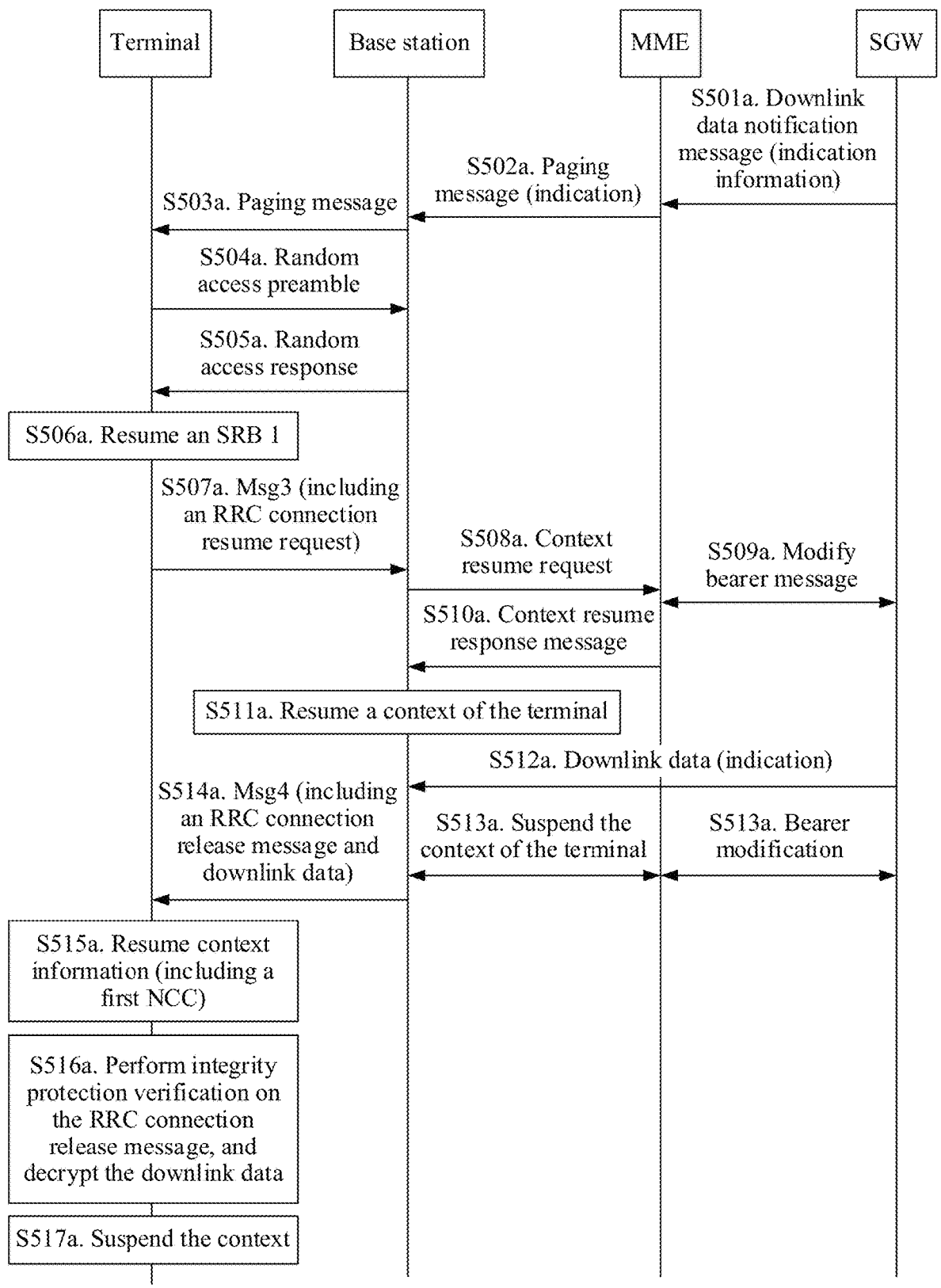
FIG. 5a is a schematic flowchart of a fourth implementation of a method for early transmission of downlink data according to an embodiment of this application.

FIG. 5a shows a fourth implementation of a method for early transmission of downlink data according to an embodiment of this application. The fourth implementation is based on the description of the second method for early transmission of downlink data shown in FIG. 2b. The following describes the fourth implementation in detail.

S501a. An S-GW sends a downlink data notification message to an MME, and the MME receives the downlink data notification message sent by the S-GW.

The downlink data notification message carries an indication. For a meaning of the indication, refer to the foregoing description.

When downlink data of a terminal arrives at the S-GW on a core network side, sending of the downlink data notification message is triggered. The downlink data notification message further carries an identifier of a terminal. For example, the identifier is an S-TMSI.

S502a. After receiving the downlink data notification message sent by the S-GW, the MME sends a paging message to a base station, and the base station receives the paging message sent by the MME.

The paging message is used to indicate the base station to page the terminal. The paging message carries an identifier of the terminal. For example, the identifier is an S-TMSI. The paging message further carries an indication. For a meaning of the indication, refer to the foregoing description.

S503a. After receiving the paging message sent by the MME, the base station sends the paging message in a broadcast manner.

A terminal in an idle state periodically listens to a paging message. When the terminal listens and obtains the paging message sent by the base station and determines that the paging message carries the identifier of the terminal, the terminal triggers the following steps:

S504a is the same as S404a, S505a is the same as S405a, and S506a is the same as S406a. Details are not described herein again.

S507a. The terminal sends a Msg3 to the base station, and the base station receives the Msg3 sent by the terminal.

The Msg3 may be an RRC connection resume request message. The RRC connection resume request message may further carry the following information: a resume ID, a resume cause, and a short resume MAC-I. The resume ID is used to identify a suspended terminal, that is, used to identify the terminal sending the RRC connection resume request message. The resume cause is used to indicate a reason why the terminal resumes a connection. For example, a value of the resume cause is mt-Access or a newly added value. The newly added value is used to indicate that the reason for resuming the connection is transmitting single downlink data. The short resume MAC-I is used to perform integrity protection on the Msg3 to prevent the Msg3 from being tampered with.

S508a. After receiving the RRC connection resume request, the base station sends a UE context resume request message to the MME based on the indication carried in the paging message received in S502a, and the MME receives the terminal context resume request message sent by the base station.

Specifically, identifier information of the terminal carried in the paging message in S502a is an S-TMSI, or an S-TMSI and a resume ID, and the identifier of the terminal carried in the RRC connection resume request in S507a is a resume ID. The base station determines, based on a mapping relationship between the S-TMSI and the resume ID, that the terminal that sends the RRC connection resume request in step S502a is a terminal having single downlink data. Therefore, the base station does not send an RRC connection resume response message to the terminal, but sends a context resume request message to the MME to request the downlink data of the terminal.

S509a. The MME exchanges a modify bearer message with the S-GW.

S510a to S517a are the same as S410a to S417a, and details are not described herein again.

In the fourth implementation of the method for early transmission of downlink data, the network side sends a downlink data early transmission indication by using the downlink data notification message and the paging message, and the base station may send the downlink data together with the RRC message to the terminal. For example, the RRC message may be an RRC connection release message. A terminal that has only one downlink data packet may not need to enter a connected state, and can finish receiving the downlink data in an idle state. This helps reduce resource consumption, signaling overheads, and power consumption of the terminal.

Figure 5B:
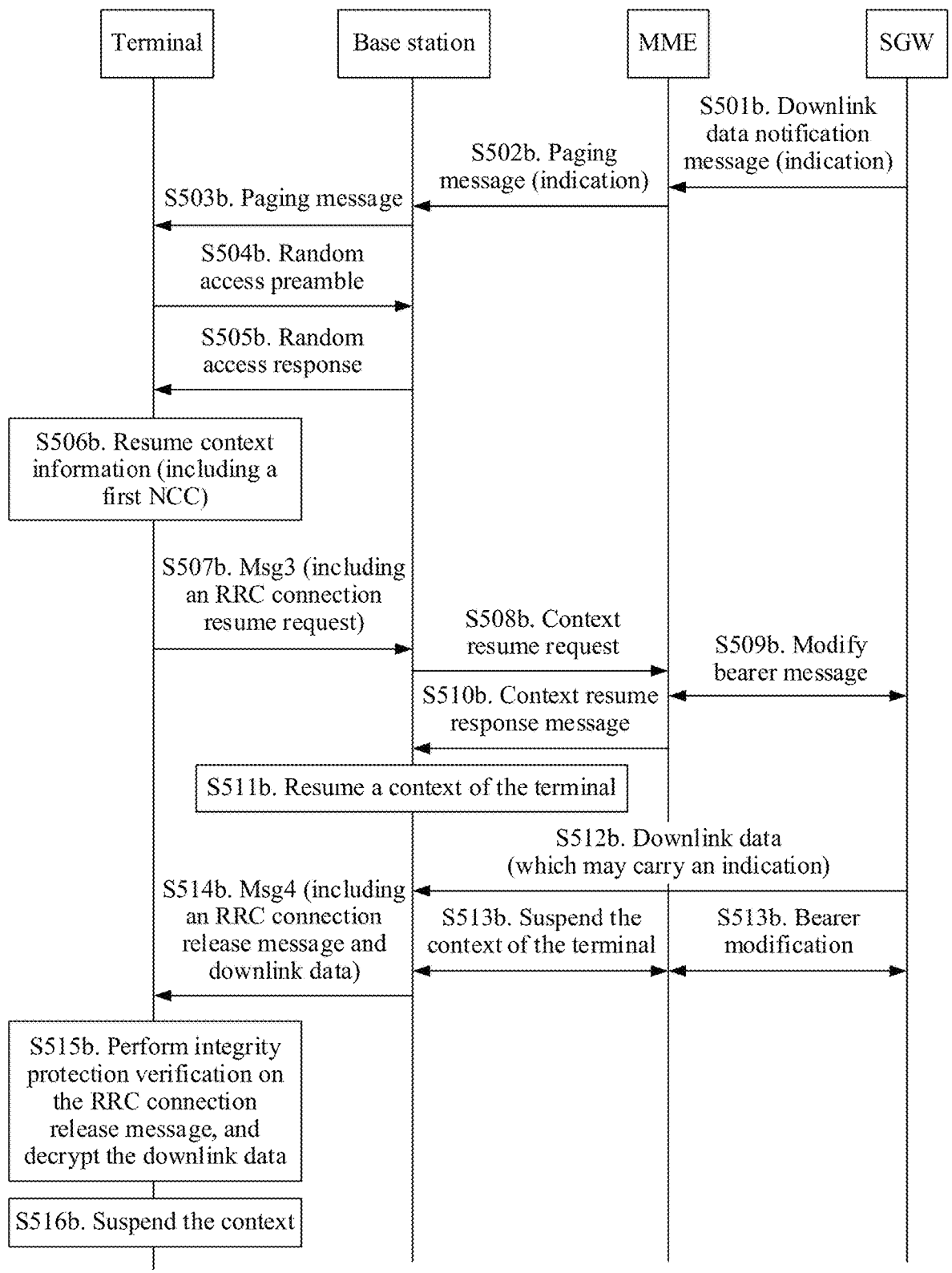
FIG. 5b is a schematic flowchart of a fifth implementation of a method for early transmission of downlink data according to an embodiment of this application.

FIG. 5b shows a fifth implementation of a method for early transmission of downlink data according to an embodiment of this application. The fifth implementation is based on the description of the second method for early transmission of downlink data shown in FIG. 2b. The following describes the fifth implementation in detail.

Steps S501b to S505b are the same as steps S501a to S505a. For details, refer to the foregoing descriptions of the steps. Details are not described herein again.

S506b is the same as S406b.

S507b is the same as S507a.

Steps S508b to S516b are the same as steps S408b to S416b. For details, refer to the descriptions of the steps in the embodiment shown in FIG. 4b. Details are not described herein again.

In the fifth implementation of the method for early transmission of downlink data, the network side sends a downlink data early transmission indication by using the downlink data notification message and the paging message, and the base station may send the downlink data together with the RRC message to the terminal. For example, the RRC message may be an RRC connection release message. A terminal that has only one downlink data packet may not need to enter a connected state, and can finish receiving the downlink data in an idle state. This helps reduce resource consumption, signaling overheads, and power consumption of the terminal.

Figure 5C:
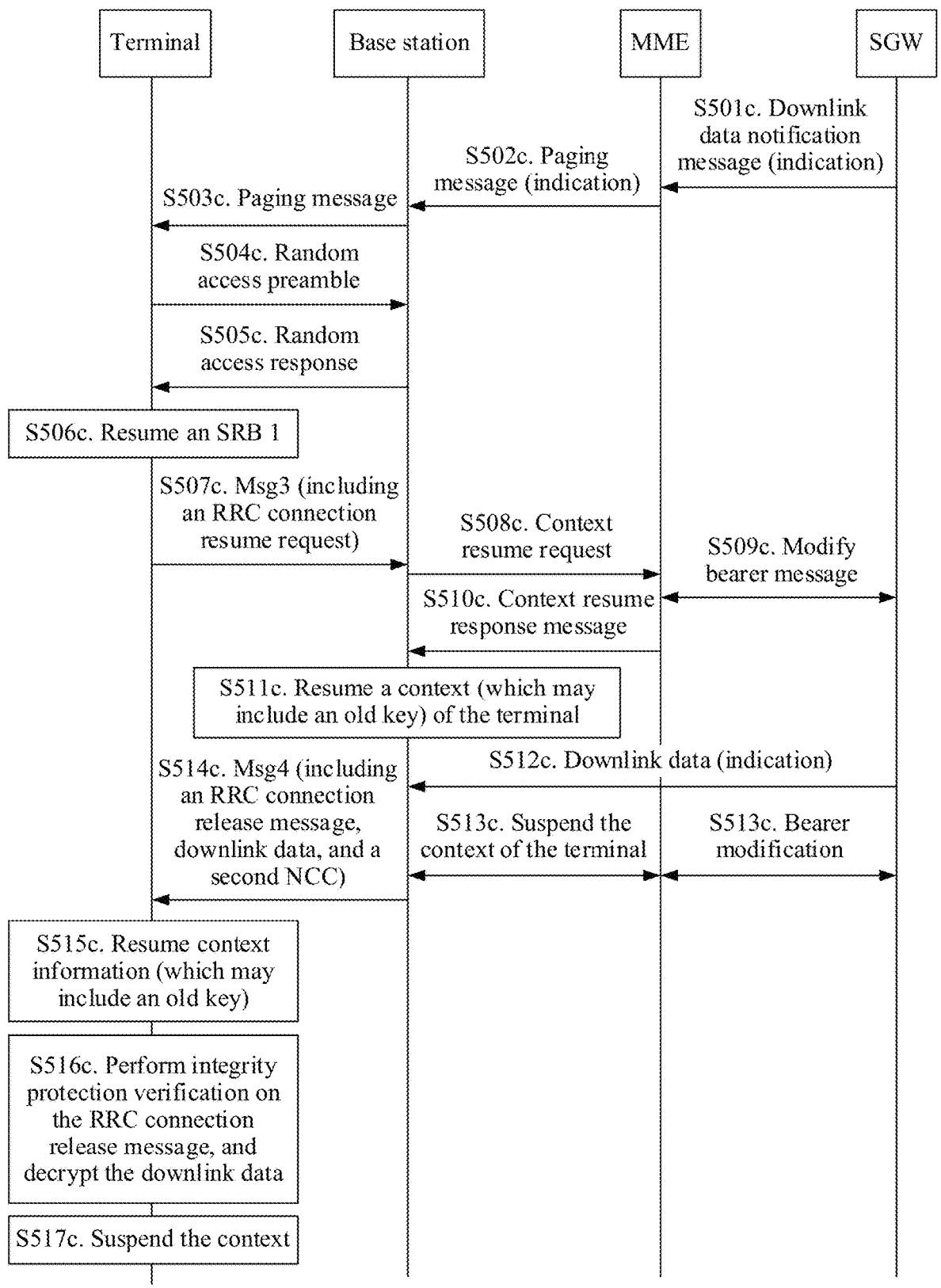
FIG. 5c is a schematic flowchart of a sixth implementation of a method for early transmission of downlink data according to an embodiment of this application.

FIG. 5c shows a sixth implementation of a method for early transmission of downlink data according to an embodiment of this application. The sixth implementation is based on the description of the second method for early transmission of downlink data shown in FIG. 2b. The following describes the sixth implementation in detail.

Steps S501c to S510c are the same as steps S501a to S510a. For details, refer to the foregoing descriptions of the steps. Details are not described herein again.

Steps S511c to S517c are the same as steps S411c to S417c. For details, refer to the descriptions of the steps in the embodiment shown in FIG. 4b. Details are not described herein again.

In the sixth implementation of the method for early transmission of downlink data, the network side sends a downlink data early transmission indication by using the downlink data notification message and the paging message, and the base station may send the downlink data together with the RRC message to the terminal. For example, the RRC message may be an RRC connection release message. A terminal that has only one downlink data packet may not need to enter a connected state, and can finish receiving the downlink data in an idle state. This helps reduce resource consumption, signaling overheads, and power consumption of the terminal.

Figure 6A:
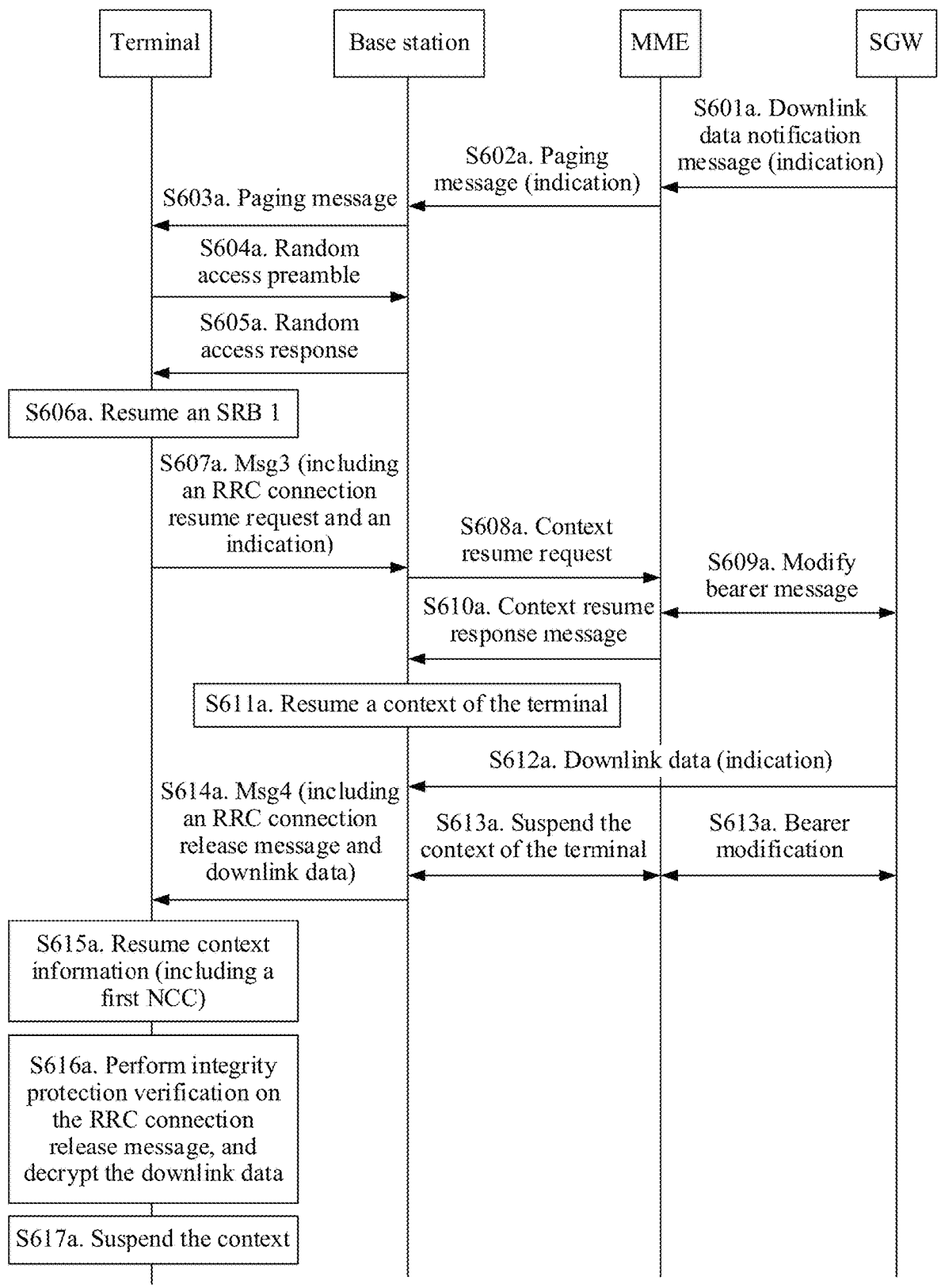
FIG. 6a is a schematic flowchart of a seventh implementation of a method for early transmission of downlink data according to an embodiment of this application.

FIG. 6a shows a seventh implementation of a method for early transmission of downlink data according to an embodiment of this application. The seventh implementation is based on the description of the third method for early transmission of downlink data shown in FIG. 2c. The following describes the seventh implementation in detail.

S601a to S606a are the same as S501a to S506a.
S607a is the same as S407a.
S608a to S617a are the same as S508a to S517a, and details are not described herein again.

According to the seventh implementation of the method for early transmission of downlink data, the base station can send single downlink data to the terminal in a random access process based on indications sent by the terminal and a core network device, and does not need to establish an RRC connection to the terminal. Therefore, the terminal can finish receiving downlink data in an idle state. This helps reduce resource consumption, signaling overheads, and power consumption of the terminal.

Figure 6B:
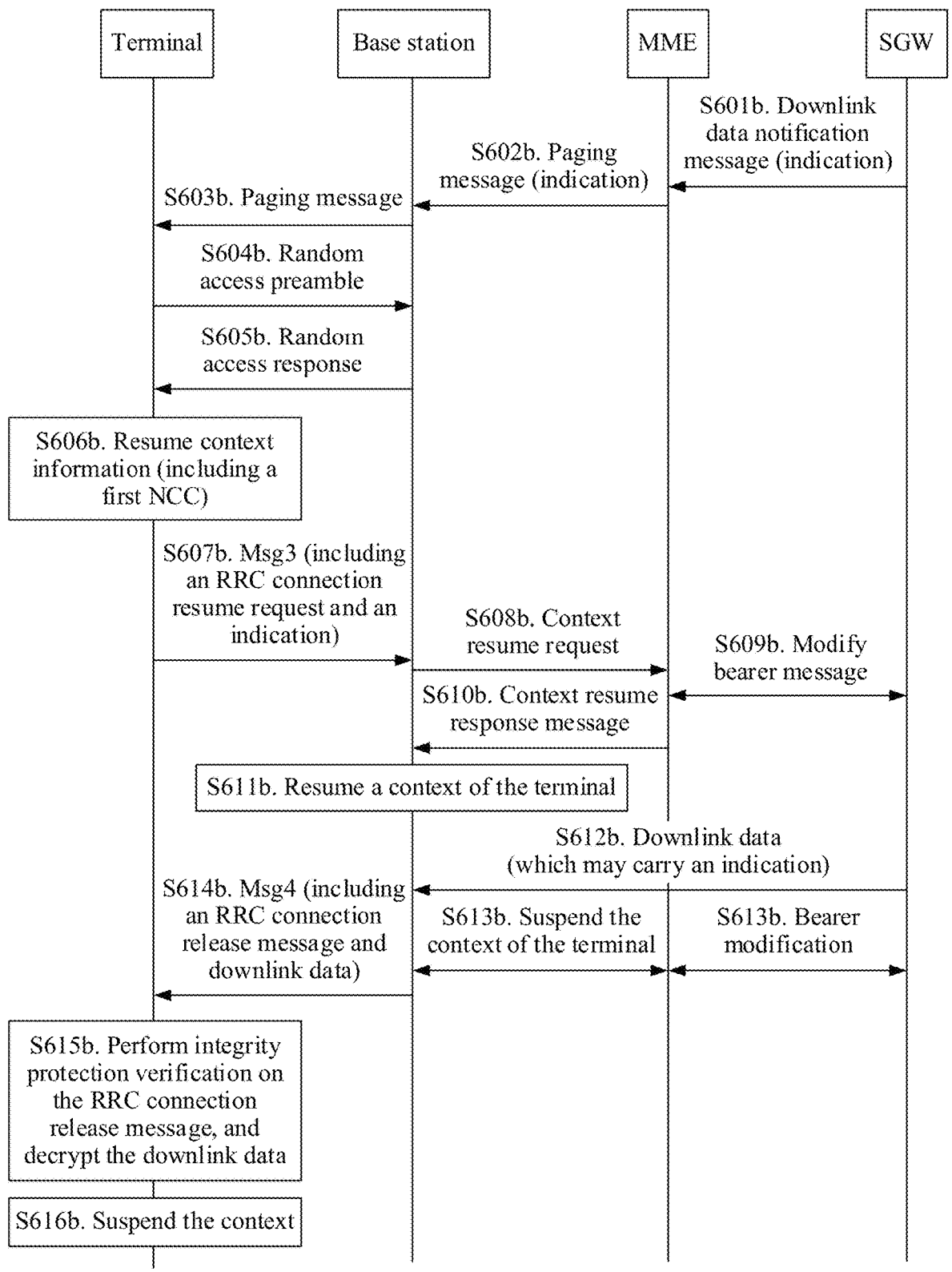
FIG. 6b is a schematic flowchart of an eighth implementation of a method for early transmission of downlink data according to an embodiment of this application.

FIG. 6b shows an eighth implementation of a method for early transmission of downlink data according to an embodiment of this application. The eighth implementation is based on the description of the third method for early transmission of downlink data shown in FIG. 2c. The following describes the eighth implementation in detail.

S601b to S606b are the same as S501b to S506b.
S607b is the same as S407b.
S608b to S616b are the same as S508b to S516b, and details are not described herein again.

According to the eighth implementation of the method for early transmission of downlink data, the base station can send single downlink data to the terminal in a random access process based on indications sent by the terminal and a core network device, and does not need to establish an RRC connection to the terminal. Therefore, the terminal can finish receiving downlink data in an idle state. This helps reduce resource consumption, signaling overheads, and power consumption of the terminal.

Figure 6C:
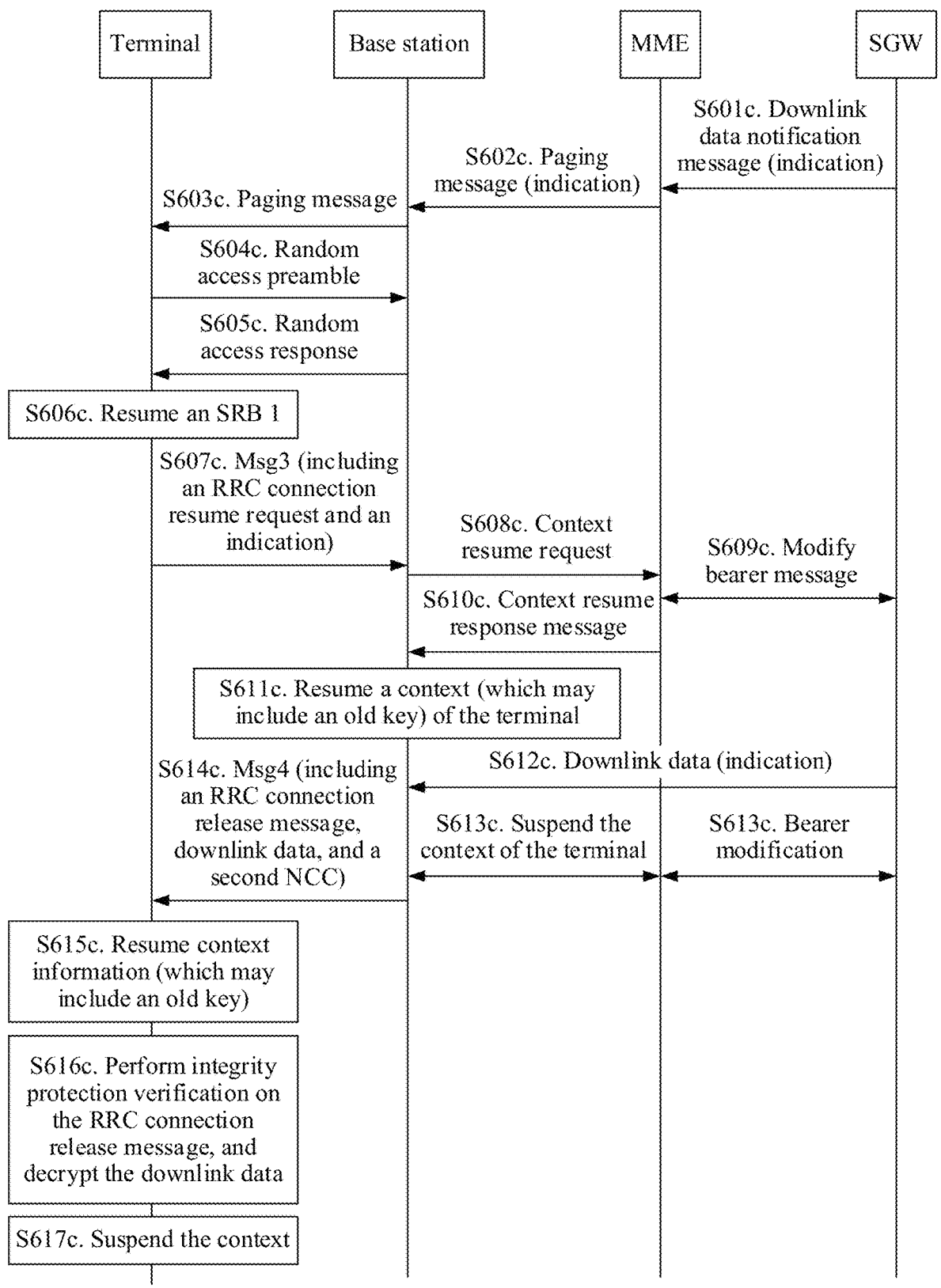
FIG. 6c is a schematic flowchart of a ninth implementation of a method for early transmission of downlink data according to an embodiment of this application.

FIG. 6c shows a ninth implementation of a method for early transmission of downlink data according to an embodiment of this application. The ninth implementation is based on the description of the third method for early transmission of downlink data shown in FIG. 2c. The following describes the ninth implementation in detail.

S601c to S606c are the same as S501c to S506c.
S607c is the same as S407c.
S608c to S617c are the same as S508c to S517c, and details are not described herein again.

According to the ninth implementation of the method for early transmission of downlink data, the base station can send single downlink data to the terminal in a random access process based on indications sent by the terminal and a core network device, and does not need to establish an RRC connection to the terminal. Therefore, the terminal can finish receiving downlink data in an idle state. This helps reduce resource consumption, signaling overheads, and power consumption of the terminal.

Figure 7A:
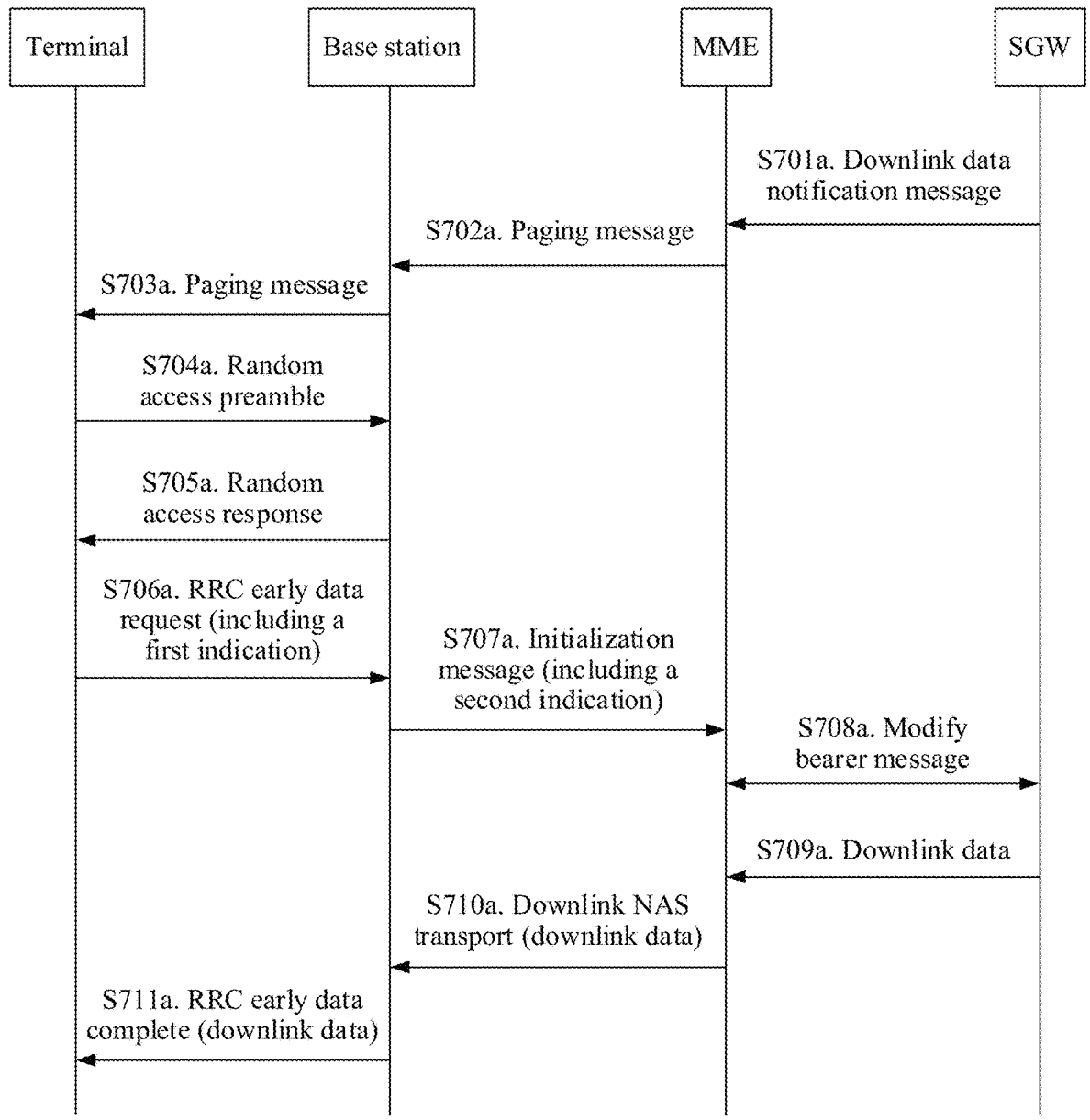
FIG. 7a is a schematic flowchart of a tenth implementation of a method for early transmission of downlink data according to an embodiment of this application.

FIG. 7a shows a tenth implementation of a method for early transmission of downlink data according to an embodiment of this application. The tenth implementation is based on the description of the fourth method for early transmission of downlink data shown in FIG. 3a. The following describes the tenth implementation in detail.

S701a. An S-GW sends a downlink data notification message to an MME, and the MME receives the downlink data notification message sent by the S-GW.

Specifically, when downlink data of a terminal arrives at the S-GW on a core network side, sending of the downlink data notification message is triggered. The downlink data notification message carries an identifier of a terminal. For example, the identifier is an S-TMSI.

S702a. After receiving the downlink data notification message sent by the S-GW, the MME sends a paging message to a base station, and the base station receives the paging message sent by the MME. The paging message is used to indicate the base station to page the terminal.

S703a. After receiving the paging message sent by the MME, the base station sends the paging message in a broadcast manner.

A terminal in an idle state periodically listens to a paging message. When the terminal listens and obtains the paging message sent by the base station and determines that the paging message carries the identifier of the terminal, the terminal triggers the following steps:

S704a. The terminal sends a random access preamble to the base station, and the base station receives the random access preamble sent by the terminal.

The base station broadcasts several random access preambles to all terminals by using a broadcast message. The terminal randomly selects one random access preamble from the several random access preambles broadcast by the base station, randomly selects one resource from resources that are broadcast by the base station and that are used to send the random access preambles, and sends the selected random access preamble on the selected resource.

S705a. The base station sends a RAR to the terminal, and the terminal receives the random access response sent by the base station.

Specifically, the base station listens, on a resource of the random access preamble, to the random access preamble sent by the terminal, and sends the RAR to the terminal when detecting a random access preamble. The RAR includes a timing advance for sending an Msg3 by the terminal and an uplink resource (UL grant) for sending the Msg3 by the terminal.

S706a. The terminal sends an RRC early data request message to the base station, and the base station receives the RRC early data request message from the terminal.

The RRC early data request message carries an indication, which is denoted as a first indication. For a meaning indicated by the first indication, refer to the foregoing description. A meaning of the first indication may be a single packet or single DL data, or may be indicated by using a dedicated Info NAS. The dedicated Info NAS is originally used to carry uplink data for early transmission. In an early transmission scenario of downlink data, it is assumed that the terminal does not have uplink data. In this case, the RRC early data request message is used to notify early transmission of the downlink data. Therefore, the dedicated Info NAS may be set to null to indicate that no uplink data is carried, and further indicate early transmission of the downlink data. The RRC early data request message may further carry other information, and the other information carried in the message is the same as that in an existing technology.

S707a. The base station sends a terminal initialization message (Initial UE Message) to the MME, and the MME receives the terminal initialization message from the base station.

The terminal initialization message is used to initialize context information of the terminal. The terminal initialization message carries an indication, which is denoted as a second indication. A meaning indicated by the second indication is the same as an explanation of an indication in this specification.

S708a. The MME exchanges a modify bearer message with the S-GW.

S709a. The S-GW sends downlink data to the MME, and the MME receives the downlink data sent by the S-GW.

S710a. The MME encapsulates the downlink data into a NAS message, and sends the downlink data to the base station through DL NAS transport; and the base station receives the NAS message from the MME.

S711a. The base station sends an RRC early data complete message to the terminal, and the terminal receives the RRC early data complete message from the base station.

The RRC early data complete message carries downlink data. Specifically, the base station encapsulates the received NAS message into the RRC early data complete message, and sends the RRC early data complete message to the terminal. The terminal obtains the NAS message in the received RRC early data complete message, to obtain the downlink data.

According to the tenth implementation of the method for early transmission of downlink data, the MME can encapsulate the downlink data of the terminal into the NAS message based on the indication sent by the terminal, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 7B:
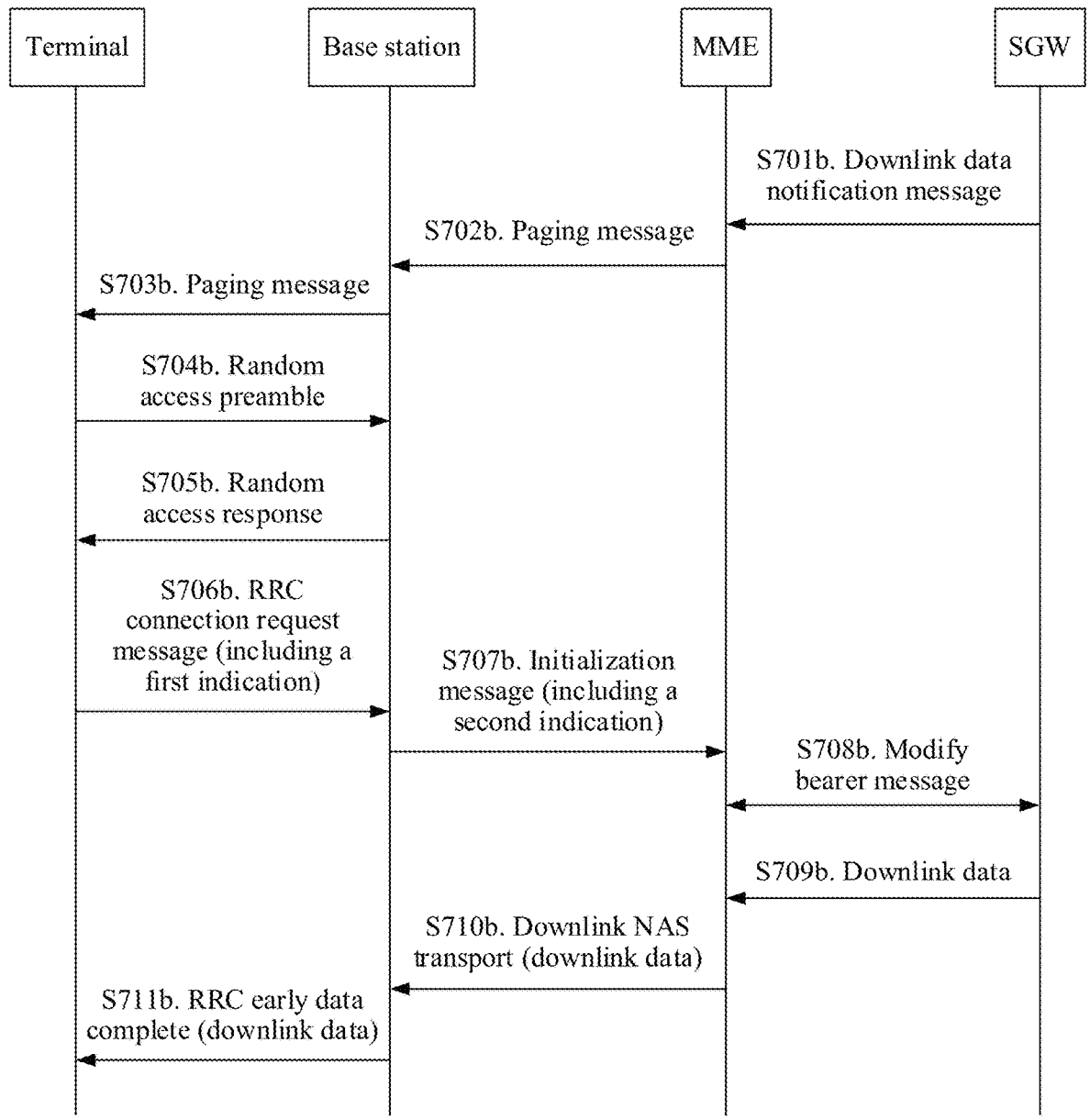
FIG. 7b is a schematic flowchart of an eleventh implementation of a method for early transmission of downlink data according to an embodiment of this application.

FIG. 7b shows an eleventh implementation of a method for early transmission of downlink data according to an embodiment of this application. The eleventh implementation is based on the description of the fourth method for early transmission of downlink data shown in FIG. 3a. The following describes the eleventh implementation in detail.

S701b to S705b are the same as S701a to S705a. For details, refer to the foregoing descriptions of the related steps. Details are not described herein again.

S706b. A terminal sends an RRC connection request message to a base station, to request to establish an RRC connection. The base station receives the RRC connection request message from the terminal.

The RRC connection request message carries a first indication. For a function of the first indication and a meaning indicated by the first indication, refer to the foregoing description. For example, the meaning indicated by the first indication may be a single packet or single DL data.

S707b to S711b are the same as S707a to S711a. For details, refer to the foregoing descriptions of the related steps. Details are not described herein again.

According to the eleventh implementation of the method for early transmission of downlink data, the MME can encapsulate the downlink data of the terminal into the NAS message based on the indication sent by the terminal, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 7C:
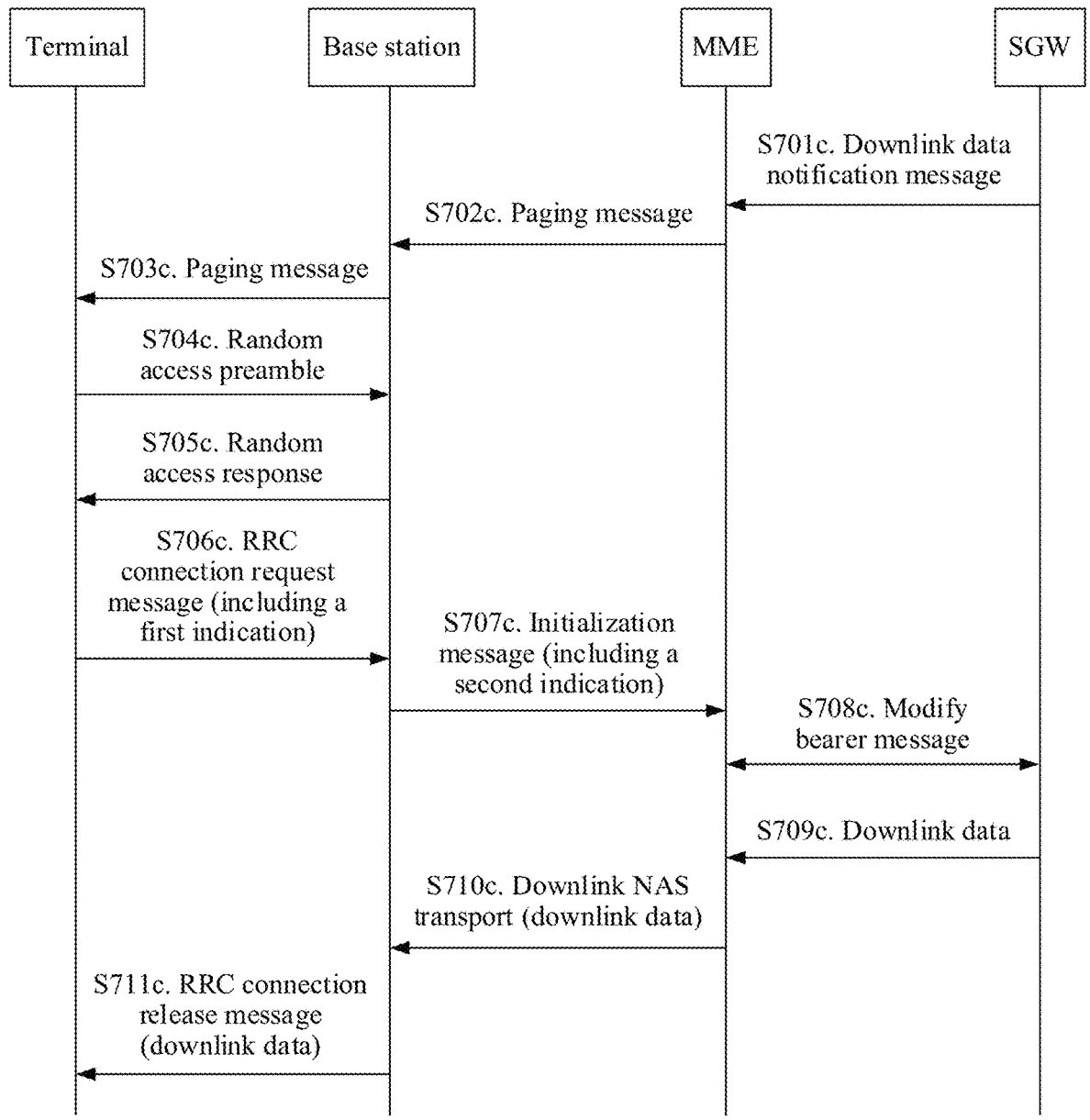
FIG. 7c is a schematic flowchart of a twelfth implementation of a method for early transmission of downlink data according to an embodiment of this application.

FIG. 7c shows a twelfth implementation of a method for early transmission of downlink data according to an embodiment of this application. The twelfth implementation is based on the description of the fourth method for early transmission of downlink data shown in FIG. 3a. The following describes the twelfth implementation in detail.

S701c to S705c are the same as S701a to S705a. For details, refer to the foregoing descriptions of the related steps. Details are not described herein again.

S706c. A terminal sends an RRC connection request message to a base station, to request to establish an RRC connection. The RRC connection request message carries a first indication. For a function of the first indication and a meaning indicated by the first indication, refer to the foregoing description. For example, the meaning indicated by the first indication may be a single packet or single DL data.

S707c to S710c are the same as S707a to S710a. For details, refer to the foregoing descriptions of the related steps. Details are not described herein again.

S711c. The base station sends an RRC connection release message to the terminal, and the terminal receives the RRC connection release message from the base station.

The RRC connection release message carries downlink data. Specifically, the base station encapsulates a received NAS message into the RRC connection release message, and sends the RRC connection release message to the terminal. The terminal obtains the NAS message in the received RRC connection release message, to obtain the downlink data.

According to the twelfth implementation of the method for early transmission of downlink data, the MME can encapsulate the downlink data of the terminal into the NAS message based on the indication sent by the terminal, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 8A:
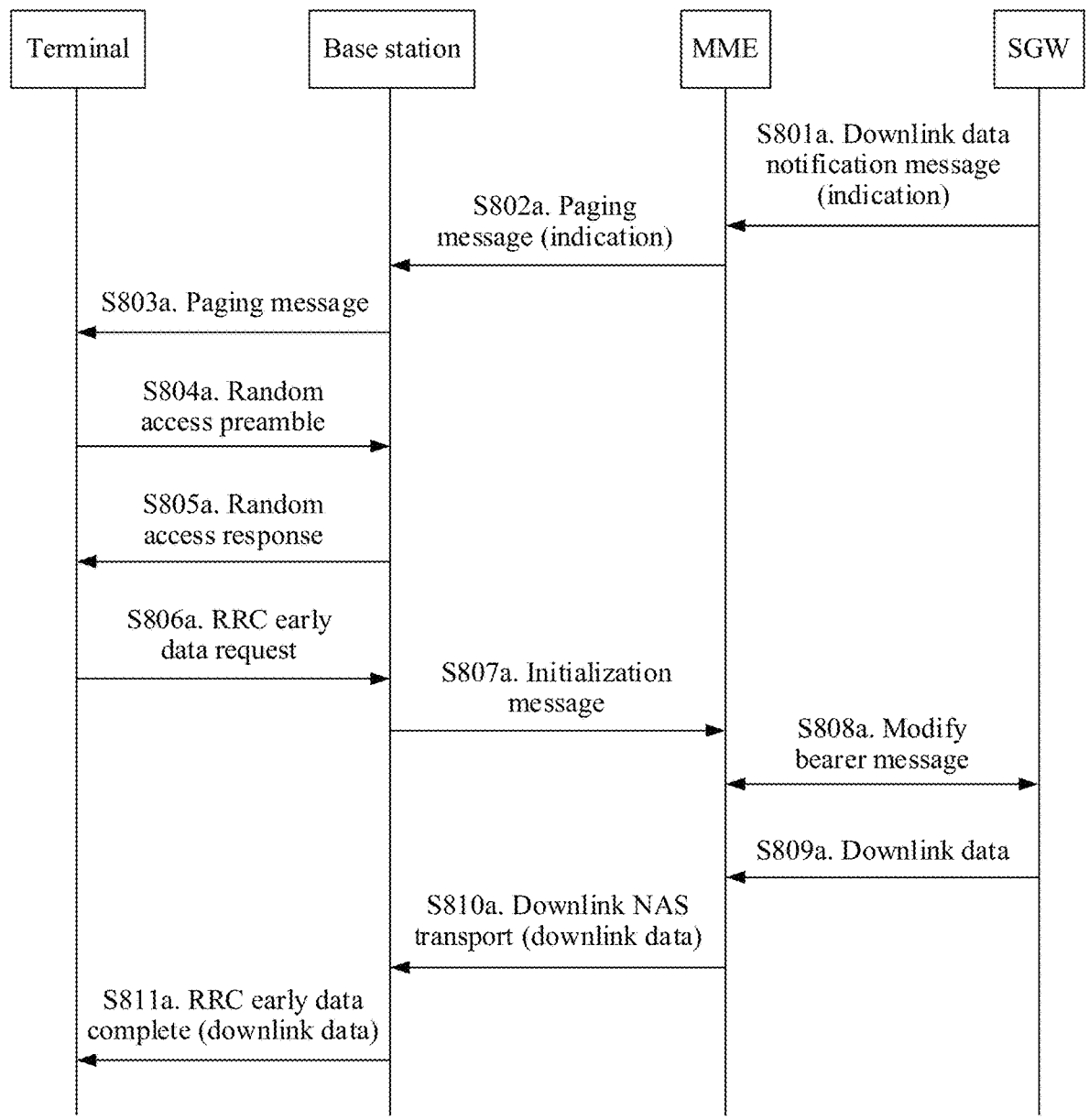
FIG. 8a is a schematic flowchart of a thirteenth implementation of a method for early transmission of downlink data according to an embodiment of this application.

FIG. 8a shows a thirteenth implementation of a method for early transmission of downlink data according to an embodiment of this application. The thirteenth implementation is based on the description of the fifth method for early transmission of downlink data shown in FIG. 3b. The following describes the thirteenth implementation in detail.

S801a. An S-GW sends a downlink data notification message to an MME, and the MME receives the downlink data notification message sent by the S-GW.

The downlink data notification message carries an indication. For a meaning of the indication, refer to the foregoing description.

When downlink data of a terminal arrives at the S-GW on a core network side, sending of the downlink data notification message is triggered. The downlink data notification message further carries an identifier of a terminal. For example, the identifier is an S-TMSI.

S802a. After receiving the downlink data notification message sent by the S-GW, the MME sends a paging message to a base station, and the base station receives the paging message sent by the MME.

The paging message is used to indicate the base station to page the terminal. The paging message carries an identifier of the terminal. For example, the identifier is an S-TMSI. The paging message further carries an indication. For a meaning of the indication, refer to the foregoing description.

S803a. After receiving the paging message sent by the MME, the base station sends the paging message in a broadcast manner.

Optionally, the paging message sent in this step may also carry an indication. For a meaning of the indication, refer to the foregoing description.

A terminal in an idle state periodically listens to a paging message. When the terminal listens and obtains the paging message sent by the base station and determines that the paging message carries the identifier of the terminal, the terminal triggers the following steps:

S804a. The terminal sends a random access preamble to the base station, and the base station receives the random access preamble sent by the terminal.

The base station broadcasts several random access preambles to all terminals by using a broadcast message. The terminal randomly selects one random access preamble from the several random access preambles broadcast by the base station, randomly selects one resource from resources that are broadcast by the base station and that are used to send the random access preambles, and sends the selected random access preamble on the selected resource.

S805a. The base station sends a RAR to the terminal, and the terminal receives the random access response sent by the base station.

Specifically, the base station listens, on a resource of the random access preamble, to the random access preamble sent by the terminal, and sends the RAR to the terminal when detecting a random access preamble. The RAR includes a timing advance for sending an Msg3 by the terminal and an uplink resource (UL grant) for sending the Msg3 by the terminal.

S806a. The terminal sends an RRC early data request message to the base station, and the base station receives the RRC early data request message from the terminal.

The RRC early data request message is used to request early transmission of uplink data. The RRC early data request message may carry a dedicated Info NAS. The dedicated Info NAS is originally used to carry uplink data for early transmission. In an early transmission scenario of downlink data, it is assumed that the terminal does not have uplink data. In this case, the dedicated Info NAS may be set to null to indicate that no uplink data is carried.

S807a. The base station sends a terminal initialization message (Initial UE Message) to the MME, and the MME receives the terminal initialization message from the base station.

S808a. The MME exchanges a modify bearer message with the S-GW.

S809a. The S-GW sends downlink data to the MME, and the MME receives the downlink data sent by the S-GW.

S810a. The MME encapsulates the downlink data into a NAS message, and sends the downlink data to the base station through DL NAS transport; and the base station receives the NAS message from the MME.

S811a. The base station sends an RRC early data complete message to the terminal, and the terminal receives the RRC early data complete (RRC early data complete) message from the base station.

The RRC early data complete message carries downlink data. Specifically, the base station encapsulates the received NAS message into the RRC early data complete message, and sends the RRC early data complete message to the terminal. The terminal obtains the NAS message in the received RRC early data complete message, to obtain the downlink data.

According to the thirteenth implementation of the method for early transmission of downlink data, the MME can encapsulate the downlink data of the terminal into the NAS message based on the indication sent by the S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 8B:
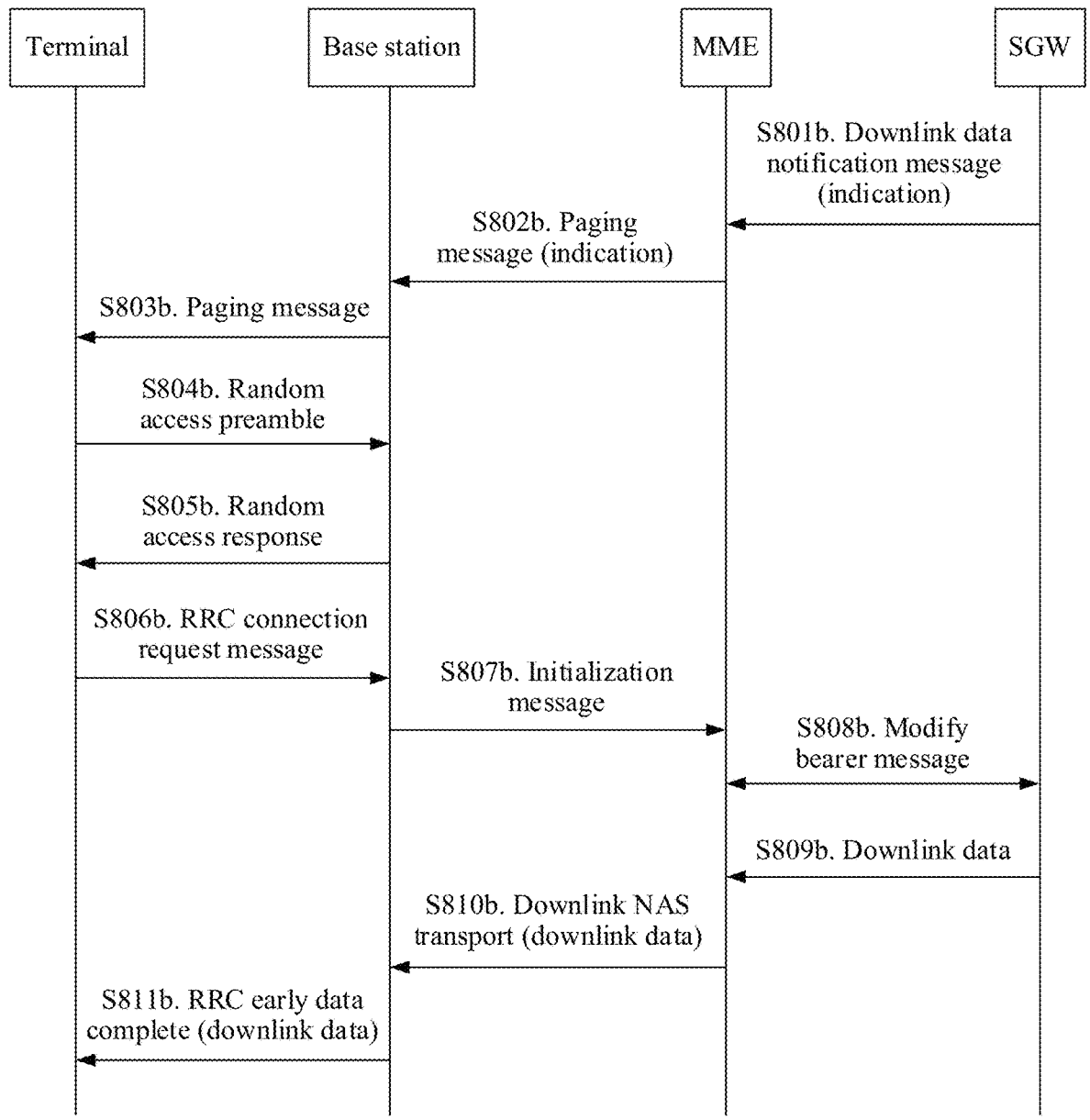
FIG. 8b is a schematic flowchart of a fourteenth implementation of a method for early transmission of downlink data according to an embodiment of this application.

FIG. 8b shows a fourteenth implementation of a method for early transmission of downlink data according to an embodiment of this application. The fourteenth implementation is based on the description of the fifth method for early transmission of downlink data shown in FIG. 3b. The following describes the fourteenth implementation in detail.

S801b to S805b are the same as S801a to S805a. For details, refer to the foregoing descriptions of the related steps. Details are not described herein again.

S806b. A terminal sends an RRC connection request message to a base station, to request to establish an RRC connection. The base station receives the RRC connection request message from the terminal.

S807b to S811b are the same as S807a to S811a. For details, refer to the foregoing descriptions of the related steps. Details are not described herein again.

According to the fourteenth implementation of the method for early transmission of downlink data, an MME can encapsulate downlink data of the terminal into a NAS message based on an indication sent by an S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 8C:
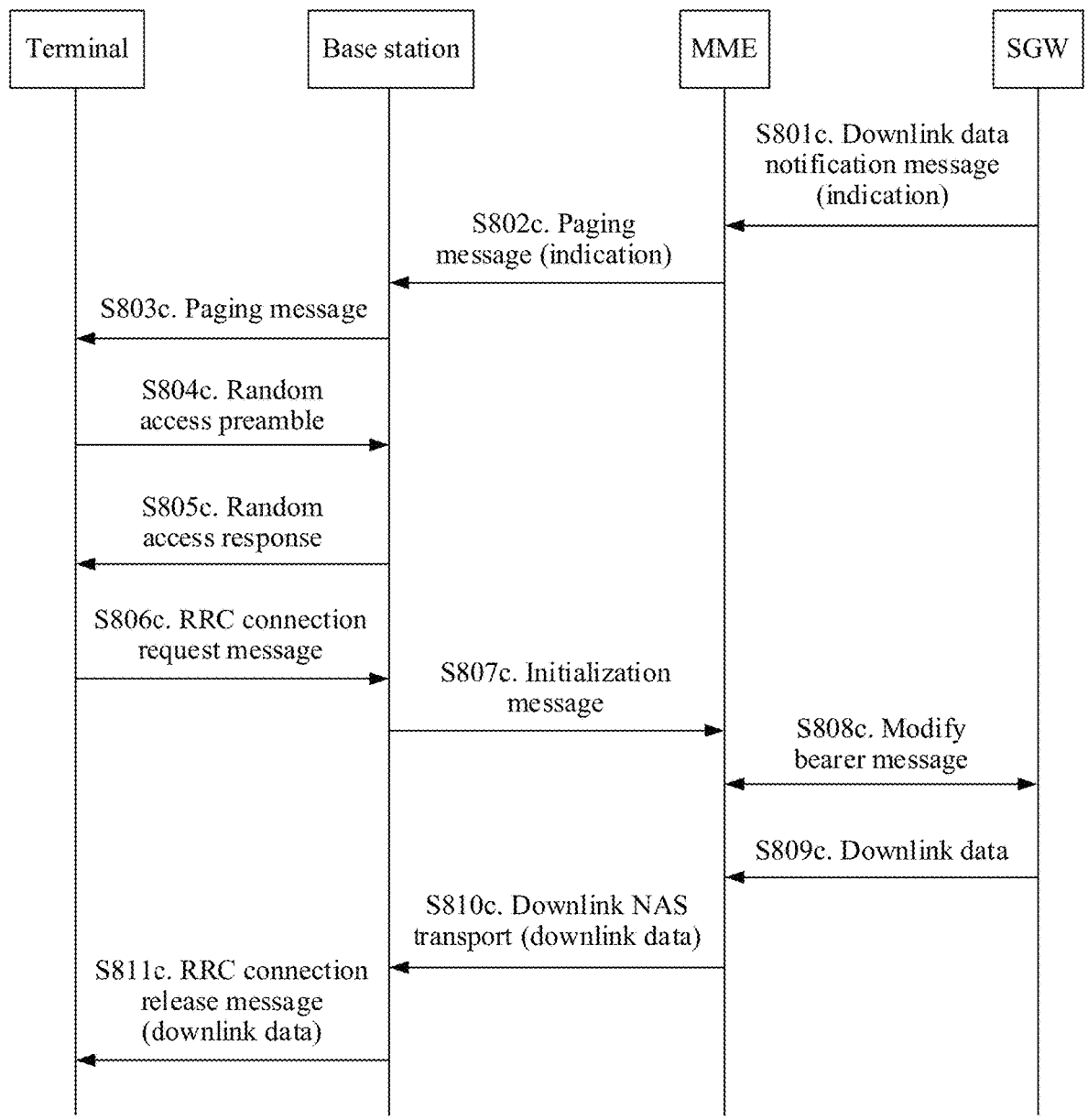
FIG. 8c is a schematic flowchart of a fifteenth implementation of a method for early transmission of downlink data according to an embodiment of this application.

FIG. 8c shows a fifteenth implementation of a method for early transmission of downlink data according to an embodiment of this application. The fifteenth implementation is based on the description of the fifth method for early transmission of downlink data shown in FIG. 3b. The following describes the fifteenth implementation in detail.

S801c to S805c are the same as S801a to S805a. For details, refer to the foregoing descriptions of the related steps. Details are not described herein again.

S806c. A terminal sends an RRC connection request message to a base station, to request to establish an RRC connection.

S807c to S810c are the same as S807a to S810a. For details, refer to the foregoing descriptions of the related steps. Details are not described herein again.

S811c. The base station sends an RRC connection release message to the terminal, and the terminal receives the RRC connection release message from the base station.

The RRC connection release message carries downlink data. Specifically, the base station encapsulates a received NAS message into the RRC connection release message, and sends the RRC connection release message to the terminal. The terminal obtains the NAS message in the received RRC connection release message, to obtain the downlink data.

According to the fifteenth implementation of the method for early transmission of downlink data, an MME can encapsulate downlink data of the terminal into a NAS message based on an indication sent by an S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 9A:
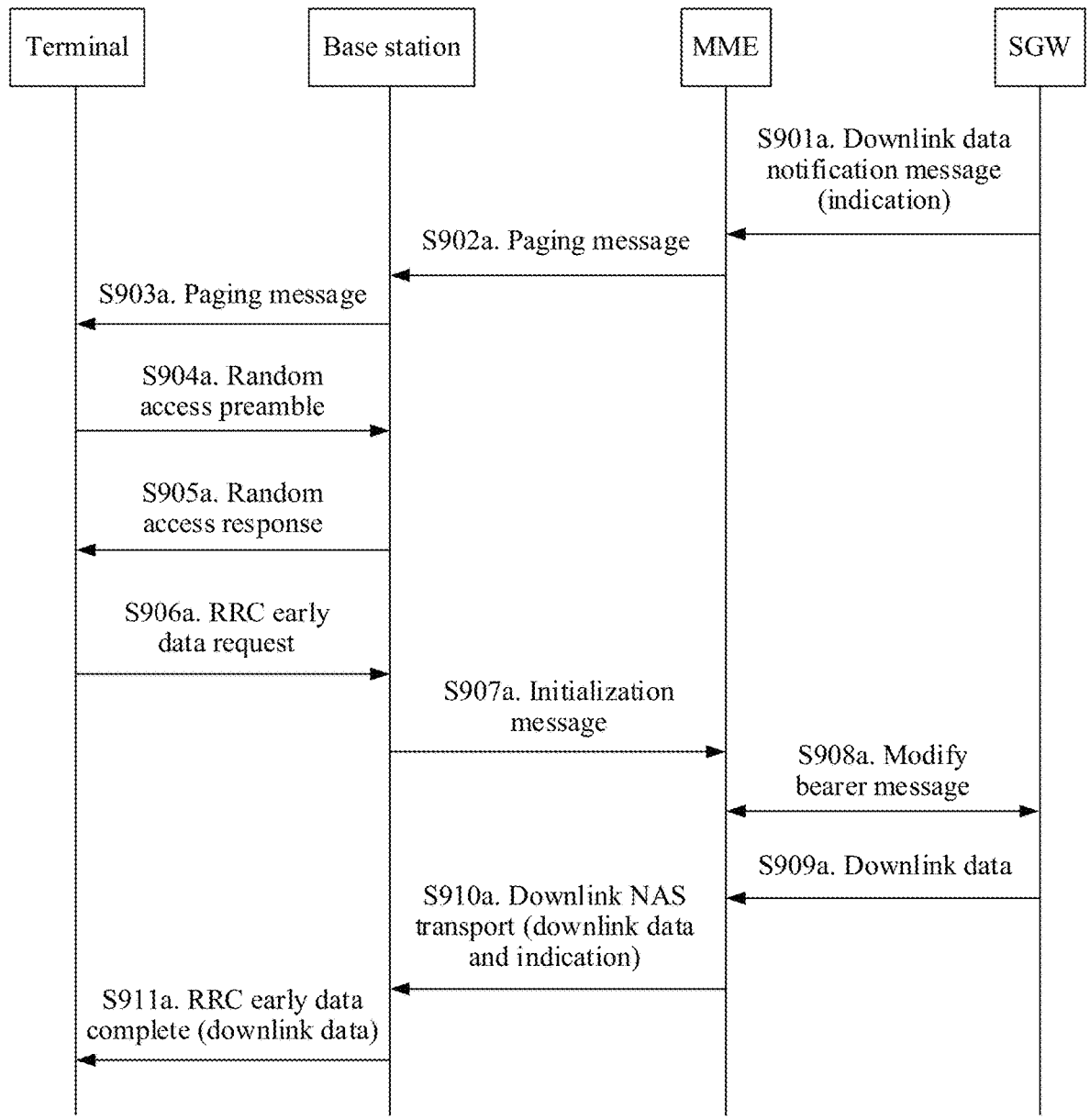
FIG. 9a is a schematic flowchart of a sixteenth implementation of a method for early transmission of downlink data according to an embodiment of this application.

FIG. 9a shows a sixteenth implementation of a method for early transmission of downlink data according to an embodiment of this application. The sixteenth implementation is based on the description of the sixth method for early transmission of downlink data shown in FIG. 3c. The following describes the sixteenth implementation in detail.

S901a. An S-GW sends a downlink data notification message to an MME, and the MME receives the downlink data notification message sent by the S-GW.

The downlink data notification message carries an indication. For a meaning of the indication, refer to the foregoing description.

When downlink data of a terminal arrives at the S-GW on a core network side, sending of the downlink data notification message is triggered. The downlink data notification message further carries an identifier of a terminal. For example, the identifier is an S-TMSI.

S902a. After receiving the downlink data notification message sent by the S-GW, the MME sends a paging message to a base station, and the base station receives the paging message sent by the MME.

The paging message is used to indicate the base station to page the terminal. The paging message carries an identifier of the terminal. For example, the identifier is an S-TMSI.

S903a. After receiving the paging message sent by the MME, the base station sends the paging message in a broadcast manner.

Optionally, the paging message sent in this step may also carry an indication. For a meaning of the indication, refer to the foregoing description.

A terminal in an idle state periodically listens to a paging message. When the terminal listens and obtains the paging message sent by the base station and determines that the paging message carries the identifier of the terminal, the terminal triggers the following steps:

S904a. The terminal sends a random access preamble to the base station, and the base station receives the random access preamble sent by the terminal.

The base station broadcasts several random access preambles to all terminals by using a broadcast message. The terminal randomly selects one random access preamble from the several random access preambles broadcast by the base station, randomly selects one resource from resources that are broadcast by the base station and that are used to send the random access preambles, and sends the selected random access preamble on the selected resource.

S905a. The base station sends a RAR to the terminal, and the terminal receives the random access response sent by the base station.

Specifically, the base station listens, on a resource of the random access preamble, to the random access preamble sent by the terminal, and sends the RAR to the terminal when detecting a random access preamble. The RAR includes a timing advance for sending an Msg3 by the terminal and an uplink resource (UL grant) for sending the Msg3 by the terminal.

S906a. The terminal sends an RRC early data request message to the base station, and the base station receives the RRC early data request message from the terminal.

The RRC early data request message is used to request early transmission of uplink data. The RRC early data request message may carry a dedicated Info NAS. The dedicated Info NAS is originally used to carry uplink data for early transmission. In an early transmission scenario of downlink data, it is assumed that the terminal does not have uplink data. In this case, the dedicated Info NAS may be set to null to indicate that no uplink data is carried.

S907a. The base station sends a context resume request (UE context resume request) message to the MME, and the MME receives the context resume request message from the base station.

S908a. The MME exchanges a modify bearer message with the S-GW.

S909a. The S-GW sends downlink data to the MME, and the MME receives the downlink data sent by the S-GW.

S910a. The MME encapsulates the downlink data into a NAS message, and sends the downlink data to the base station through DL NAS transport; and the base station receives the NAS message from the MME.

The NAS message further carries an indication. For a meaning of the indication, refer to the foregoing description.

S911a. The base station sends an RRC early data complete message to the terminal, and the terminal receives the RRC early data complete message from the base station.

The RRC early data complete message carries downlink data. Specifically, the base station encapsulates the received NAS message into the RRC early data complete message, and sends the RRC early data complete message to the terminal. The terminal obtains the NAS message in the received RRC early data complete message, to obtain the downlink data.

According to the sixteenth implementation of the method for early transmission of downlink data, the MME can encapsulate the downlink data of the terminal into the NAS message based on the indication sent by the S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 9B:
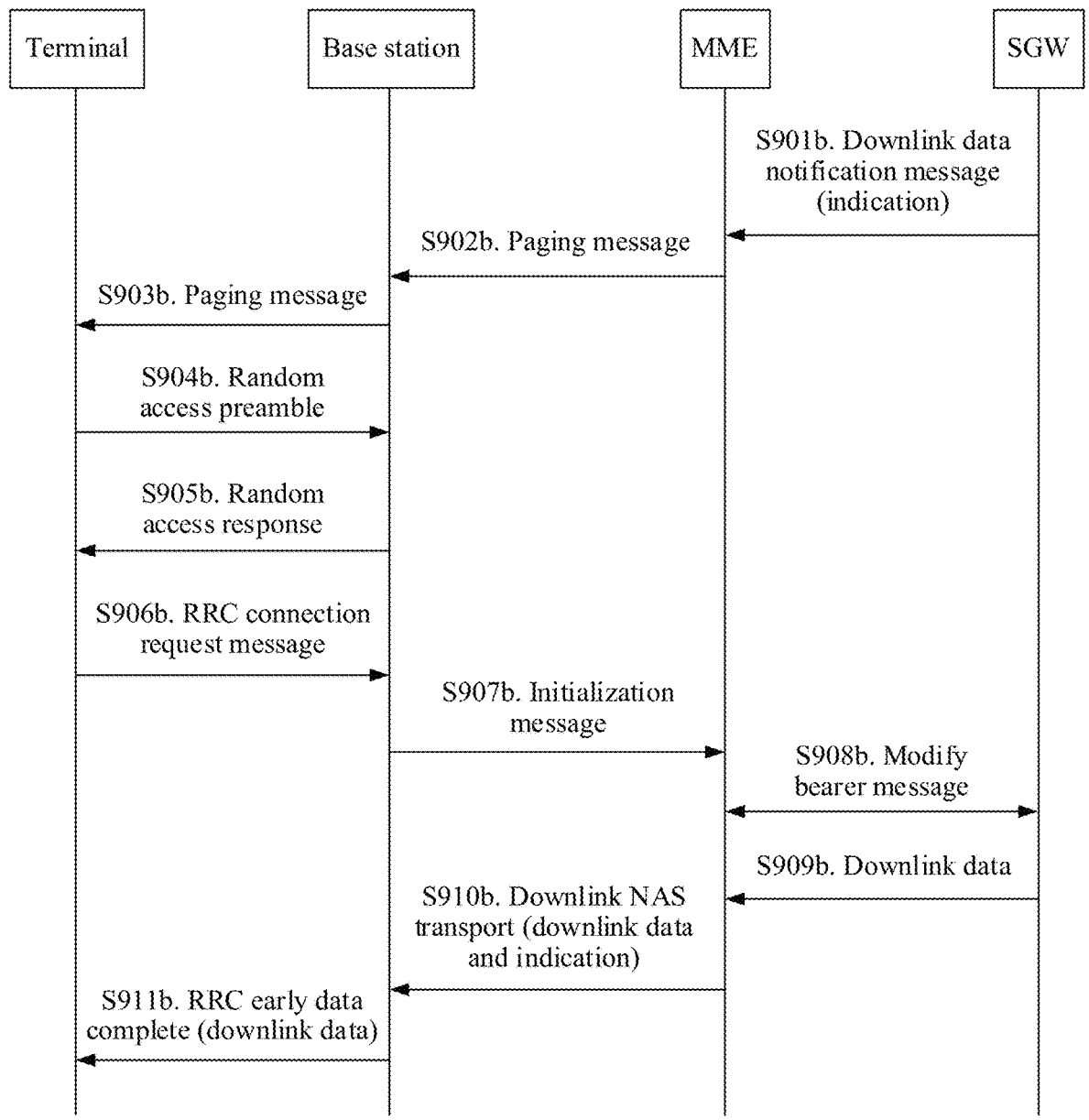
FIG. 9b is a schematic flowchart of a seventeenth implementation of a method for early transmission of downlink data according to an embodiment of this application.

FIG. 9b shows a seventeenth implementation of a method for early transmission of downlink data according to an embodiment of this application. The seventeenth implementation is based on the description of the sixth method for early transmission of downlink data shown in FIG. 3c. The following describes the seventeenth implementation in detail.

S901b to S905b are the same as S901a to S905a. For details, refer to the foregoing descriptions of the related steps. Details are not described herein again.

S906b. A terminal sends an RRC connection request message to a base station, to request to establish an RRC connection. The base station receives the RRC connection request message from the terminal.

S907b to S911b are the same as S907a to S911a. For details, refer to the foregoing descriptions of the related steps. Details are not described herein again.

According to the seventeenth implementation of the method for early transmission of downlink data, an MME can encapsulate downlink data of the terminal into a NAS message based on an indication sent by an S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 9C:
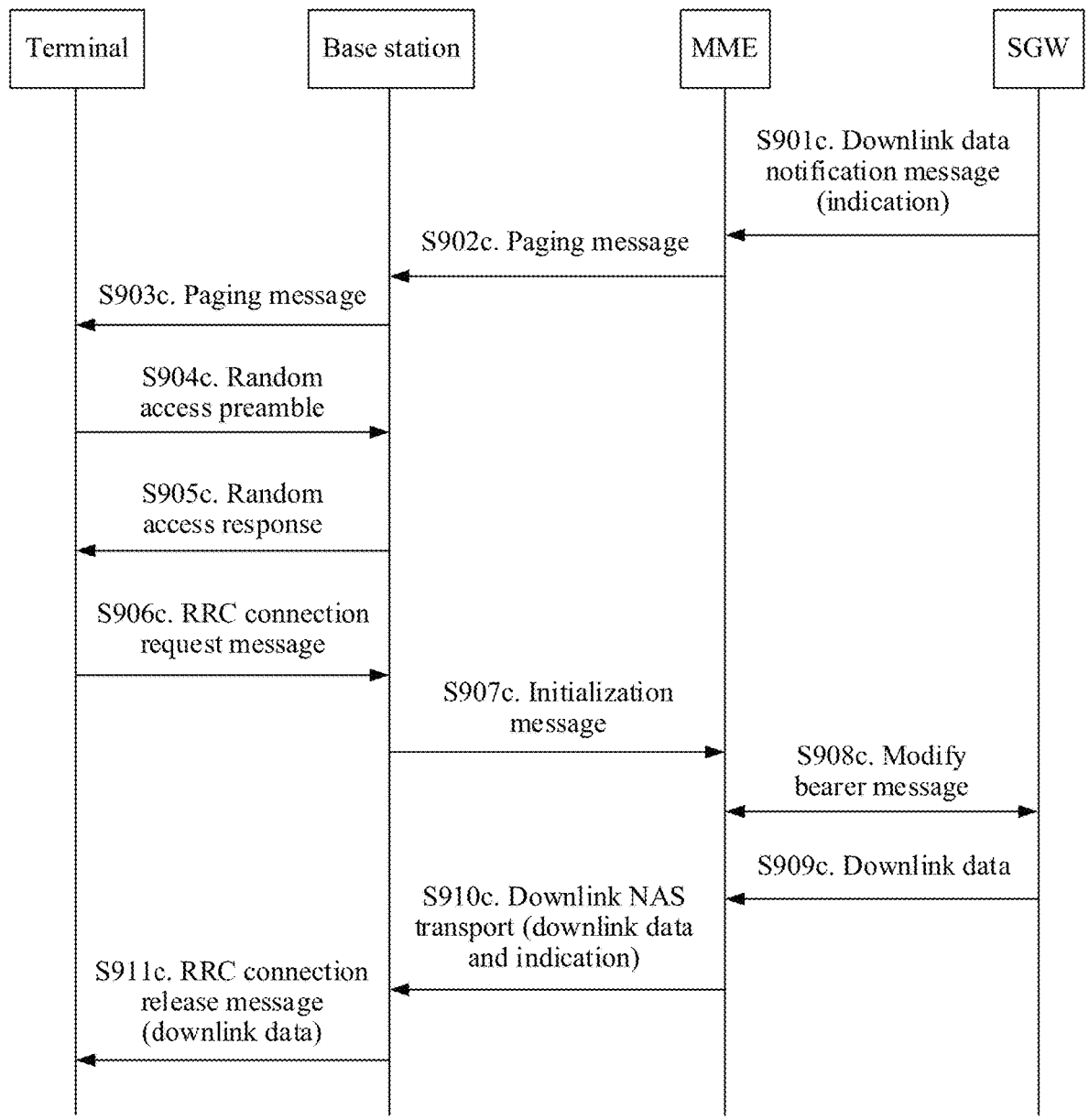
FIG. 9c is a schematic flowchart of an eighteenth implementation of a method for early transmission of downlink data according to an embodiment of this application.

FIG. 9c shows an eighteenth implementation of a method for early transmission of downlink data according to an embodiment of this application. The eighteenth implementation is based on the description of the sixth method for early transmission of downlink data shown in FIG. 3c. The following describes the eighteenth implementation in detail.

S901c to S905c are the same as S901a to S905a. For details, refer to the foregoing descriptions of the related steps. Details are not described herein again.

S906c. A terminal sends an RRC connection request message to a base station, to request to establish an RRC connection.

S907c to S910c are the same as S907a to S910a. For details, refer to the foregoing descriptions of the related steps. Details are not described herein again.

S911c. The base station sends an RRC connection release message to the terminal, and the terminal receives the RRC connection release message from the base station.

The RRC connection release message carries downlink data. Specifically, the base station encapsulates a received NAS message into the RRC connection release message, and sends the RRC connection release message to the terminal. The terminal obtains the NAS message in the received RRC connection release message, to obtain the downlink data.

According to the eighteenth implementation of the method for early transmission of downlink data, an MME can encapsulate downlink data of the terminal into a NAS message based on an indication sent by an S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 10A:
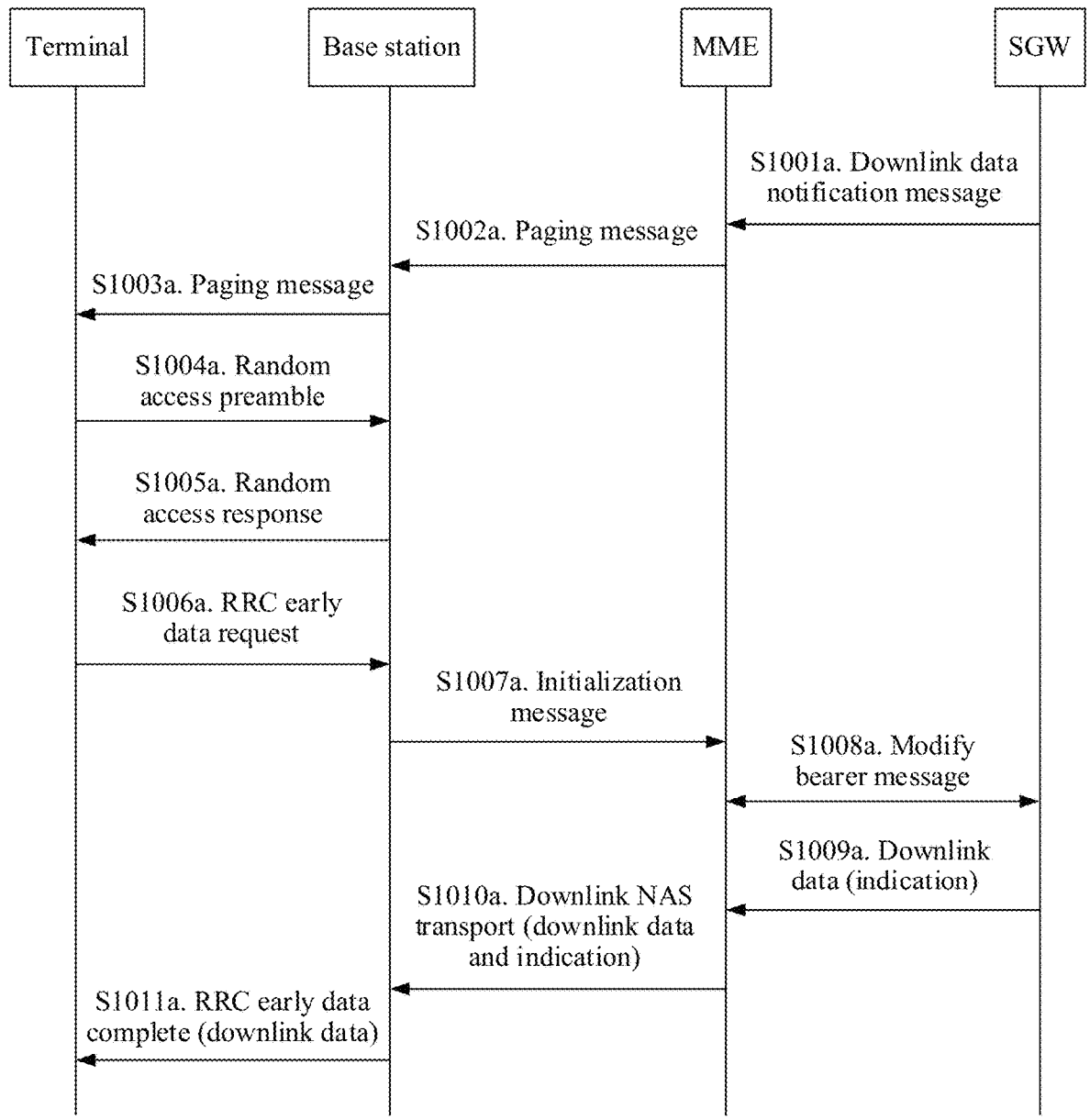
FIG. 10a is a schematic flowchart of a nineteenth implementation of a method for early transmission of downlink data according to an embodiment of this application.

FIG. 10a shows a nineteenth implementation of a method for early transmission of downlink data according to an embodiment of this application. The nineteenth implementation is based on the description of the seventh method for early transmission of downlink data shown in FIG. 3d. The following describes the nineteenth implementation in detail.

S1001a. An S-GW sends a downlink data notification message to an MME, and the MME receives the downlink data notification message sent by the S-GW.

When downlink data of a terminal arrives at the S-GW on a core network side, sending of the downlink data notification message is triggered. The downlink data notification message further carries an identifier of a terminal. For example, the identifier is an S-TMSI.

S1002a. After receiving the downlink data notification message sent by the S-GW, the MME sends a paging message to a base station, and the base station receives the paging message sent by the MME.

The paging message is used to indicate the base station to page the terminal. The paging message carries an identifier of the terminal. For example, the identifier is an S-TMSI.

S1003a. After receiving the paging message sent by the MME, the base station sends the paging message in a broadcast manner.

Optionally, the paging message sent in this step may also carry an indication. For a meaning of the indication, refer to the foregoing description.

A terminal in an idle state periodically listens to a paging message. When the terminal listens and obtains the paging message sent by the base station and determines that the paging message carries the identifier of the terminal, the terminal triggers the following steps:

S1004a. The terminal sends a random access preamble to the base station, and the base station receives the random access preamble sent by the terminal.

The base station broadcasts several random access preambles to all terminals by using a broadcast message. The terminal randomly selects one random access preamble from the several random access preambles broadcast by the base station, randomly selects one resource from resources that are broadcast by the base station and that are used to send the random access preambles, and sends the selected random access preamble on the selected resource.

S1005a. The base station sends a RAR to the terminal, and the terminal receives the random access response sent by the base station.

Specifically, the base station listens, on a resource of the random access preamble, to the random access preamble sent by the terminal, and sends the RAR to the terminal when detecting a random access preamble. The RAR includes a timing advance for sending an Msg3 by the terminal and an uplink resource (UL grant) for sending the Msg3 by the terminal.

S1006a. The terminal sends an RRC early data request message to the base station, and the base station receives the RRC early data request message from the terminal.

The RRC early data request message is used to request early transmission of uplink data. The RRC early data request message may carry a dedicated Info NAS. The dedicated Info NAS is originally used to carry uplink data for early transmission. In an early transmission scenario of downlink data, it is assumed that the terminal does not have uplink data. In this case, the dedicated Info NAS may be set to null to indicate that no uplink data is carried.

S1007a. The base station sends a context resume request (UE context resume request) message to the MME, and the MME receives the context resume request message from the base station.

S1008a. The MME exchanges a modify bearer message with the S-GW.

S1009a. The S-GW sends downlink data to the MME, and the MME receives the downlink data sent by the S-GW.

The downlink data carries an indication. For a meaning of the indication, refer to the foregoing description.

S1010a. The MME encapsulates the downlink data into a NAS message, and sends the downlink data to the base station through DL NAS transport; and the base station receives the NAS message from the MME.

The NAS message further carries an indication. For a meaning of the indication, refer to the foregoing description.

S1011a. The base station sends an RRC early data complete message to the terminal, and the terminal receives the RRC early data complete message from the base station.

The RRC early data complete message carries downlink data. Specifically, the base station encapsulates the received NAS message into the RRC early data complete message, and sends the RRC early data complete message to the terminal. The terminal obtains the NAS message in the received RRC early data complete message, to obtain the downlink data.

According to the nineteenth implementation of the method for early transmission of downlink data, the MME can encapsulate the downlink data of the terminal into the NAS message based on the indication sent by the S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 10B:
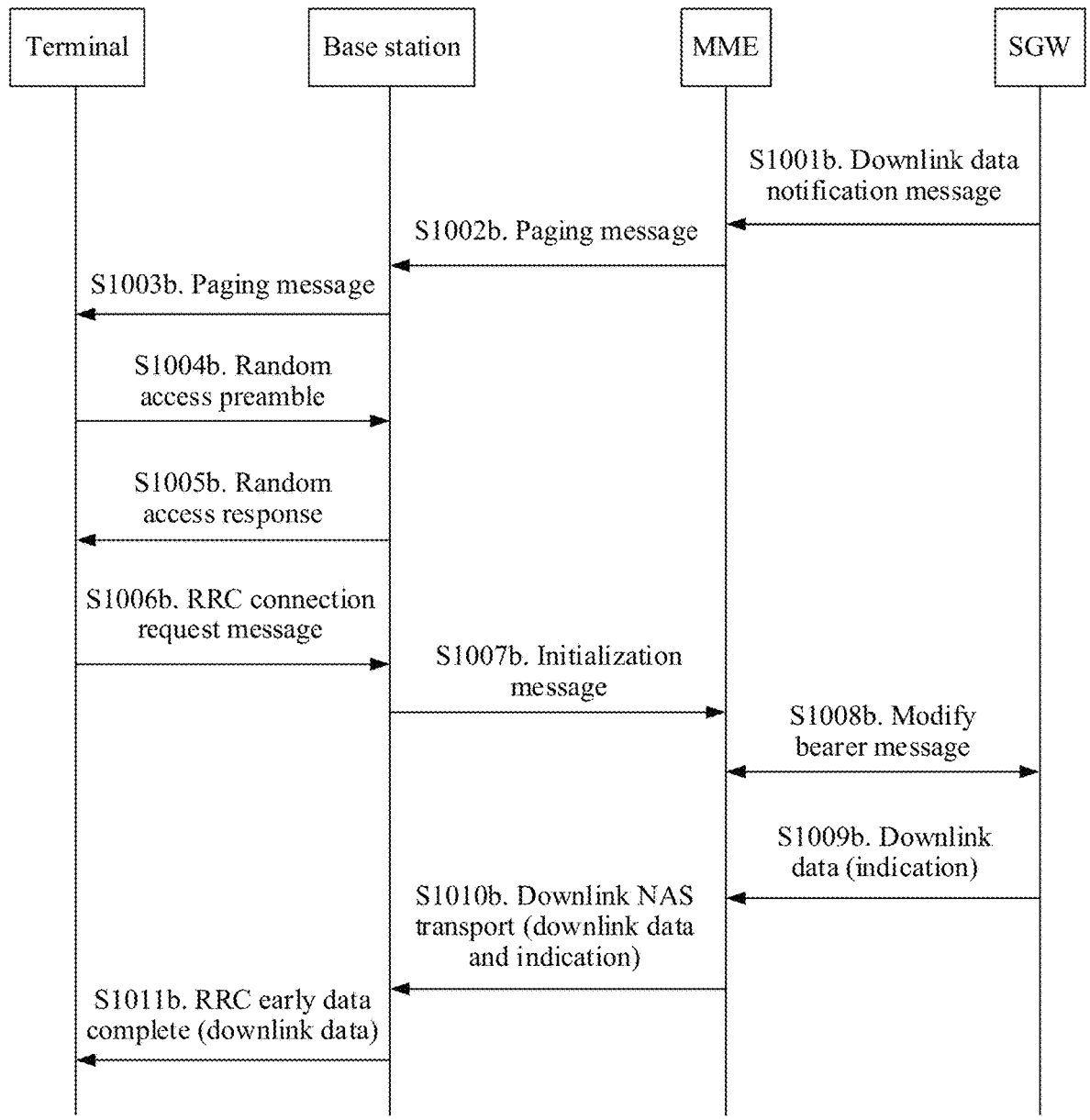
FIG. 10b is a schematic flowchart of a twentieth implementation of a method for early transmission of downlink data according to an embodiment of this application.

FIG. 10b shows a twentieth implementation of a method for early transmission of downlink data according to an embodiment of this application. The twentieth implementation is based on the description of the seventh method for early transmission of downlink data shown in FIG. 3d. The following describes the twentieth implementation in detail.

S1001b to S1005b are the same as S1001a to S1005a. For details, refer to the foregoing descriptions of the related steps. Details are not described herein again.

S1006b. A terminal sends an RRC connection request message to a base station, to request to establish an RRC connection. The base station receives the RRC connection request message from the terminal.

S1007b to S1011b are the same as S1007a to S1011a. For details, refer to the foregoing descriptions of the related steps. Details are not described herein again.

According to the twentieth implementation of the method for early transmission of downlink data, an MME can encapsulate downlink data of the terminal into a NAS message based on an indication sent by an S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 10C:
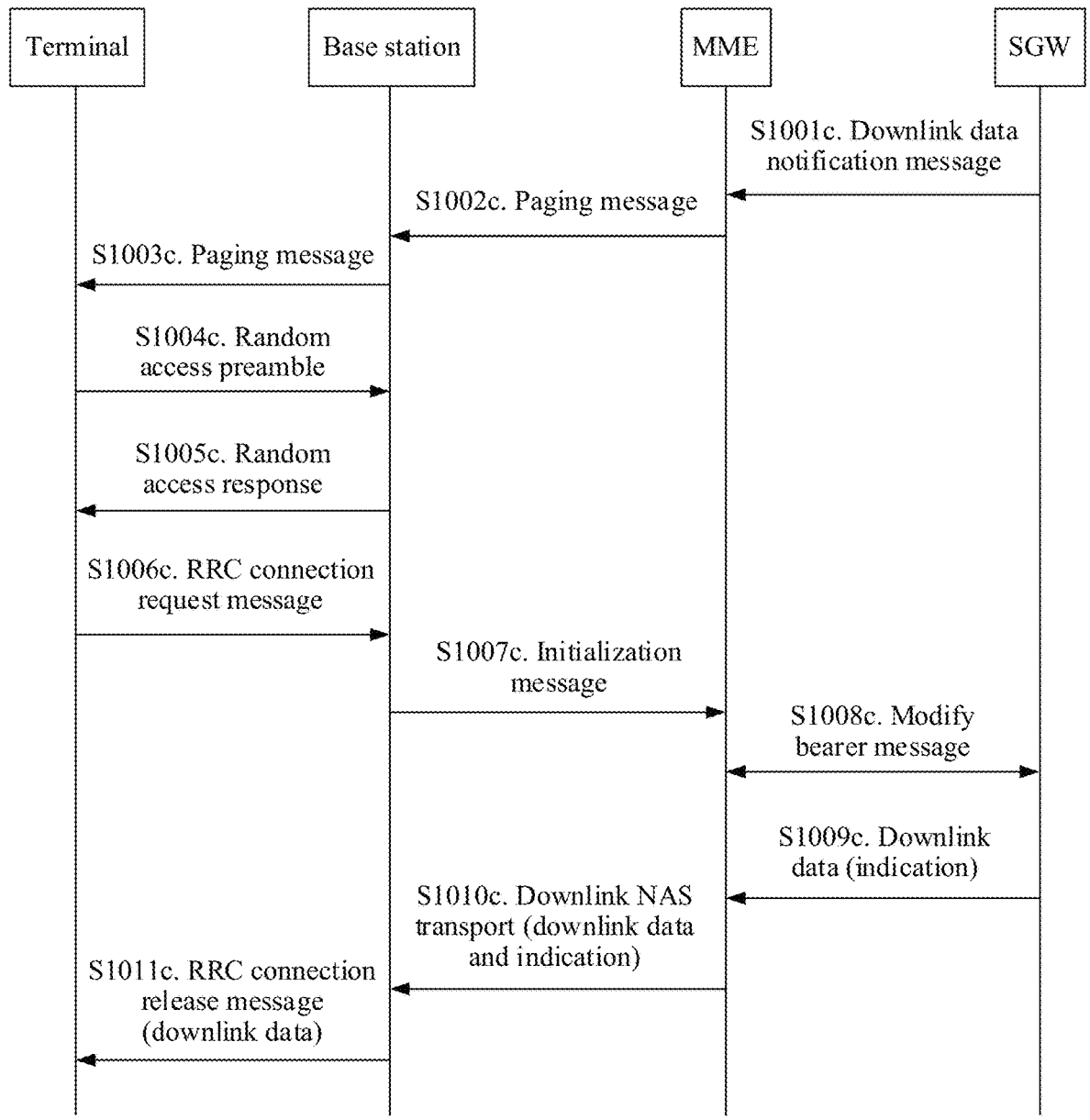
FIG. 10c is a schematic flowchart of a twenty-first implementation of a method for early transmission of downlink data according to an embodiment of this application.

FIG. 10c shows a twenty-first implementation of a method for early transmission of downlink data according to an embodiment of this application. The twenty-first implementation is based on the description of the seventh method for early transmission of downlink data shown in FIG. 3d. The following describes the twenty-first implementation in detail.

S1001c to S1005c are the same as S1001a to S1005a. For details, refer to the foregoing descriptions of the related steps. Details are not described herein again.

S1006c. A terminal sends an RRC connection request message to a base station, to request to establish an RRC connection.

S1007c to S1010c are the same as S1007a to S1010a. For details, refer to the foregoing descriptions of the related steps. Details are not described herein again.

S1011c. The base station sends an RRC connection release message to the terminal, and the terminal receives the RRC connection release message from the base station.

The RRC connection release message carries downlink data. Specifically, the base station encapsulates a received NAS message into the RRC connection release message, and sends the RRC connection release message to the terminal. The terminal obtains the NAS message in the received RRC connection release message, to obtain the downlink data.

According to the twenty-first implementation of the method for early transmission of downlink data, an MME can encapsulate the downlink data of the terminal into the NAS message based on an indication sent by an S-GW, and send the NAS message to the terminal via the base station, and does not need to establish an RRC connection to the terminal. Therefore, the terminal can finish receiving downlink data in an idle state. This helps reduce resource consumption, signaling overheads, and power consumption of the terminal.

Figure 11:
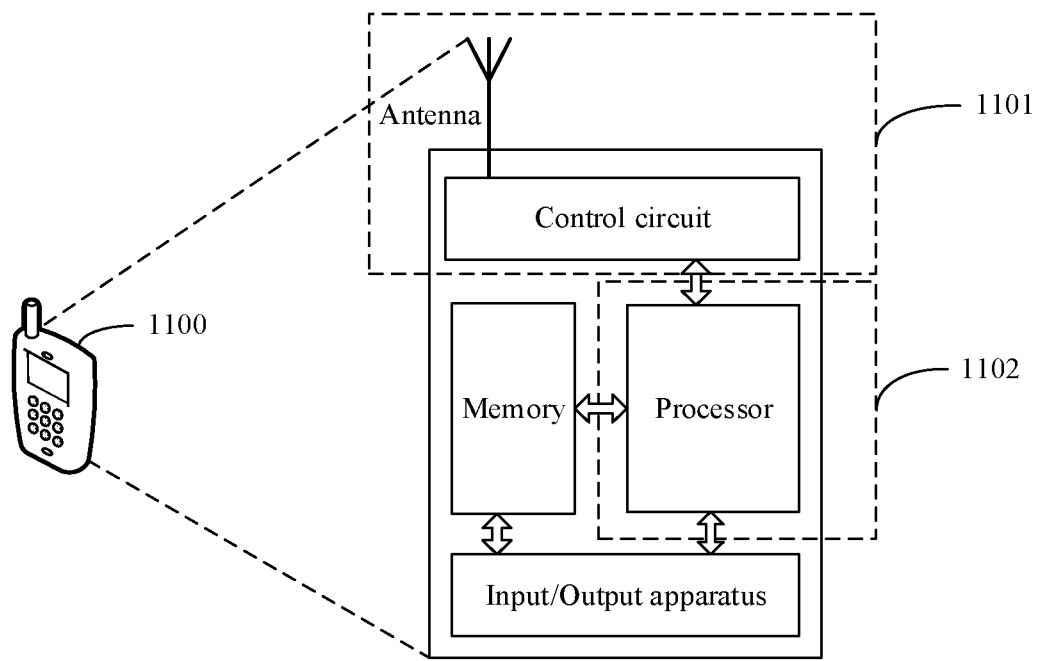
FIG. 11 is a first schematic structural diagram of an apparatus for early transmission of downlink data according to an embodiment of this application.

Based on a same inventive concept, as shown in FIG. 11, an embodiment of this application provides an apparatus 1100 for early transmission of downlink data. The apparatus 1100 for early transmission of downlink data may be applied to the communications system shown in FIG. 1, to perform functions of the terminal in the foregoing method embodiments. For ease of description, FIG. 11 shows only main components of the terminal. As shown in FIG. 11, the terminal 1100 includes a processor, a memory, a control circuit, an antenna, and an input/output apparatus. The processor is mainly configured to: process a communications protocol and communications data, control the entire terminal, execute a software program, and process data of the software program, for example, configured to support the terminal in performing actions described in the foregoing method embodiments, for example, generating a first indication, sending a Msg3 to a network device, adding the first indication to the Msg3, and receiving a Msg4 from the network device. The memory is mainly configured to store the software program and data, for example, store the first indication and the downlink data that are described in the foregoing embodiments. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus such as a touchscreen, a display, or a keyboard is mainly configured to receive data entered by a user and output data to the user.

After the terminal is powered on, the processor may read a software program in a storage unit, explain and execute an instruction of the software program, and process data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and one processor. In an actual terminal, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process a communications protocol and communications data. The central processing unit is mainly configured to: control the entire terminal, execute a software program, and process data of the software program. Functions of the baseband processor and the central processing unit may be integrated into the processor in FIG. 11. A person skilled in the art may understand that the baseband processor and the central processing unit each may be an independent processor, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of software program. The processor executes the software program to implement a baseband processing function.

In this embodiment of this application, the antenna that has receiving and sending functions and the control circuit may be considered as a transceiver unit 1101 of the terminal 1100. For example, the transceiver unit 1101 is configured to support the terminal in performing the receiving function and the sending function that are described in the foregoing method embodiments. The processor having a processing function is considered as a processing unit 1102 of the terminal device 1100. As shown in FIG. 11, the terminal 1100 includes the transceiver unit 1101 and the processing unit 1102. The transceiver unit may also be referred to as a transceiver, a transceiver machine, a transceiver apparatus, or the like. Optionally, a component configured to implement a receiving function in the transceiver unit 1101 may be considered as a receiving unit. A component configured to implement a sending function in the transceiver unit 1101 may be considered as a sending unit. In other words, the transceiver unit 1101 includes the receiving unit and the sending unit. The receiving unit may also be referred to as a receiver, an input port, a receiving circuit, or the like. The sending unit may be referred to as a transmitting machine, a transmitter, a transmitting circuit, or the like.

The processor 1102 may be configured to execute an instruction stored in the memory, to control the transceiver unit 1101 to receive a signal and/or send a signal, to complete a function of the terminal in the foregoing method embodiments. In an implementation, a function of the transceiver unit 1101 may be implemented by using a transceiver circuit or a transceiver-dedicated chip.

Figure 12:
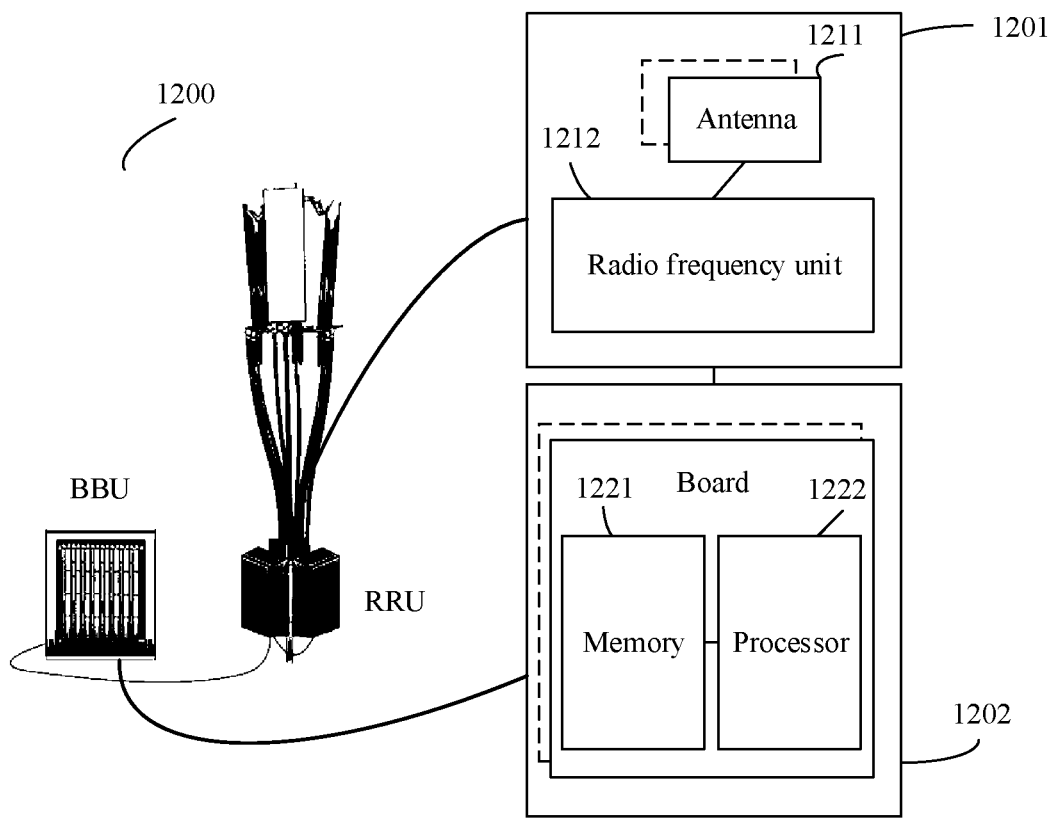
FIG. 12 is a second schematic structural diagram of an apparatus for early transmission of downlink data according to an embodiment of this application.

FIG. 12 is a schematic structural diagram of an apparatus for early transmission of downlink data according to an embodiment of this application. For example, FIG. 12 may be a schematic structural diagram of an access network device (that is, a base station). As shown in FIG. 12, the access network device may be applied to the system shown in FIG. 1, and may perform functions of the first network device in the foregoing method embodiments. The network device 1200 (which may also be referred to as a base station 1200) may include one or more radio frequency units, such as a remote radio unit (RRU) 1201 and one or more baseband units (BBU) (which may also be referred to as digital units, digital unit, DU) 1202. The RRU 1201 may be referred to as a transceiver unit, a transceiver machine, a transceiver circuit, a transceiver, or the like, and may include at least one antenna 1211 and a radio frequency unit 1212. The RRU 1201 is mainly configured to receive and send a radio frequency signal and perform conversion between a radio frequency signal and a baseband signal, for example, configured to receive an indication sent by a terminal, receive an indication sent by a second network device, or send downlink data to a terminal. The BBU 1202 is mainly configured to: perform baseband processing, control the base station, and so on. The RRU 1201 and the BBU 1202 may be physically disposed together, or may be physically disposed separately, to be specific, the base station is a distributed base station.

The BBU 1202 is a control center of the base station, may also be referred to as a processing unit, and is mainly configured to complete a baseband processing function such as channel coding, multiplexing, modulation, or spreading. For example, the BBU (the processing unit) 1202 may be configured to control the base station to perform the operation procedure of the first network device in the foregoing method embodiments.

In an example, the BBU 1202 may include one or more boards, and a plurality of boards may jointly support a radio access network (such as an LTE network) of a single access standard, or may separately support radio access networks (such as an LTE network, a 12G network, and another network) of different access standards. The BBU 1202 further includes a memory 1221 and a processor 1222. The memory 1221 is configured to store a necessary instruction and necessary data. For example, the memory 1221 stores a correspondence between a codebook index and a precoding matrix in the foregoing embodiments. The processor 1222 is configured to control the base station to perform a necessary action, for example, is configured to control the base station to perform an operation procedure related to the first network device in the foregoing method embodiments. The memory 1221 and the processor 1222 may serve one or more boards. In other words, a memory and a processor may be independently disposed on each board, or a plurality of boards may share a same memory and a same processor. In addition, a necessary circuit may further be disposed on each board.

Figure 13:
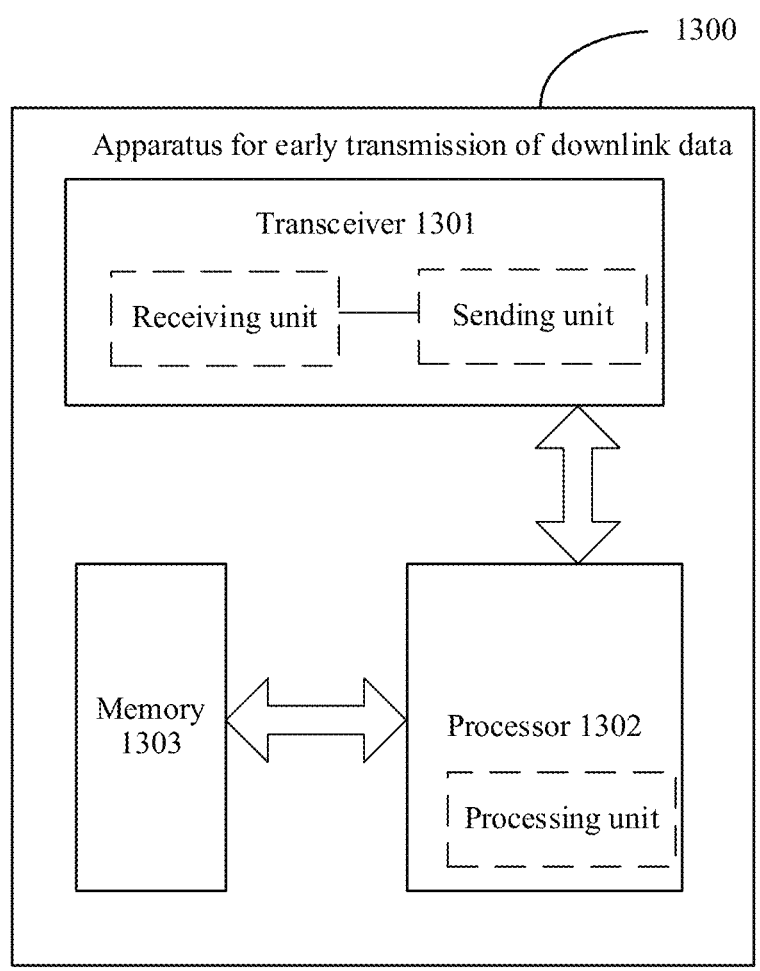
FIG. 13 is a third schematic structural diagram of an apparatus for early transmission of downlink data according to an embodiment of this application.

Based on a same inventive concept as that of the foregoing method embodiments, as shown in FIG. 13, an embodiment of this application further provides an apparatus 1300 for early transmission of downlink data. The apparatus 1300 for early transmission of downlink data is configured to implement operations performed by the second network device (that is, the first core network device) and the third network device (that is, the second core network device) in the foregoing embodiments. For brief description, the schematic diagrams of possible apparatuses of the first core network device and the second core network device are shown by referencing FIG. 13. It may be understood that FIG. 13 is merely a schematic diagram, and may be applied to the first core network device and the second core network device. The apparatus 1300 for early transmission of downlink data includes a transceiver 1301, a processor 1302, and a memory 1303. The processor 1302 is configured to invoke a group of programs. When the programs are executed, the processor 1302 is enabled to perform operations performed by the second network device and the third network device in the first communication method provided in the foregoing embodiment. The memory 1303 is configured to store the programs executed by the processor 1302. The transceiver 1301 may be considered as a transceiver unit of the second network device/third network device, and is configured to support the second network device/third network device in performing the receiving function and the sending function in the foregoing method embodiments. The processor 1302 may be considered as a processing unit of the second network device/third network device. Optionally, a component configured to implement a receiving function in the transceiver unit may be considered as a receiving unit. A component configured to implement a sending function in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitting machine, a transmitter, a transmitting circuit, or the like.

This application further provides a communications system, including the foregoing one or more network devices and one or more terminals.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, any conventional processor, or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these types of memories and any memory of another proper type.

An embodiment of this application further provides a computer-readable medium. The computer-readable medium stores a computer program. When the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented by software, hardware, firmware, or any combination thereof. When software is used for implementation, all or some of the embodiments may be implemented in a form of computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (Solid State Disk, SSD)), or the like.

An embodiment of this application further provides a processing apparatus, including a processor and an interface. The processor is configured to perform the communication method in any one of the foregoing method embodiments.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general purpose processor. The general purpose processor is implemented by reading software code stored in a memory. The memory may be integrated into the processor, may be located outside the processor, or may exist independently.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular characteristics, structures, or features may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation to the implementation processes of the embodiments of this application.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of this application have been described, a person skilled in the art can make changes and modifications to these embodiments once learning the basic inventive concept. Therefore, the following claims are intended to be construed as to cover the preferred embodiments and all changes and modifications falling within the scope of this application.

It is clear that a person skilled in the art can make various modifications and variations to the embodiments of this application without departing from the scope of the embodiments of the present invention. This application is intended to cover these modifications and variations provided that they fall within the protection scope defined by the following claims and their equivalent technologies.

What is claimed is:

1. A method for early transmission of downlink data, comprising:
    sending a random access preamble to a network device;
    receiving a random access response from the network device;
    sending a message 3 to the network device in response to the random access response, wherein the message 3 is a first radio resource control (RRC) message used to request to resume a radio resource control connection and carries a first indication used to indicate a single downlink data packet;
    receiving a message 4 from the network device, wherein the message 4 is a second radio resource control (RRC) message used to indicate to release the RRC connection and carries downlink data;
    resuming context information, wherein the context information comprises a first next-hop chaining count (NCC), and the first NCC is used to derive a first key;
    decrypting the downlink data by using the first key;
    performing integrity protection verification on the message 4 by using a third key comprised in the context information; and either
    deriving a second key by using the first NCC, and performing integrity protection verification on the message 4 by using the second key; or
    deriving a second key and a fourth key by using the first NCC, performing integrity protection verification on the message 4 by using the second key, and decrypting the message 4 by using the fourth key.

2. The method according to claim 1, wherein the message 4 carries a second next-hop chaining count (NCC); and
    the method further comprises:
    deriving a fifth key by using the second NCC; and
    decrypting the downlink data by using the fifth key.

3. The method according to claim 2, further comprising:
    deriving a sixth key by using the second NCC, and performing integrity protection verification on the message 4 by using the sixth key; or
    resuming context information, wherein the context information comprises a third key, and performing integrity protection verification on the message 4 by using the third key.

4. A method for early transmission of downlink data, comprising:
    receiving, by a first network device, a random access preamble from a terminal;
    sending, by the first network device, a random access response to the terminal;
    receiving, by the first network device, a message 3 from the terminal, wherein the message 3 is a first radio resource control (RRC) message used to request to resume a radio resource control connection and carries a first indication used to indicate a single downlink data packet;
    sending, by the first network device, a message 4 to the terminal, wherein the message 4 is a second radio resource control (RRC) message used to indicate to release the RRC connection and carries downlink data;
    resuming, by the first network device, context information of the terminal, wherein the context information comprises a first next-hop chaining count (NCC), and the first NCC is used to derive a first key;

encrypting, by the first network device, the downlink data by using the first key;

performing, by the first network device, integrity protection on the message 4 by using a third key comprised in the context information; and either deriving, by the first network device, a second key by using the first NCC, and performing, by the first network device, integrity protection on the message 4 by using the second key; or deriving, by the first network device, the second key and a fourth key by using the first NCC, performing integrity protection on the message 4 by using the second key, and encrypting the message 4 by using the fourth key.

5. An apparatus, comprising:

a processor; and a computer readable storage medium storing programming for execution by the processor, the programming including instructions to carry out steps comprising:

sending a random access preamble to a network device;

receiving a random access response from the network device;

sending a message 3 to the network device in response to the random access response, wherein the message 3 is a first radio resource control (RRC) message used to request to resume a radio resource control connection and carries a first indication used to indicate a single downlink data packet;

receiving a message 4 from the network device, wherein the message 4 is a second radio resource control (RRC) message used to indicate to release the RRC connection and carries downlink data;

resuming context information, wherein the context information comprises a first next-hop chaining count (NCC), and the first NCC is used to derive a first key;

decrypting the downlink data by using the first key;

performing integrity protection verification on the message 4 by using a third key comprised in the context information; and either deriving a second key by using the first NCC, and performing integrity protection verification on the message 4 by using the second key; or deriving a second key and a fourth key by using the first NCC, performing integrity protection verification on the message 4 by using the second key, and decrypting the message 4 by using the fourth key.

6. The apparatus according to claim 5, wherein the message 4 carries a second next-hop chaining count (NCC); and the method further comprises:

deriving a fifth key by using the second NCC; and decrypting the downlink data by using the fifth key.

7. The apparatus according to claim 6, wherein the steps further comprise:

deriving a sixth key by using the second NCC, and performing integrity protection verification on the message 4 by using the sixth key; or resuming context information, wherein the context information comprises a third key, and performing integrity protection verification on the message 4 by using the third key.

8. An apparatus, comprising:

a processor; and a computer readable storage medium storing programming for execution by the processor, the programming including instructions to carry out steps comprising:

receiving a random access preamble from a terminal;

sending a random access response to the terminal;

receiving a message 3 from the terminal, wherein the message 3 is a first radio resource control (RRC) message used to request to resume a radio resource control connection and carries a first indication used to indicate a single downlink data packet;

sending a message 4 to the terminal, wherein the message 4 is a second radio resource control (RRC) message used to indicate to release the RRC connection and carries downlink data;

resuming context information of the terminal, wherein the context information comprises a first next-hop chaining count (NCC), and the first NCC is used to derive a first key;

encrypting the downlink data by using the first key;

performing integrity protection on the message 4 by using a third key comprised in the context information; and either deriving a second key by using the first NCC, and performing, by the first network device, integrity protection on the message 4 by using the second key; or deriving the second key and a fourth key by using the first NCC, performing integrity protection on the message 4 by using the second key, and encrypting the message 4 by using the fourth key.

* * * * *